(12) United States Patent
Enomoto et al.

(10) Patent No.: US 10,183,548 B2
(45) Date of Patent: Jan. 22, 2019

(54) THERMAL MANAGEMENT SYSTEM FOR VEHICLE

(71) Applicant: DENSO CORPORATION, Kariya, Aichi-pref. (JP)

(72) Inventors: Norihiko Enomoto, Nagoya (JP); Michio Nishikawa, Nagoya (JP); Nobuharu Kakehashi, Toyoake (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 431 days.

(21) Appl. No.: 14/781,940

(22) PCT Filed: Mar. 27, 2014

(86) PCT No.: PCT/JP2014/001780
§ 371 (c)(1),
(2) Date: Oct. 2, 2015

(87) PCT Pub. No.: WO2014/162702
PCT Pub. Date: Oct. 9, 2014

(65) Prior Publication Data
US 2016/0031291 A1    Feb. 4, 2016

(30) Foreign Application Priority Data

Apr. 5, 2013 (JP) ................................ 2013-079426

(51) Int. Cl.
*F25D 17/00* (2006.01)
*B60H 1/00* (2006.01)
(Continued)

(52) U.S. Cl.
CPC ......... *B60H 1/00885* (2013.01); *B60H 1/005* (2013.01); *B60H 1/00271* (2013.01);
(Continued)

(58) Field of Classification Search
CPC ............ B60H 1/00271; B60H 1/00278; B60H 1/005; B60H 1/00385; B60H 1/00321;
(Continued)

(56) References Cited

U.S. PATENT DOCUMENTS 3,527,256 A * 9/1970 Colombo ................ F15B 13/02
137/625.48
3,823,572 A * 7/1974 Cochran, Jr. ............. F24F 5/00
165/207
(Continued)

FOREIGN PATENT DOCUMENTS

CN       104093587 A    10/2014
JP       2004050874 A    2/2004
(Continued)

OTHER PUBLICATIONS

International Search Report and Written Opinion (in Japanese with English Translation) for PCT/JP2014/001780, dated Jul. 8, 2014; ISA/JP.

*Primary Examiner* — Keith Raymond
*Assistant Examiner* — Miguel A Diaz
(74) *Attorney, Agent, or Firm* — Harness, Dickey & Pierce, P.L.C.

(57) ABSTRACT

In a thermal management system for a vehicle, a first switching valve is connected to at least one device in a group of a plurality of devices, a heat medium discharge side of a first pump, and a heat medium discharge side of a second pump in parallel with each other; and a second switching valve is connected to at least one device in the device group, a heat medium suction side of the first pump, and a heat medium suction side of the second pump in parallel with each other. Heat medium circulating through a first device included in the device group allows to flow through the second device. One side of a heat medium inlet side and a heat medium outlet side of the second device is connected to
(Continued)

between one of the first switching valve and the second switching valve and the first device.

22 Claims, 35 Drawing Sheets

(51) Int. Cl.
  *B60H 1/32*    (2006.01)
  *B60K 11/02*   (2006.01)
  *B60L 11/18*   (2006.01)
  *B60K 11/04*   (2006.01)
  *B60K 1/00*    (2006.01)
  *F25B 25/00*   (2006.01)

(52) U.S. Cl.
  CPC ......... *B60H 1/00385* (2013.01); *B60H 1/323* (2013.01); *B60K 11/02* (2013.01); *B60L 11/1874* (2013.01); *B60H 2001/00307* (2013.01); *B60H 2001/00928* (2013.01); *B60K 11/04* (2013.01); *B60K 2001/003* (2013.01); *F25B 25/005* (2013.01); *F25B 2339/047* (2013.01)

(58) Field of Classification Search
  CPC ........ B60H 1/32; B60H 1/323; B60H 1/0007; B60H 1/00642; B60H 1/00885; B60H 1/00878; B60H 1/00899; B60H 1/00928; B60H 1/00935; B60H 1/00942; B60H 1/00957; B60H 2001/00928; B60H 2001/00307; B60H 2001/3255; B60H 2001/00949; B60L 11/1874; B60L 2240/545; B60L 2240/34; B60L 2240/36; B60K 11/02; B60K 11/04; B60K 2001/003; F25B 25/005; F25B 2339/047; F01P 7/165; F01P 7/14; F01P 7/146; F01P 2005/105
  See application file for complete search history.

(56) References Cited

U.S. PATENT DOCUMENTS

| | | | |
|---|---|---|---|
| 5,695,720 A * | 12/1997 | Wade ................... | G01N 35/085 356/36 |
| 8,875,532 B2 * | 11/2014 | Neumeister ............ | B60L 1/003 62/243 |
| 9,557,083 B2 * | 1/2017 | Azuma ................... | F24F 3/065 |
| 9,650,940 B2 * | 5/2017 | Kakehashi ......... | B60H 1/00885 |
| 9,744,827 B2 * | 8/2017 | Nishikawa ............... | F01P 3/20 |
| 9,766,000 B2 * | 9/2017 | Honda ................. | F25B 41/046 |
| 9,878,594 B2 * | 1/2018 | Enomoto ................ | B60H 1/32 |
| 2002/0014330 A1 * | 2/2002 | Guyonvarch ...... | B60H 1/00007 165/202 |
| 2006/0118066 A1 * | 6/2006 | Martins ................... | F01P 7/165 123/41.08 |
| 2009/0056348 A1 * | 3/2009 | Noll ......................... | F25B 6/04 62/119 |
| 2011/0146339 A1 * | 6/2011 | Yamashita ................ | F24F 3/06 62/513 |
| 2011/0185754 A1 * | 8/2011 | Yamashita ............... | F24F 11/83 62/132 |
| 2012/0041900 A1 * | 2/2012 | Moreno ............... | A01K 1/0058 705/500 |
| 2012/0043056 A1 * | 2/2012 | Shimazu ................. | F24F 3/065 165/96 |
| 2012/0247142 A1 * | 10/2012 | Hawkins ................ | F25B 30/02 62/324.4 |
| 2013/0014537 A1 * | 1/2013 | Fujisawa ................ | F04C 18/16 62/468 |
| 2013/0061627 A1 * | 3/2013 | Neumeister ............ | B60L 1/003 62/467 |
| 2013/0240175 A1 | 9/2013 | Tschismar | |
| 2013/0276716 A1 * | 10/2013 | Nisbet .................. | A01K 1/0052 119/409 |
| 2013/0299256 A1 * | 11/2013 | Yamashita ............ | E02F 9/2095 180/68.1 |
| 2014/0060105 A1 * | 3/2014 | Azuma .................... | F24F 3/065 62/324.1 |
| 2014/0116072 A1 * | 5/2014 | Kim .......................... | F24D 3/18 62/79 |
| 2014/0374081 A1 * | 12/2014 | Kakehashi ............. | B60K 11/02 165/202 |
| 2015/0000327 A1 | 1/2015 | Kakehashi et al. | |
| 2015/0101789 A1 * | 4/2015 | Enomoto ........... | B60H 1/00485 165/202 |
| 2015/0129161 A1 * | 5/2015 | Nishikawa ............. | B60K 11/02 165/43 |
| 2015/0217622 A1 * | 8/2015 | Enomoto ........... | B60H 1/00878 165/42 |
| 2015/0258875 A1 * | 9/2015 | Enomoto ................ | B60L 1/003 165/104.31 |
| 2015/0285519 A1 * | 10/2015 | Motomura .............. | F25B 13/00 62/324.1 |
| 2015/0330673 A1 * | 11/2015 | Honda .................... | F25B 13/00 62/324.1 |
| 2016/0031288 A1 * | 2/2016 | Nishikawa ................ | F01P 3/20 165/202 |
| 2016/0153343 A1 * | 6/2016 | Kakehashi ......... | B60H 1/00885 123/41.31 |
| 2016/0167481 A1 * | 6/2016 | Makihara ............... | B60K 11/02 237/5 |
| 2016/0178253 A1 * | 6/2016 | Katoh ..................... | F25B 41/00 62/185 |
| 2016/0339761 A1 * | 11/2016 | Enomoto ............... | F25B 25/005 |
| 2016/0339767 A1 * | 11/2016 | Enomoto ............... | F25B 25/005 |
| 2016/0341449 A1 * | 11/2016 | Bahar ...................... | F24H 4/04 |
| 2017/0008373 A1 * | 1/2017 | Makihara ................ | B60K 11/02 |
| 2017/0028813 A1 * | 2/2017 | Enomoto ........... | B60H 1/00899 |
| 2017/0297414 A1 * | 10/2017 | Beloe ................. | B60H 1/00899 |

FOREIGN PATENT DOCUMENTS

| | | |
|---|---|---|
| JP | 2011121551 A | 6/2011 |
| JP | 2013231574 A | 11/2013 |
| WO | WO-2012045528 A1 | 4/2012 |

\* cited by examiner

THERMAL MANAGEMENT SYSTEM FOR VEHICLE

CROSS REFERENCE TO RELATED APPLICATIONS

This application is a U.S. National Phase Application under 35 U.S.C. 371 of International Application No. PCT/JP2014/001780 filed on Mar. 27, 2014 and published in Japanese as WO 2014/162702 A1 on Oct. 9, 2014. This application is based on and claims the benefit of priority from Japanese Patent Application 2013-079426 filed on Apr. 5, 2013. The entire disclosures of all of the above applications are incorporated herein by reference.

The application is based on a Japanese Patent Application 2013-079426 filed on Apr. 5, 2013, the contents of which are incorporated herein by reference in its entirety.

FIELD OF THE INVENTION

The preset disclosure relates to a thermal management system for use in a vehicle.

BACKGROUND ART

Conventionally, for example, as disclosed in Patent Document 1, a heat controller has been proposed which cools a motor generator, an inverter, a battery, and a vehicle compartment of an electric vehicle.

The heat controller in the related art includes a cooling circuit that allows for circulation of a coolant for cooling the motor generator and the inverter, a first circulation circuit that allows for circulation of a coolant for cooling the battery and the vehicle compartment, and a second circulation circuit that allows for circulation of a coolant passing through an exterior heat exchanger and exchanging heat with outside air.

Further, the heat controller includes a first valve that connects and disconnects between the cooling circuit and the first circulation circuit, a second valve that connects the cooling circuit to either the first circulation circuit or the second circulation circuit, and a third valve that connects and disconnects between the cooling circuit and the second circulation circuit. The respective valves are controlled to switch the subject of connection of the cooling circuit between the first circulation circuit and the second circulation circuit.

Heat can be transferred by a heat transfer device between the coolant circulating through the first circulation circuit and the coolant circulating through the second circulation circuit. The heat transfer device transfers the heat from the coolant having a low temperature to the coolant having a high temperature, between the coolants in the first and second circulation circuits.

The heat of the coolant in the first circulation circuit is transferred to the coolant in the second circulation circuit by the heat transfer device, and the heat of the coolant in the second circulation circuit is dissipated into the outside air by the exterior heat exchanger, which can cool the battery and the vehicle compartment.

The cooling circuit is connected to the first circulation circuit or the second circulation circuit by use of the first to third valves, so that the heat of the coolant in the cooling circuit can be dissipated into the outside air by the exterior heat exchanger in the second circulation circuit, thereby cooling the motor generator and the inverter.

PRIOR ART LIST

Patent Document

Patent Document 1: Japanese Unexamined Patent Application Publication No. 2011-121551

SUMMARY OF THE INVENTION

The inventors of the present application, however, have found through their studies that the related-art cooling system, which is designed to cool a plurality of devices, such as a motor generator, an inverter, and a battery, has the disadvantage of taking a complicated circuit configuration as a whole, while having the advantage of needing only one exterior heat exchanger. This disadvantage becomes more significant as the number of devices increases.

The devices that require cooling include, for example, an EGR cooler and an intake air cooler, in addition to the motor generator, the inverter, and the battery. Those devices have different required cooling temperatures.

To appropriately cool the respective devices, the coolant to circulate through the respective devices is proposed to be switchable among the devices, which leads to an increase in the number of circulation circuits according to the number of devices. Together with the increase, the number of valves that connect and disconnect between the cooling circuit and the respective circulation circuits is also increased, which results in a very complicated structure for a flow path that connects each circulation circuit to the cooling circuit.

The present disclosure has been made in view of the above matter, and it is an object of the present disclosure to simplify the structure of a vehicle thermal management system that can switch heat media circulating through a plurality of devices.

To achieve the above object, a thermal management system for a vehicle includes (i) a first pump and a second pump that draw and discharge a heat medium; (ii) a device group configured by plural devices through which the heat medium circulates; (iii) a first switching valve that is connected to at least one device of the device group, a heat medium discharge side of the first pump, and a heat medium discharge side of the second pump, the first switching valve being adapted to switch between a state in which the heat medium discharged from the first pump flows, and another state in which the heat medium discharged from the second pump flows, with respect to the at least one device; (iv) a second switching valve that is connected to the at least one device, a heat medium suction side of the first pump, and a heat medium suction side of the second pump, the second switching valve being adapted to switch between a state in which the heat medium flows into the first pump and another state in which the heat medium flows into the second pump, with respect to the at least one device; and (v) a first device included in the device group, and a second device in which the heat medium circulating through the first device needs to flow. Furthermore, one side of a heat medium inlet side and a heat medium outlet side of the second device is connected to a position between the first device and one of the first switching valve and the second switching valve.

Thus, at least one device in the device group, the first switching valve, and the second switching valve are connected in parallel with each other. With such a simple structure, the first and second switching valves can switch the heat medium circulating through at least one device in the device group.

Further, one side of the heat medium inlet side and the heat medium outlet side of the second device is connected to between the first device and one switching valve of the first and second switching valves. Thus, the heat medium circulating through the first device can flow through the second device without providing a connection portion for the second device in the one switching valve. In this way, the structure of the one switching valve can be simplified.

For example, the first device is a heat medium cooler that cools the heat medium by exchanging heat between the heat medium and a low-pressure side refrigerant in the refrigeration cycle, while the second device is a cooler core that cools the ventilation air into the vehicle interior by exchanging heat between the heat medium cooled by the heat medium cooler and the ventilation air into the vehicle interior. In this way, the refrigeration cycle can be used to perform air-cooling of the vehicle interior.

The first device may be a heat medium heater that heats the heat medium by exchanging heat between the heat medium and a high-pressure side refrigerant in the refrigeration cycle, while the second device is a heater core that heats the ventilation air into the vehicle interior by exchanging heat between the heat medium heated by the heat medium heater and the ventilation air into the vehicle interior. In this way, the refrigeration cycle can be used to perform air-heating of the vehicle interior.

The first device may be a heat medium heater that heats the heat medium by exchanging heat between the heat medium and a high-pressure side refrigerant in the refrigeration cycle, while the second device is a heat medium-heat medium heat exchanger that heats the heat medium in an engine cooling circuit by exchanging heat between the heat medium heated by the heat medium heater and the heat medium in the engine cooling circuit. In this way, the refrigeration cycle can be used to warm up the engine.

The first device may be a device that generates heat, and the second device is a heat medium-heat medium heat exchanger that heats the heat medium in the engine cooling circuit by exchanging heat between the heat medium heated by the device generating heat and the heat medium in the engine cooling circuit. In this way, the engine can be warmed up with the heat from the device. Further, when the vehicle thermal management system includes a heater core that heats the ventilation air into the vehicle interior by exchanging heat between the heat medium in the engine cooling circuit and the ventilation air into the vehicle interior, the vehicle interior can be heated using the heat from the device.

The first device may be a device that needs heating, and the second device is a heat medium-heat medium heat exchanger that heats the heat medium in the engine cooling circuit by exchanging heat between the heat medium circulating through the device that needs heating, and the heat medium in the engine cooling circuit. In this way, the device can be heated with the heat from the engine.

DESCRIPTION OF EMBODIMENTS

Figure 1:
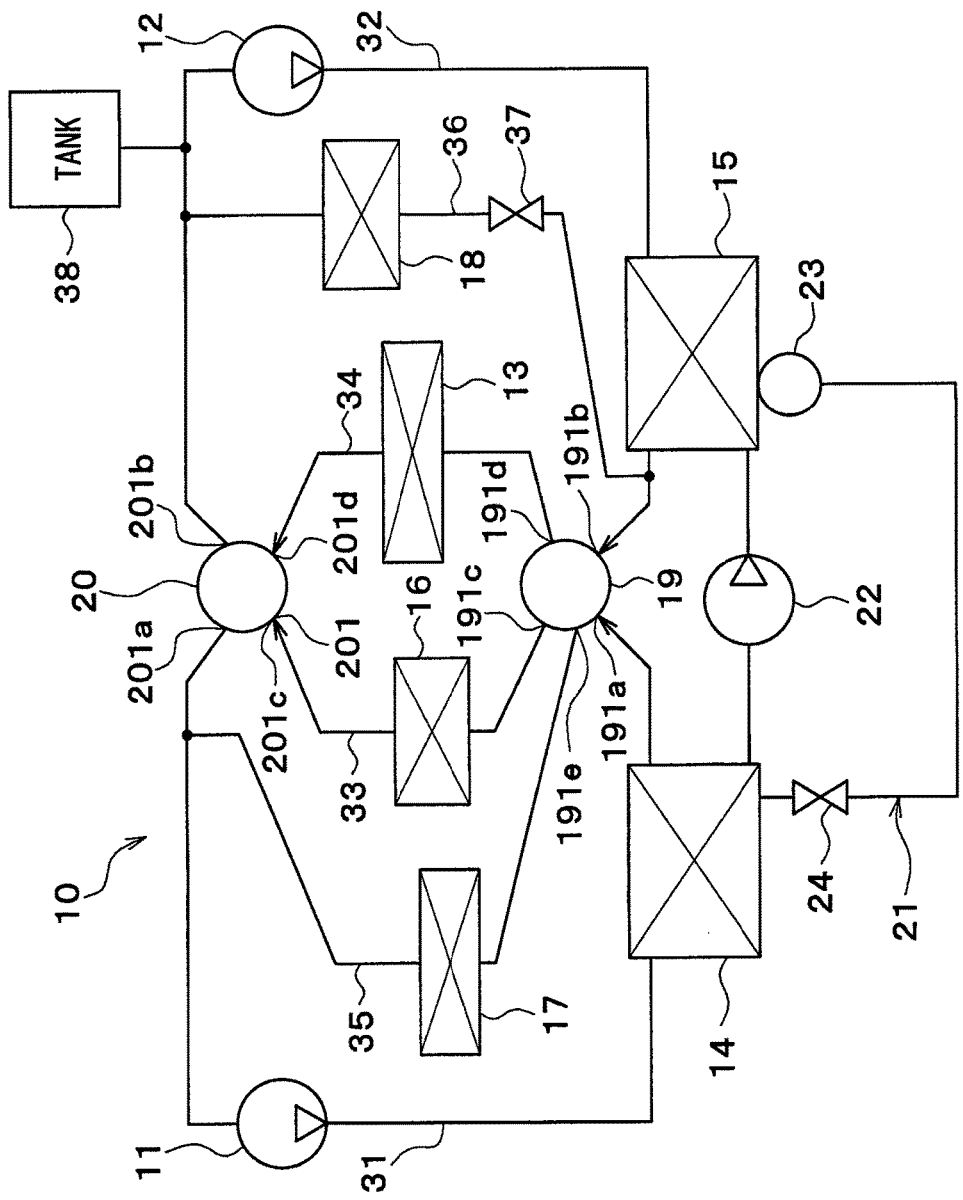
FIG. 1 is an entire configuration diagram of a vehicle thermal management system according to a first embodiment.

In the following, preferred embodiments of the present invention will be described with reference to the accompanying drawings. The same or equivalent parts in the embodiments below are indicated by the same reference characters throughout the figures.
First Embodiment
In the following, a first embodiment will be described based on FIGS. 1 to 16. A vehicle thermal management system 10 shown in FIG. 1 is used to adjust the temperature of various devices mounted on a vehicle or an interior of the vehicle to an appropriate level. In this embodiment, the thermal management system 10 is applied to a hybrid vehicle that can obtain the driving force for traveling from both an engine (internal combustion engine) and an electric motor for traveling.

The hybrid vehicle of this embodiment is configured as a plug-in hybrid vehicle that can charge the battery (vehicle-mounted battery) mounted on the vehicle, with power supplied from an external power source (commercial power source) during stopping of the vehicle. For example, a lithium ion battery can be used as the battery.

A driving force output from an engine is used not only for traveling of the vehicle, but also for operating a generator. Power generated by the generator and power supplied from the external power source can be stored in the battery. The power stored in the battery can be supplied not only to the electric motor for traveling, but also to various vehicle-mounted devices, such as electric components included in a thermal management system 10.

As shown in FIG. 1, the thermal management system 10 includes a first pump 11, a second pump 12, a radiator 13, a coolant cooler 14, a coolant heater 15, a device 16, a cooler core 17, a heater core 18, a first switching valve 19, and a second switching valve 20.

The first ump 11 and the second pump 12 are electric pumps for drawing and discharging the coolant (heat medium). The coolant is a fluid as the heat medium. In this embodiment, a liquid containing at least ethylene glycol, dimethylpolysiloxane, or a nano-fluid, or an antifreezing solution is used as the coolant.

The radiator 13, the coolant cooler 14, the coolant heater 15, and the device 16 are a group of devices (a plurality of devices) through which the coolant circulates.

The radiator 13 is a heat exchanger (heat medium-outside air heat exchanger) that exchanges heat between the coolant and the outside air (vehicle exterior air). The radiator 13 acts as a heat dissipation device that dissipates heat from the coolant into the outside air when the temperature of coolant is higher than that of the outside air, and also as a heat sink that absorbs heat from the outside air into the coolant when the temperature of coolant is lower than that of the outside air.

The outside air is blown to the radiator 13 by an exterior blower (not shown). The radiator 13 and the exterior blower are disposed at the forefront of the vehicle. Thus, during traveling of the vehicle, the radiator 13 can face the traveling air.

The coolant cooler 14 is a cooling device that cools the coolant. More specifically, the coolant cooler 14 is a low-pressure side heat exchanger (heat medium cooler) that cools the coolant by exchanging heat between the coolant and a low-pressure side refrigerant in a refrigeration cycle 21. The coolant inlet side (heat medium inlet side) of the coolant cooler 14 is connected to the coolant discharge side (heat medium discharge side) of the first pump 11.

The coolant heater 15 is a heating device that heats the coolant. More specifically, the coolant heater 15 is a high-pressure side heat exchanger (heat medium heater) that heats the coolant by exchanging heat between the coolant and a high-pressure side refrigerant in the refrigeration cycle 21. The coolant inlet side (heat medium inlet side) of the coolant heater 15 is connected to the coolant discharge side (heat medium discharge side) of the second pump 12.

The refrigeration cycle 21 is an evaporation compression refrigerator which includes a compressor 22, the coolant heater 15, a receiver 23, an expansion valve 24, and the coolant cooler 14. The refrigeration cycle 21 of this embodiment forms a subcritical refrigeration cycle that has a high-pressure side refrigerant pressure not exceeding the critical pressure of the refrigerant, using a fluorocarbon refrigerant as the refrigerant.

The compressor 22 is an electric compressor driven by power supplied from the battery. The compressor 22 draws and compresses the refrigerant in the refrigeration cycle 21 to discharge the compressed refrigerant therefrom. The coolant heater 15 is a condenser that condenses a high-pressure side refrigerant by exchanging heat between the high-pressure side refrigerant discharged from the compressor 22 and the coolant.

The receiver 23 is a gas-liquid separator that separates a gas-liquid two-phase refrigerant flowing out of the coolant heater 15 into a gas-phase refrigerant and a liquid-phase refrigerant, and allows the separated liquid-phase refrigerant to flow out toward the expansion valve 24. The expansion valve 24 is a decompression device that decompresses and expands the liquid-phase refrigerant flowing out of the receiver 23.

The coolant cooler 14 is an evaporator that evaporates a low-pressure refrigerant by exchanging heat between the coolant and the low-pressure refrigerant decompressed and expanded by the expansion valve 24. The gas-phase refrigerant evaporated at the coolant cooler 14 is drawn into and compressed by the compressor 22.

The radiator 13 serves to cool the coolant by the outside air, while the coolant cooler 14 serves to cool the coolant by the low-pressure refrigerant of the refrigeration cycle 21. Thus, the radiator 13 cannot cool the coolant to a temperature lower than that of the outside air, whereas the coolant cooler 14 can cool the coolant to a temperature lower than that of the outside air. That is, the temperature of the coolant cooled by the coolant cooler 14 can be set lower than that of the coolant cooled by the radiator 13.

Hereinafter, the coolant cooled by the outside air in the radiator 13 is referred to as an "intermediate-temperature coolant", and the coolant cooled by the low-pressure refrigeration of the refrigeration cycle 21 in the coolant cooler 14 is referred to as a "low-temperature coolant".

The device 16 is a device (temperature adjustment target device) having a flow path for circulation of the coolant and adapted to transfer heat between the device 16 itself and the coolant. Examples of the device 16 can include an inverter, a battery, a battery-temperature adjustment heat exchanger, a traveling electric motor, an engine device, a cold storage member, a ventilation heat recovery heat exchanger, a coolant-coolant heat exchanger, and the like.

The inverter is a power converter that converts a direct-current (DC) power supplied from the battery to an alternating-current (AC) voltage to output the AC voltage to the traveling electric motor.

The battery-temperature adjustment heat exchanger is a heat exchanger (air-heat medium heat exchanger) disposed in an air blowing path to the battery and adapted to exchange heat between ventilation air and coolant.

The engine devices can include a turbocharger, an intercooler, an EGR cooler, a CVT warmer, a CVT cooler, an exhaust heat recovery device, and the like.

The turbocharger is a supercharger that supercharges a suction air (intake air) into the engine. The intercooler is an intake air cooler (intake air-heat medium heat exchanger) that cools the supercharged intake air by exchanging heat between the coolant and the supercharged intake air at high temperature compressed by the turbocharger.

The EGR cooler is an exhaust air-coolant heat exchanger (exhaust air-heat medium heat exchanger) that exchanges heat between engine exhaust gas (exhaust air) returned to the suction side of the engine and the coolant, thereby cooling the exhaust air.

The CVT warmer is a lubricating oil-coolant heat exchanger (lubricating oil-heat medium heat exchanger) that exchanges heat between a lubricating oil (CVT oil) for lubricating a continuously variable transmission (CVT) and the coolant, thereby heating the CVT oil.

The CVT cooler is a lubricating oil-coolant heat exchanger (lubricating oil-heat medium heat exchanger) that exchanges heat between the CVT oil and the coolant, thereby cooling the CVT oil.

The exhaust heat recovery device is an exhaust air-coolant heat exchanger (exhaust air-heat medium heat exchanger) that exchanges heat between the exhaust air and the coolant, thereby absorbing heat of the exhaust air in the coolant.

The cold storage member is to store hot heat or cold heat contained in the coolant. Examples of the cold storage member can include a chemical heat storage agent, a thermal insulation tank, a latent heat storage material (paraffin or hydrate-based material), and the like.

The ventilation-heat recovery heat exchanger is a heat exchanger that recovers heat (cold heat or hot heat) exhausted to the outside through ventilation. For example, the ventilation-heat recovery heat exchanger recovers heat (cold heat or hot heat) exhausted to the outside by the ventilation, which can reduce power required for air cooling and heating.

The coolant-coolant heat exchanger is a heat exchanger that exchanges heat between coolants. For example, the coolant-coolant heat exchanger exchanges heat between coolant in the thermal management system 10 (coolant circulated by the first pump 11 or the second pump 12) and coolant in the engine cooling circuit, enabling heat transfer between the thermal management system 10 and the engine cooling circuit (circuit for circulation of the coolant for engine cooling).

The cooler core 17 is a cooling heat exchanger (air cooler) that cools ventilation air into the vehicle interior, by exchanging heat between the coolant and the ventilation air into the vehicle interior. Therefore, the coolant cooled by the coolant cooler 14 or a device or the like for generating cold heat (in other words, the coolant circulating through the coolant cooler 14 or the device or the like for generating cold heat) needs to circulate through the cooler core 17.

The heater core 18 is a heating heat exchanger (air heater) that heats ventilation air into the vehicle interior by exchanging heat between the ventilation air into the vehicle interior and the coolant. Therefore, the coolant heated by the coolant heater 15 or a device or the like for generating hot heat (in other words, the coolant circulating through the coolant heater 15 or the device or the like for generating hot heat) needs to circulate through the heater core 18.

The first pump 11 is disposed in a first-pump flow path 31. The coolant cooler 14 is disposed on the coolant discharge side of the first pump 11 in the first-pump flow path 31. The second pump 12 is disposed in a second-pump flow path 32. The coolant heater 15 is disposed on the coolant discharge side of the second pump 12 in the second-pump flow path 32.

The device 16 is disposed in a device flow path 33. The radiator 13 is disposed in a radiator flow path 34. The cooler core 17 is disposed in a cooler-core flow path 35. The heater core 18 is disposed in a heater-core flow path 36. An opening/closing valve 37 is disposed in the heater-core flow path 36. The opening/closing valve 37 is a flow path opening/closing device adapted to open and close the heater-core flow path 36, and comprised of an electromagnetic valve.

The second-pump flow path 32 is connected to a closed-type reserve tank 38. The reserve tank 38 serves as a storage portion for storing therein the coolant, and also as a pressure holding portion for holding a pressure of the coolant in an appropriate range.

By using the closed-type reserve tank 38, the effect of holding the pressure of coolant within a preset range is exhibited, so that fluctuations in liquid surface within the reserve tank 38 can be efficiently reduced to the minimum even in an operation state where the range of lift of the first pump 11 is drastically different from that of the second pump 12.

The reserve tank 38 has a function of separating the air bubbles mixed in the coolant, into gas and liquid components. The reserve tank 38 has a pressure holding mechanism that holds the coolant at the appropriate pressure, against abnormal increase and decrease in pressure of the coolant that would otherwise be caused due to the expansion and contraction of the coolant together with the change in temperature of the coolant. Any excessive coolant is stored in the reserve tank 38, which can suppress the decrease in liquid amount of the coolant circulating through the respective flow paths.

The first-pump flow path 31, the second-pump flow path 32, the device flow path 33, and the radiator flow path 34 are connected to the first switching valve 19 and the second switching valve 20.

The cooler-core flow path 35 has one end thereof connected to the first switching valve 19, and the other end thereof connected to a part between the second switching valve 20 and the first pump 11 in the first-pump flow path 31.

The heater-core flow path 36 has one end thereof connected to a part between the first switching valve 19 and the coolant heater 15 in the second-pump flow path 32, and the other end thereof connected to a part between the second switching valve 20 and the second pump 12 in the second-pump flow path 32.

Each of the first and second switching valves 19 and 20 is a flow switching device that switches the flow of coolant.

The first switching valve 19 is a five-way valve having five ports (first switching valve ports) serving as inlets or outlets for coolant. Specifically, the first switching valve 19 includes two inlets 191a and 191b as inlets for the coolant, and three outlets 191c, 191d, and 191e as outlets for the coolant.

The second switching valve 20 is a four-way valve having four ports (second switching valve ports) serving as inlets or outlets for coolant. Specifically, the second switching valve 20 includes two outlets 201a and 201b as outlets for the coolant, and two inlets 201c and 201d as inlets for the coolant.

The first inlet 191a of the first switching valve 19 is connected to one end of the first-pump flow path 31. In other words, the first inlet 191a of the first switching valve 19 is connected to the coolant outlet side of the coolant cooler 14.

The second inlet 191b of the first switching valve 19 is connected to one end of the second-pump flow path 32. In other words, the second inlet 191b of the first switching valve 19 is connected to the coolant outlet side of the coolant heater 15.

The first outlet 191c of the first switching valve 19 is connected to one end of the device flow path 33. In other words, the first outlet 191c of the first switching valve 19 is connected to the coolant inlet side of the device 16.

The second outlet 191d of the first switching valve 19 is connected to one end of the radiator flow path 34. In other words, the second outlet 191d of the first switching valve 19 is connected to the coolant inlet side of the radiator 13.

The third outlet 191e of the first switching valve 19 is connected to one end of the cooler-core flow path 35. In other words, the third outlet 191e of the first switching valve 19 is connected to the coolant inlet side of the cooler core 17.

The first outlet 201a of the second switching valve 20 is connected to the other end of the first-pump flow path 31. In other words, the first outlet 201a of the second switching valve 20 is connected to the coolant suction side of the first pump 11.

The second outlet 201b of the second switching valve 20 is connected to the other end of the second-pump flow path 32. In other words, the second outlet 201b of the second switching valve 20 is connected to the coolant suction side of the second pump 12.

The first inlet 201c of the second switching valve 20 is connected to the other end of the device flow path 33. In other words, the first inlet 201c of the second switching valve 20 is connected to the coolant outlet side of the device 16.

The second inlet 201d of the second switching valve 20 is connected to the other end of the radiator flow path 34. In other words, the second inlet 201d of the second switching valve 20 is connected to the coolant outlet side of the radiator 13.

The first switching valve 19 can be configured to arbitrarily or selectively switch the communication states between the two inlets 191a and 191b and the three outlets 191c, 191d, and 191e. The second switching valve 20 can also be configured to arbitrarily or selectively switch the communication states between the two outlets 201a and 201b and the two inlets 201d and 201e.

Specifically, the first switching valve 19 switches each of the radiator 13, the device 16, and the cooler core 17 among the state of inflow of the coolant discharged from the first pump 11, the state of inflow of the coolant discharged from the second pump 12, and the state in which the coolant discharged from the first pump 11 and the coolant discharged from the second pump 12 do not flow thereinto.

The second switching valve 20 switches each of the radiator 13 and the device 16 among the state of outflow of the coolant to the first pump 11, the state of outflow of the coolant to the second pump 12, and the state in which the coolant does not flow out to the first pump 11 and the second pump 12.

Next, the specific structure of the first and second switching valves 19 and 20 will be described with reference to FIGS. 2 to 7. As illustrated in FIGS. 2 to 5, the first switching valve 19 includes a case 191 acting as an outer shell, and a valve body 192 (first-switching-valve valve body) accommodated in the case 191.

Figure 2:
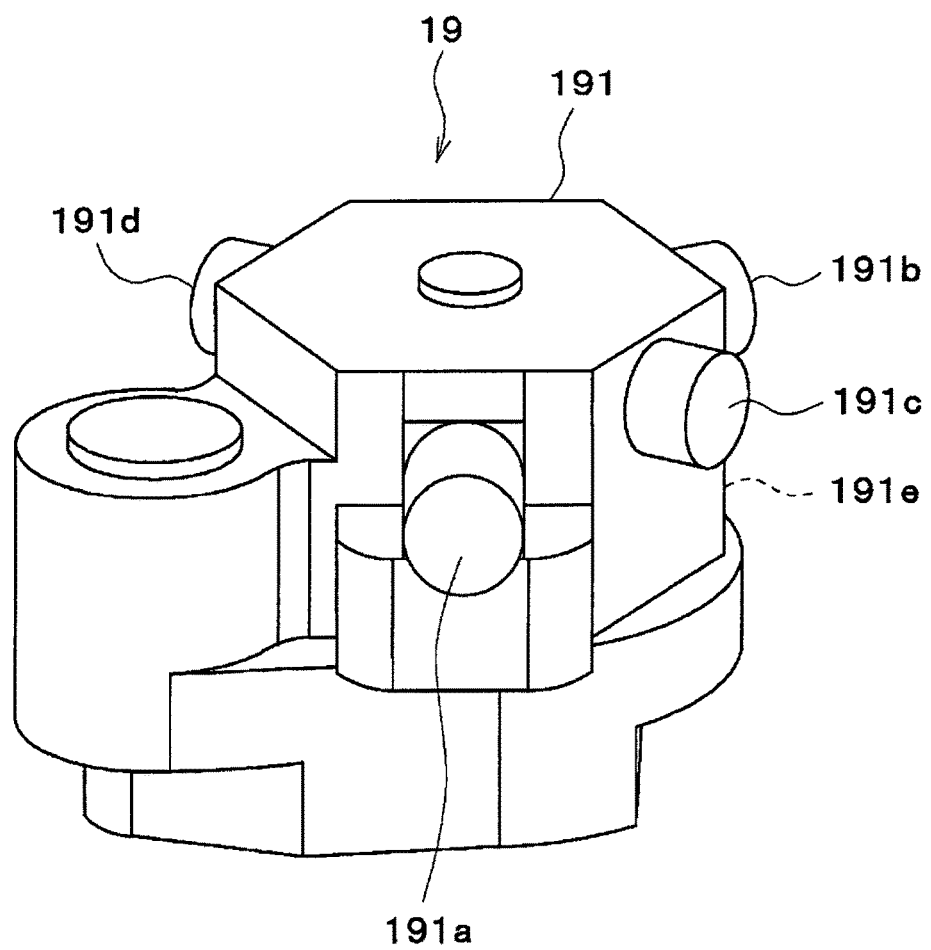
FIG. 2 is a perspective view of a first switching valve in the first embodiment.
Figure 3:
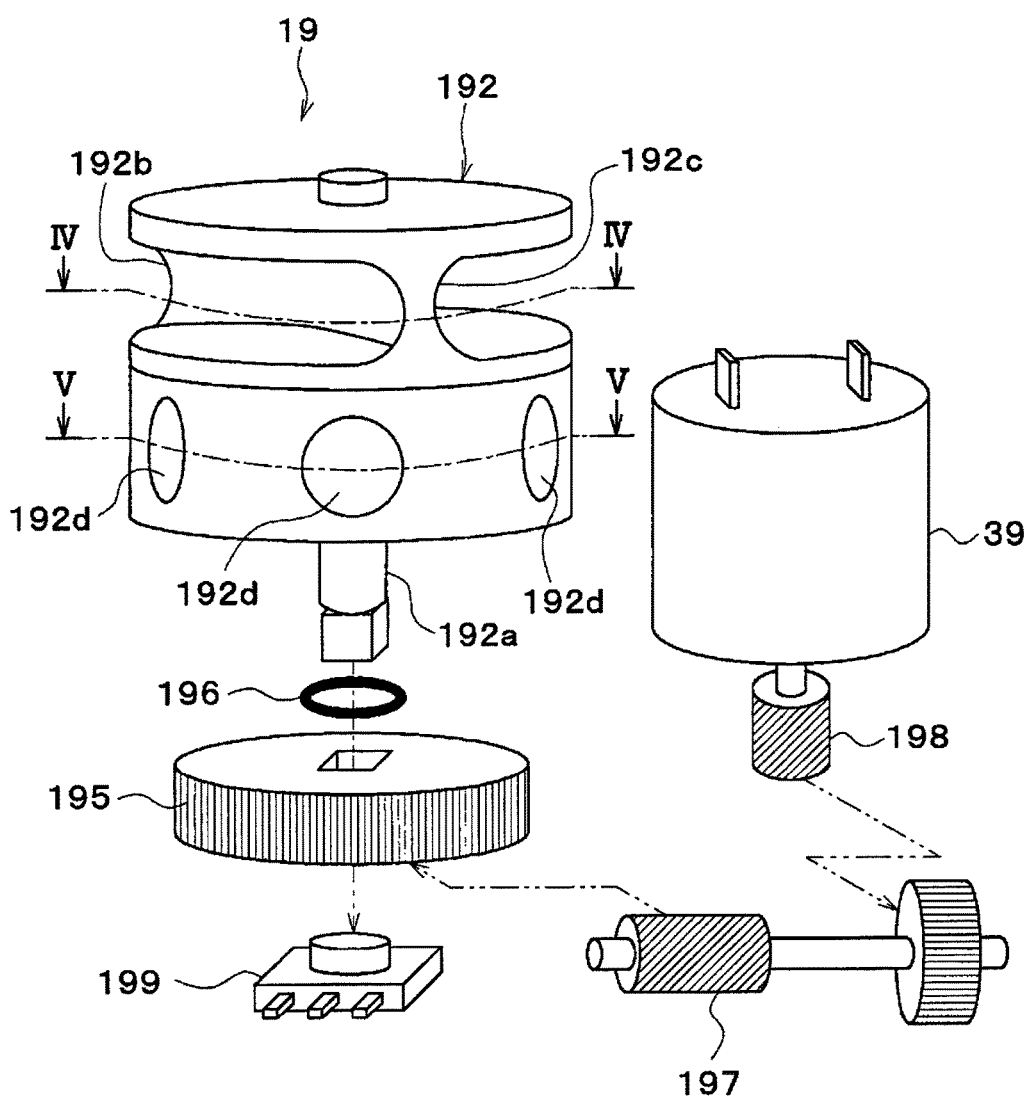
FIG. 3 is an exploded perspective view of the first switching valve in the first embodiment.
Figure 4:
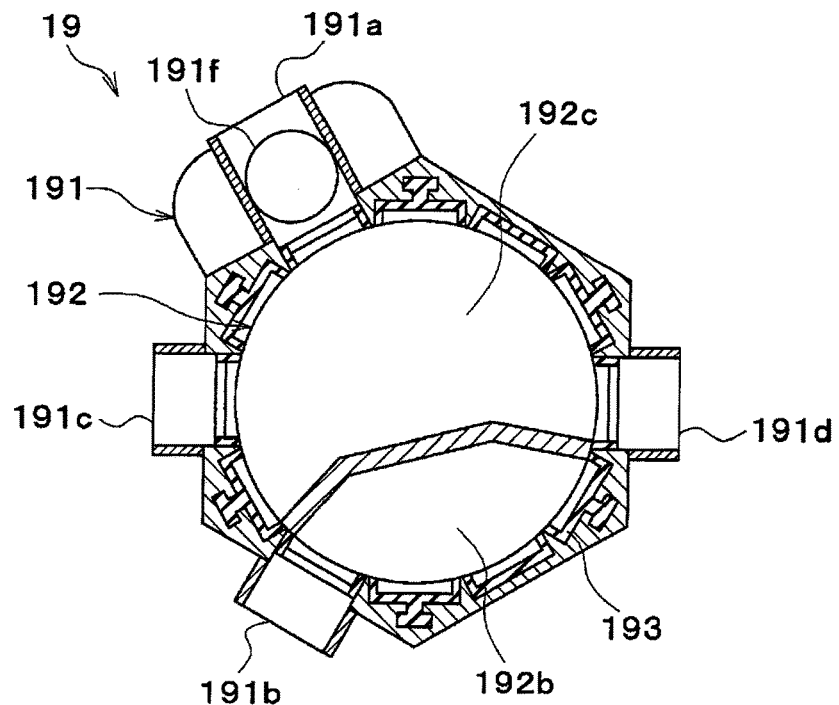
FIG. 4 is a cross-sectional view taken along the line IV-IV in FIG. 3.
Figure 5:
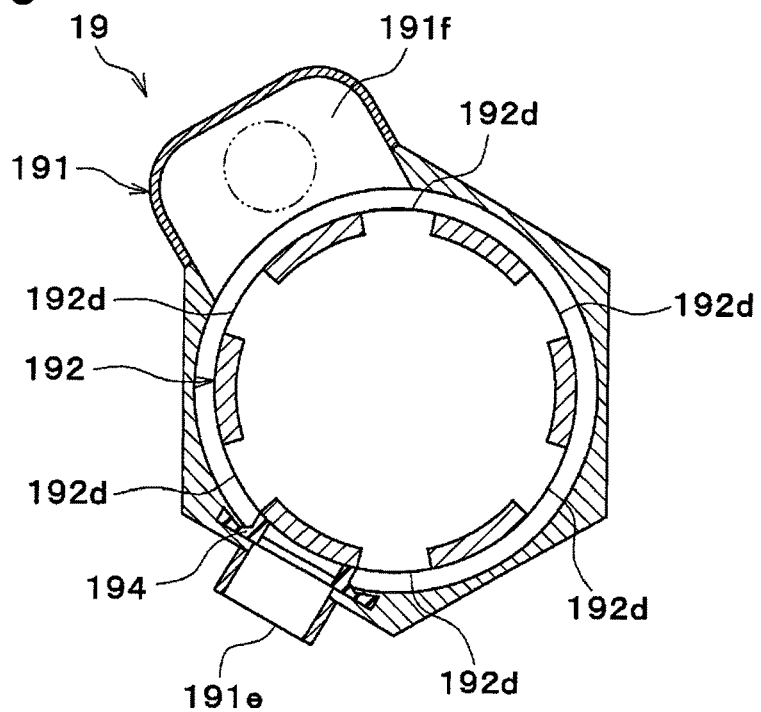
FIG. 5 is a cross-sectional view taken along the line V-V in FIG. 3.

FIGS. 4 and 5 show cross sections of the first switching valve 19 taken in the direction perpendicular to a rotation shaft 192a of the valve body 192 (see FIG. 3). FIG. 4 is a cross-sectional view of a part of the first switching valve 19 on one side thereof in the rotation axis direction of the valve body 192 (upper part as shown in FIGS. 2 and 3). FIG. 5 is a cross-sectional view of a part of the first switching valve 19 on the other side thereof in the rotation axis direction of the valve body 192 (lower part as shown in FIGS. 2 and 3).

The case 191 includes the first inlet 191a, the second inlet 191b, the first outlet 191c, the second outlet 191d, and the third outlet 191e.

As shown in FIGS. 2 and 4, the first inlet 191a, the second inlet 191b, the first outlet 191c, and the second outlet 191d are formed at parts of the case 191 on one side thereof in the rotation axis direction of the valve body 192 (at upper parts as shown in FIG. 2). Further, the first inlet 191a, the second inlet 191b, the first outlet 191c, and the second outlet 191d are formed in the outer peripheral direction of a peripheral wall surface of the case 191 with respect to the rotation shaft of the valve body 192.

As shown in FIGS. 2 and 5, the third outlet 191e is formed at parts of the case 191 on the other side thereof in the rotation axis direction of the valve body 192 (lower part shown in FIG. 2). The third outlet 191e is formed in the inner peripheral direction of the peripheral wall surface of the case 191 with respect to the rotation shaft of the valve body 192.

As shown in FIG. 4, the first inlet 191a, the second inlet 191b, the first outlet 191c, and the second outlet 191d are disposed at intervals of a predetermined angle in the rotational direction of the valve body 192. The second inlet 191b is placed in a position rotated counterclockwise by 120 degrees from the first inlet 191a. The first outlet 191c is placed in a position rotated counterclockwise by 60 degrees from the first inlet 191a. The second outlet 191d is placed in a position rotated clockwise by 120 degrees from the first inlet 191a.

As illustrated in FIGS. 4 and 5, the third outlet 191e is disposed to be superimposed over the second inlet 191b as viewed in the rotation axis direction of the valve body 192. Referring to FIGS. 4 and 5, a communication path 191f communicating with the first inlet 191a is formed at a part of the case 191 on the other side in the rotation axis direction of the valve body 192.

As shown in FIG. 4, a seal packing 193 for preventing internal leak of the coolant is arranged at an inner peripheral surface of a part of the case 191, on one side in the rotation axis direction of the valve body 192. As shown in FIG. 5, a seal packing 194 for preventing internal leak of the coolant is arranged at a peripheral edge of the third outlet 191e in the case 191.

Returning now to FIG. 3, the valve body 192 has a columnar shape with the rotation shaft 192a centered as a whole. As illustrated in FIGS. 3 and 4, a part of the valve body 192 on one side in the rotation axis direction (upper part as shown in FIG. 3) has a shape with a first cutout portion 192b and a second cutout portion 192c formed at the outer peripheral surface of its column.

The first cutout portion 192b is formed across an area covering by approximately 120 degrees in the rotational direction of the valve body 192. The second cutout portion 192c is formed across an area covering by approximately 240 degrees in the rotational direction of the valve body 192. The first cutout portion 192b and the second cutout portion 192c can communicate with the first inlet 191a, the second inlet 191b, the first outlet 191c, and the second outlet 191d.

As illustrated in FIGS. 3 and 5, a part of the valve body 192 on the other side in the rotation axis direction (lower part as shown in FIG. 3) has a shape with six communication holes 192d formed at the outer peripheral surface of its cylinder. The six communication holes 192d are arranged every 60 degrees in the rotational direction of the valve body 192. The six communication holes 192d can communicate with the third outlet 191e and the communication path 191f.

As shown in FIG. 3, the rotation shaft 192a of the valve body 192 is coupled to an output gear 195. The rotation shaft 192a of the valve body 192 is coupled to the output gear 195. An O ring 196 for preventing coolant leakage is attached to the rotation shaft 192a of the valve body 192.

The output gear 195 is coupled to the output shaft of an electric motor 39 via an intermediate gear 197 and a warm gear 198. A potentiometer 199 is a valve-body rotation angle detector that detects a rotation angle of the valve body 192. The output gear 195, the intermediate gear 197, the warm gear 198, the electric motor 39, and the potentiometer 199 are accommodated in the case 191.

Figure 6:
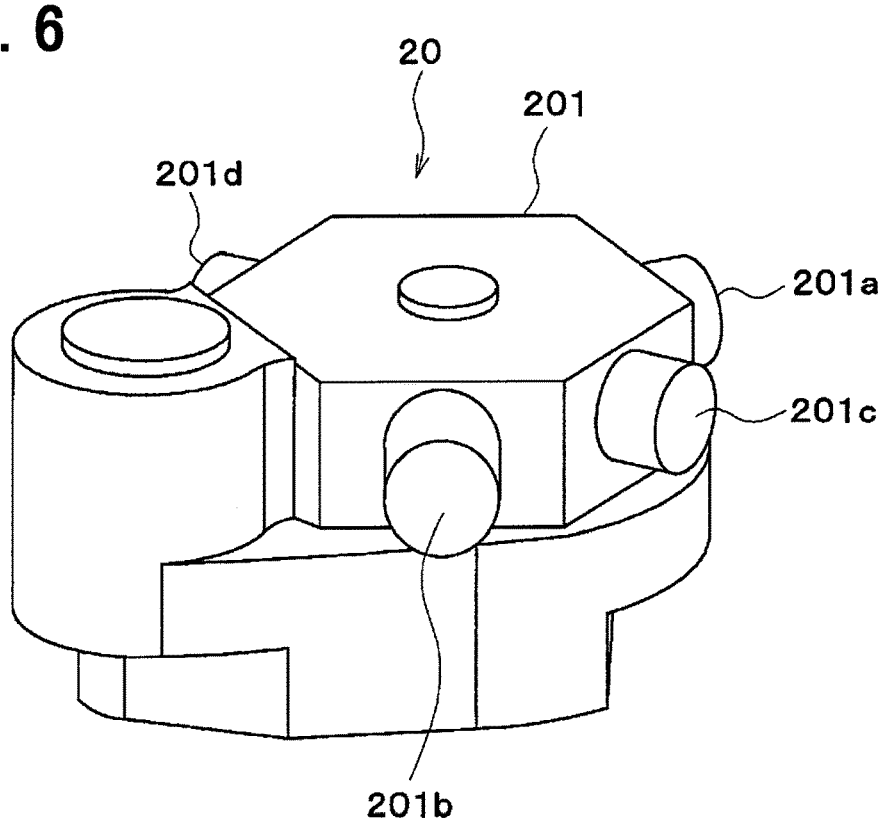
FIG. 6 is a perspective view of a second switching valve in the first embodiment.
Figure 7:
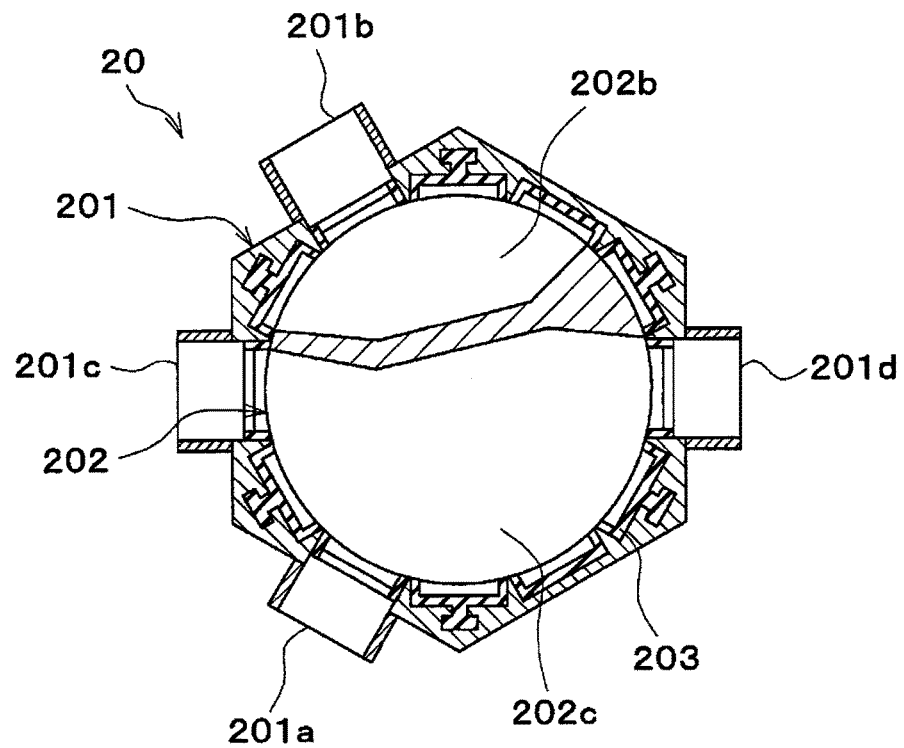
FIG. 7 is a cross-sectional view of the second switching valve in the first embodiment.

As illustrated in FIGS. 6 and 7, the second switching valve 20 includes a case 201 acting as an outer shell, and a valve body 202 (second-switching-valve valve body) accommodated in the case 201. FIG. 7 shows a cross section of the second switching valve 20 taken in the direction perpendicular to a rotation shaft (not shown) of the valve body 202.

The case 201 includes a first outlet 201a, a second outlet 201b, a first inlet 201c, and a second inlet 201d. As shown in FIG. 7, the first outlet 201a, the second outlet 201b, the first inlet 201c, and the second inlet 201d are formed at intervals of a predetermined angle in the rotational direction of the valve body 202.

The second outlet 201b is placed in a position rotated clockwise by 120 degrees from the first outlet 201a. The first inlet 201c is placed in a position rotated clockwise by 60 degrees from the first outlet 201a. The second inlet 201d is placed in a position rotated counterclockwise by 120 degrees from the first outlet 201a.

A seal packing 203 for preventing internal leak of the coolant is disposed at the inner peripheral surface of the case 201.

The valve body 202 has a shape with a first cutout portion 202b and a second cutout portion 202c formed at the outer peripheral surface of its column with its rotation shaft (not shown) centered. The first cutout portion 202b is formed across an area covering by approximately 120 degrees in the rotational direction of the valve body 202. The second cutout portion 202c is formed across an area covering by approximately 210 degrees in the rotational direction of the valve body 202. The first cutout portion 202b and the second cutout portion 202c can communicate with the first outlet 201a, the second outlet 201b, the first inlet 201c, and the second inlet 201d.

Although not shown, the rotation shaft of the valve body 202 protrudes from the case 201, and is coupled to the output gear outside the case 201. An O ring for preventing coolant leak is disposed between the rotation shaft of the valve body 202 and the case 201. The output gear is coupled to the output shaft of the electric motor via an intermediate gear and a warm gear. The rotation angle of the valve body 202 is detected by the potentiometer. The output gear, the intermediate gear, the warm gear, the electric motor, and the potentiometer are accommodated in the case 201.

Figure 8:
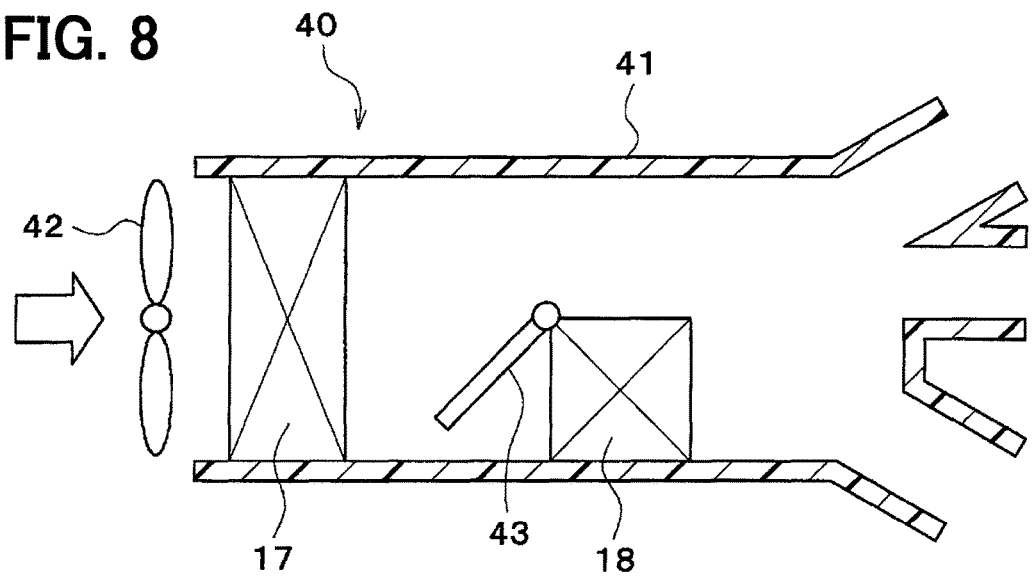
FIG. 8 is a schematic diagram of an interior air conditioning unit in the first embodiment.

As shown in FIG. 8, the cooler core 17 and the heater core 18 are accommodated in a casing 41 of an interior air conditioning unit. An interior blower 42 is an electric blower that blows the inside air (air in the vehicle compartment), the outside air, or a combination of the inside air and outside air to the cooler core 17 and the heater core 18.

The heater core 18 is disposed on the downstream side of the air flow of the cooler core 17 within the casing 41. An air mix door 43 is disposed in between the cooler core 17 and the heater core 18 within the casing 41.

The air mix door 43 serves as an air volume ratio adjuster that adjusts a ratio of the volume of the air passing through the heater core 18 to that of the air bypassing the heater core 18.

Figure 9:
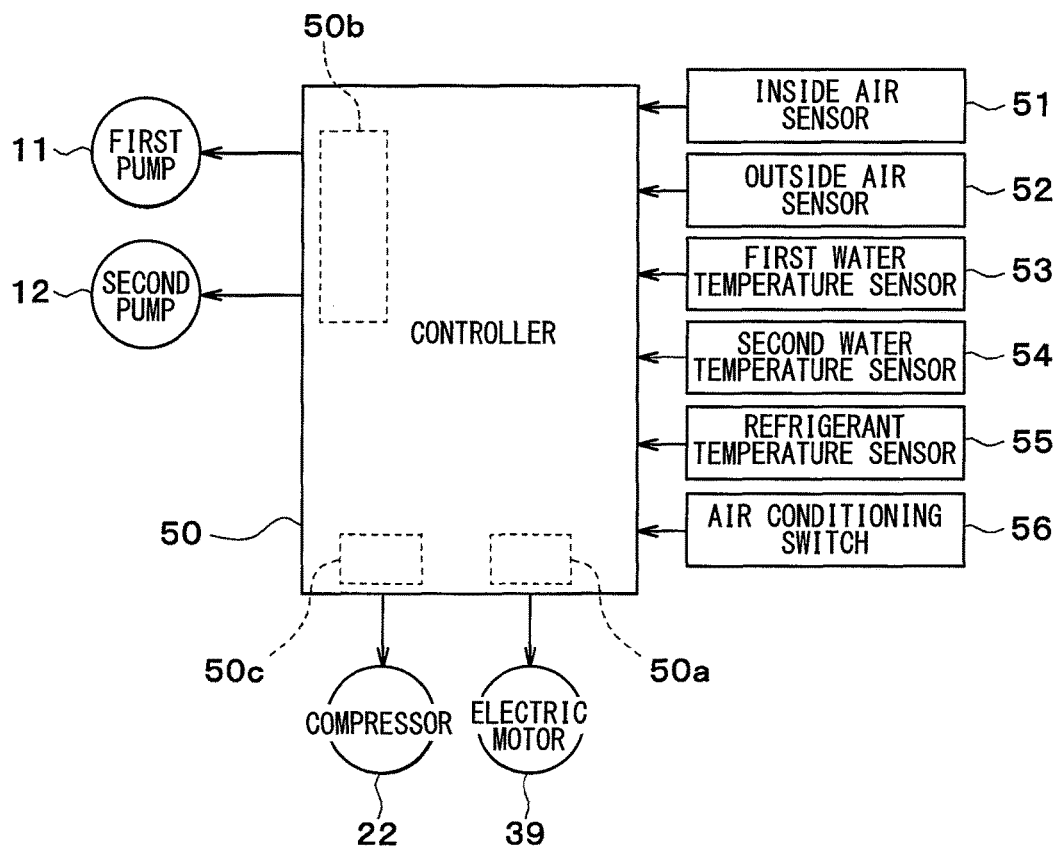
FIG. 9 is a block diagram showing an electric controller of the vehicle thermal management system in the first embodiment.

Now, an electric controller of the thermal management system 10 will be described with reference to FIG. 9. A controller 50 is comprised of a known microcomputer, including CPU, ROM, RAM, and the like, and a peripheral circuit thereof. The controller 50 is a control unit that controls the operations of the devices, including the first pump 11, the second pump 12, the compressor 22, a switching-valve electric motor 39, and the like, which are connected to its output side, by performing various kinds of computations and processing based on air conditioning control programs stored in the ROM.

The switching-valve electric motor 39 is a switching valve driving portion for driving the valve body of the first switching valve 19 and the valve body of the second switching valve 20. In this embodiment, the switching-valve electric motor 39 includes an electric motor for driving the valve body of the first switching valve 19 and another electric motor for driving the valve body of the second switching valve 20, which are separated from each other.

The controller 50 is integrally structured with the control unit for controlling various control target devices connected to the output side of the controller. The control unit for controlling the operation of each of the control target devices includes a structure (hardware and software) adapted to control the operation of each of the control target devices.

In this embodiment, particularly, the structure (hardware and software) that controls the operation of the switching-valve electric motor 39 is defined as a switching controller 50*a*. The switching controller 50*a* may be provided independently of the controller 50.

The structure (hardware and software) that controls the operations of the first pump 11 and the second pump 12 is defined as a pump controller 50*b*. The pump controller 50*b* may be provided independently of the controller 50.

The structure (hardware and software) that controls the operation of the compressor 22 is defined as a compressor controller 50*c*. The compressor controller 50*c* may be provided independently of the controller 50.

Detection signals from a group of sensors, including an inside air sensor 51, an outside air sensor 52, a first water temperature sensor 53, a second water temperature sensor 54, a refrigerant temperature sensor 55, and the like are input to the input side of the controller 50.

The inside air sensor 51 is a detector (inside air temperature detector) that detects the temperature of inside air (or the temperature of the vehicle interior). The outside air sensor 52 is a detector (outside air temperature detector) that detects the temperature of outside air (or the temperature of the vehicle exterior).

The first water temperature sensor 53 is a detector (first heat medium temperature detector) that detects the temperature of coolant flowing through the first-pump flow path 31 (for example, the temperature of coolant drawn into the first pump 11).

The second water temperature sensor 54 is a detector (second heat medium temperature detector) that detects the temperature of coolant flowing through the second-pump flow path 32 (for example, the temperature of coolant drawn into the second pump 12).

The refrigerant temperature sensor 55 is a detector (refrigerant temperature detector) that detects the refrigerant temperature (for example, the temperature of refrigerant discharged from the compressor 22) in the refrigeration cycle 21.

Note that the inside air temperature, the outside air temperature, the coolant temperature, and the refrigerant temperature may be estimated based on detection values of various physical quantities.

An operation signal is input from an air conditioning switch 56 to the input side of the controller 50. The air conditioning switch 56 is a switch for switching an air conditioner between on and off (in short, on and off of cooling), and disposed near a dash board in the vehicle compartment.

Now, the operation of the above-mentioned structure will be described. The controller 50 controls the operations of the first pump 11, the second pump 12, the compressor 22, the switching-valve electric motor 39, and the like, thereby switching among various operation modes. Various operation modes include, for example, a first mode shown in FIG. 10, a second mode shown in FIG. 11, a third mode shown in FIG. 12, a fourth mode shown in FIG. 13, a fifth mode shown in FIG. 14, a sixth mode shown in FIG. 15, and a seventh mode shown in FIG. 16.

Figure 10:
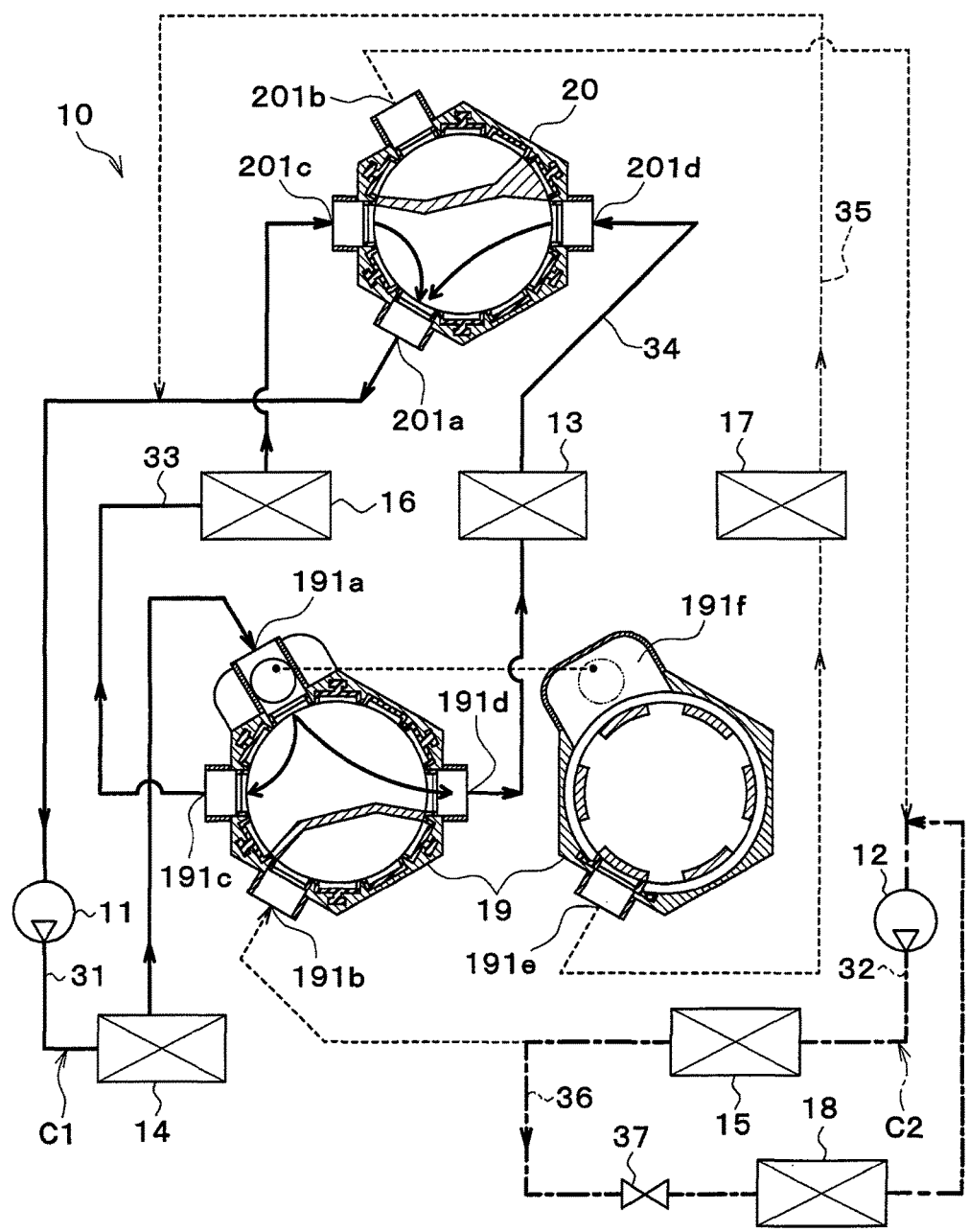
FIG. 10 is an entire configuration diagram for explaining a first mode of the vehicle thermal management system in the first embodiment.

In the first mode shown in FIG. 10, the first switching valve 19 allows the first inlet 191*a* to communicate with the first outlet 191*c* and the second outlet 191*d*, and closes the second inlet 191*b* and the third outlet 191*e*.

The second switching valve 20 allows the first outlet 201*a* to communicate with the first inlet 201*c* and the second inlet 201*d*, and closes the second outlet 201*b*. The opening/closing valve 37 opens the heater-core flow path 36.

Thus, a first coolant circuit C1 (first heat medium circuit) is formed in which the coolant circulates through the first pump 11, the coolant cooler 14, the radiator 13 and device 16, and the first pump 11 in this order. Further, a second coolant circuit C2 (second heat medium circuit) is also formed in which the coolant circulates through the second pump 12, the coolant heater 15, the heater core 18, and the second pump 12 in this order.

In the first mode, the coolant cooled by the coolant cooler 14 flows through the radiator 13 and the device 16, whereby heat of the outside air is absorbed in the coolant at the radiator 13, thereby cooling the device 16.

The coolant heated by the coolant heater 15 flows through the heater core 18, thereby heating the ventilation air into the vehicle interior, at the heater core 18. Thus, the vehicle interior can be heated by a heat pump operation which includes absorbing heat from the outside air.

Figure 11:
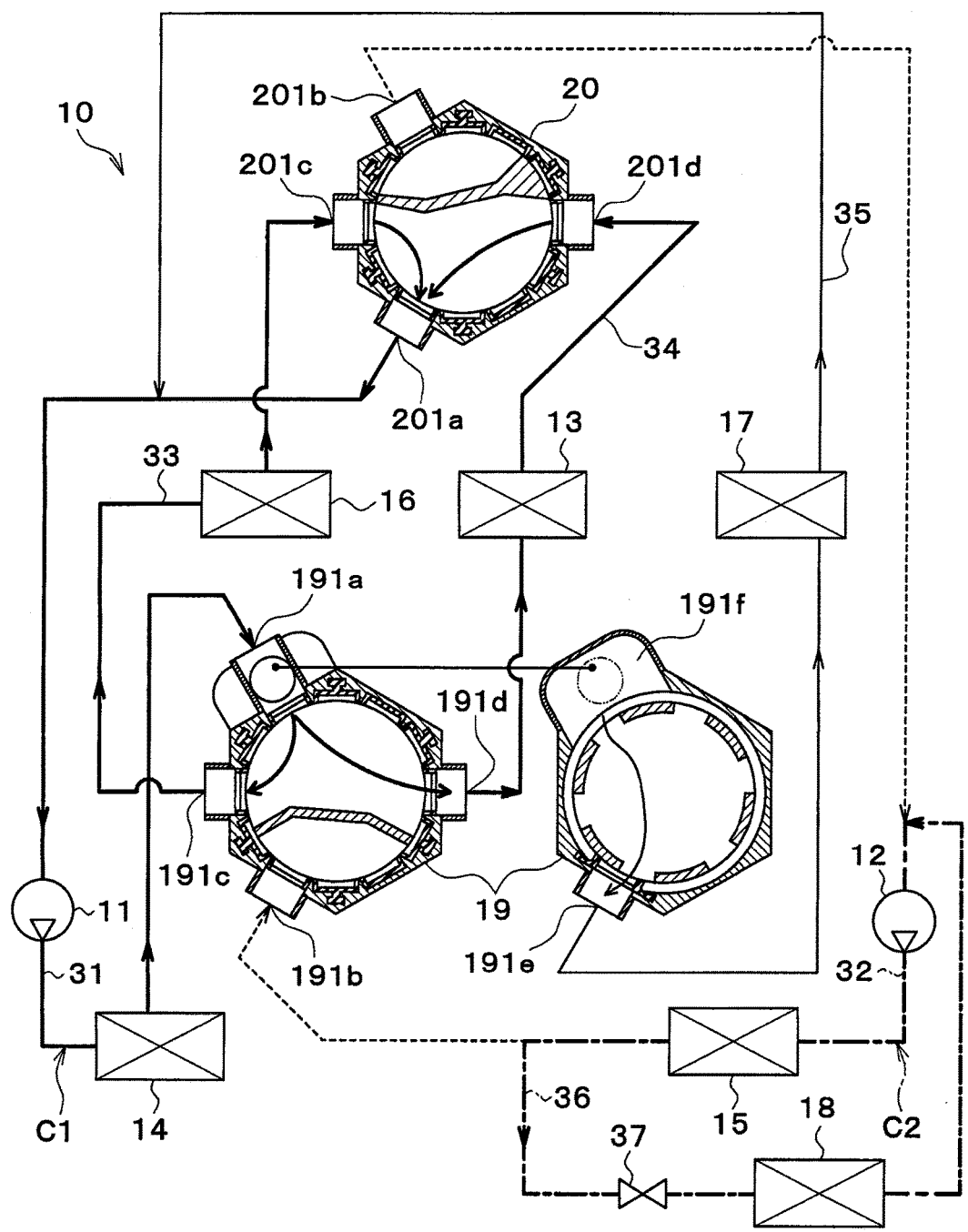
FIG. 11 is an entire configuration diagram for explaining a second mode of the vehicle thermal management system in the first embodiment.

In the second mode shown in FIG. 11, the first switching valve 19 allows the first inlet 191*a* to communicate with the first outlet 191*c*, the second outlet 191*d*, and the third outlet 191*e*, and closes the second inlet 191*b*. The second switching valve 20 allows the first outlet 201*a* to communicate with the first inlet 201*c* and the second inlet 201*d*, and closes the second outlet 201*b*. The opening/closing valve 37 opens the heater-core flow path 36. At this time, the first switching valve 19 sets the third outlet 191*e* at an intermediate opening degree.

Thus, the first coolant circuit C1 is formed in which the coolant circulates through the first pump 11, the coolant cooler 14, the radiator 13, the device 16 and cooler core 17, and the first pump 11 in this order. Further, the second coolant circuit C2 is also formed in which the coolant circulates through the second pump 12, the coolant heater 15, the heater core 18, and the second pump 12 in this order.

In the second mode, the coolant cooled by the coolant cooler 14 flows through the radiator 13 and the device 16, whereby heat of the outside air is absorbed in the coolant at the radiator 13, thereby cooling the device 16. Further, the coolant cooled by the coolant cooler 14 flows through the cooler core 17, thereby cooling the ventilation air into the vehicle interior, at the cooler core 17.

The coolant heated by the coolant heater 15 flows through the heater core 18, thereby heating the ventilation air into the vehicle interior, at the heater core 18. Thus, the ventilation air into the vehicle compartment is cooled and dehumidified by the cooler core 17 to be heated by the heater core 18, so that the dehumidification and heating can be performed.

The first switching valve 19 sets the third outlet 191*e* at an intermediate opening degree, so that the flow rate of coolant flowing through the cooler core 17 can be adjusted. By adjusting the flow rate of coolant flowing through the cooler core 17, an air cooling capacity of the cooler core 17 can also be adjusted. Thus, the dehumidification amount of the cooler core 17 can be adjusted, while the frost can be prevented from being formed on the surface of the cooler core 17 when the temperature of coolant flowing through the cooler core 17 is less than 0° C.

Figure 12:
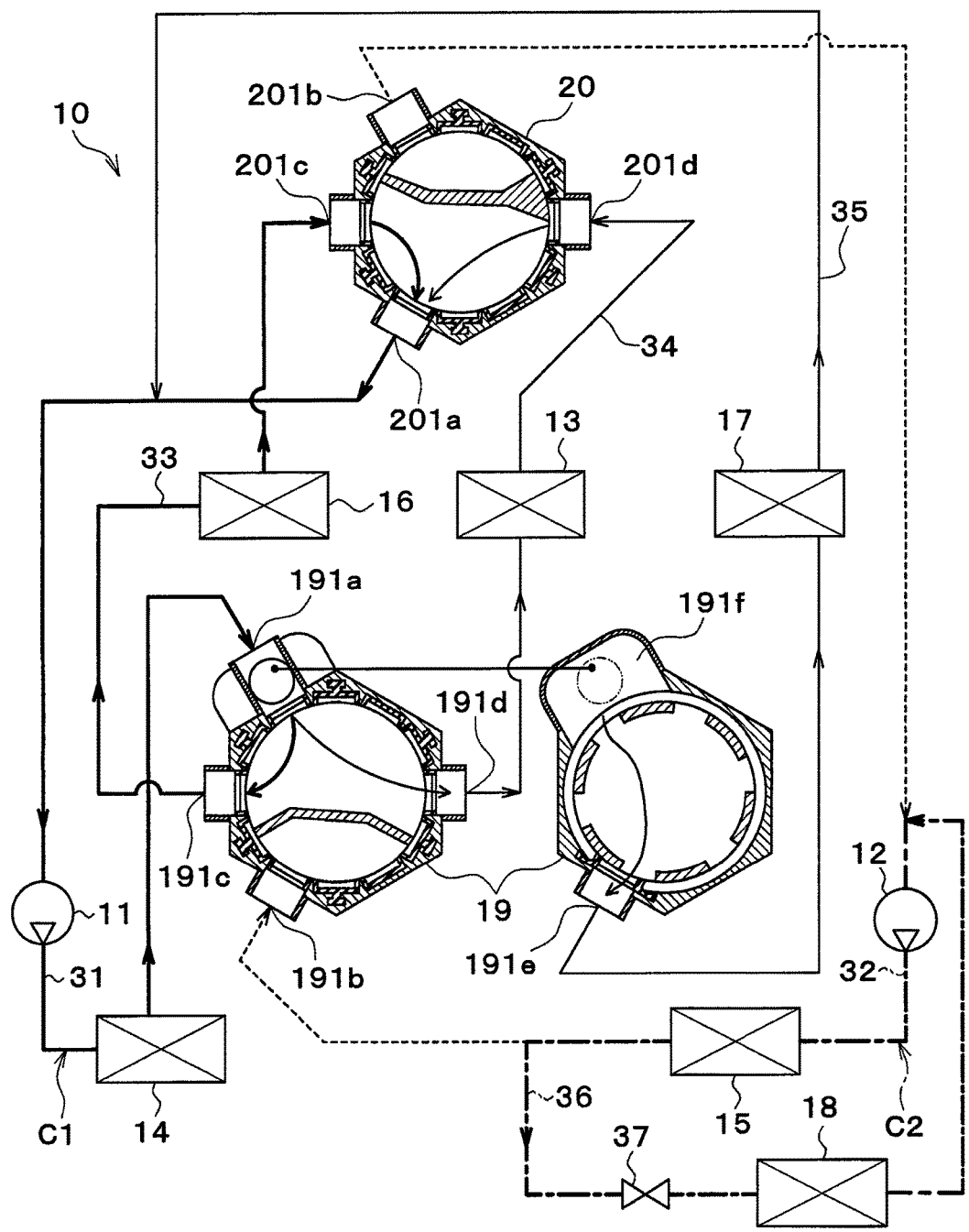
FIG. 12 is an entire configuration diagram for explaining a third mode of the vehicle thermal management system in the first embodiment.

In the third mode shown in FIG. 12, the first switching valve 19 allows the first inlet 191a to communicate with the first outlet 191c, the second outlet 191d, and the third outlet 191e, and closes the second inlet 191b. The second switching valve 20 allows the first outlet 201a to communicate with the first inlet 201c and the second inlet 201d, and closes the second outlet 201b. The opening/closing valve 37 opens the heater-core flow path 36. At this time, the first switching valve 19 sets the third outlet 191e at an intermediate opening degree, and the second switching valve 20 sets the second inlet 201d at an intermediate opening degree.

In this way, like the second mode, the first coolant circuit C1 and the second coolant circuit C2 can be formed to perform the dehumidification and heating. Like the second mode, the first switching valve 19 sets the third outlet 191e at an intermediate opening degree, so that the flow rate of the coolant flowing through the cooler core 17 can be adjusted.

The second switching valve 20 sets the second inlet 201d at an intermediate opening degree, so that the flow rate of the coolant flowing through the radiator 13 can be adjusted. By adjusting the flow rate of coolant flowing through the radiator 13, an amount of heat dissipated from the radiator 13 can also be adjusted. Thus, the temperature of coolant flowing through the heater core 18 can be kept at an appropriate level even when the coolant is excessively heated by the coolant heater 15.

Figure 13:
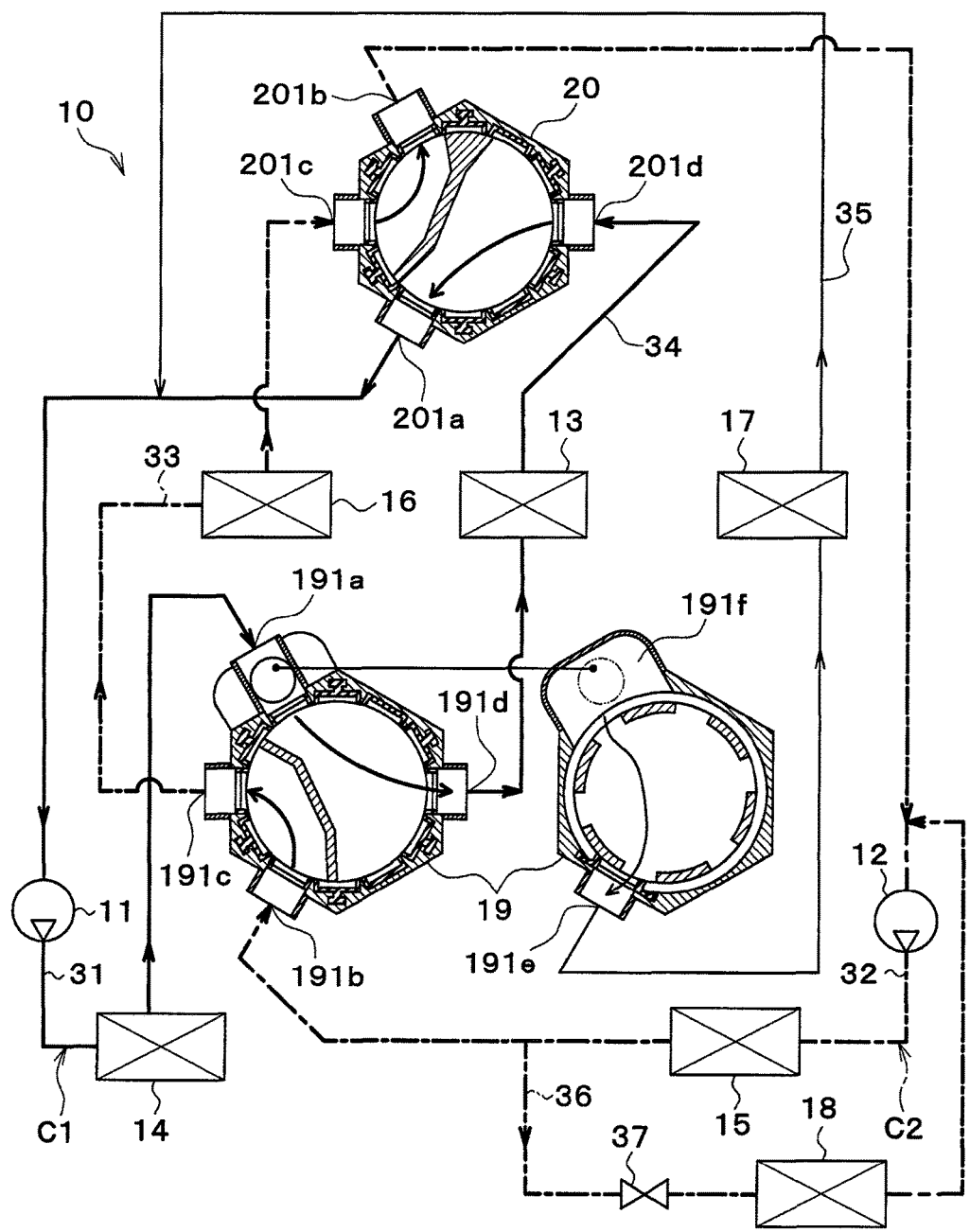
FIG. 13 is an entire configuration diagram for explaining a fourth mode of the vehicle thermal management system in the first embodiment.

In the fourth mode shown in FIG. 13, the first switching valve 19 allows the first inlet 191a to communicate with the second outlet 191d and the third outlet 191e, and also allows the second inlet 191b to communicate with the first outlet 191c. The second switching valve 20 allows the first outlet 201a to communicate with the second inlet 201d, and also allows the second outlet 201b to communicate with the first inlet 201c. The opening/closing valve 37 opens the heater-core flow path 36. At this time, the first switching valve 19 sets the third outlet 191e at an intermediate opening degree.

Thus, the first coolant circuit C1 is formed in which the coolant circulates through the first pump 11, the coolant cooler 14, the radiator 13 and cooler core 17, and the first pump 11 in this order. Further, the second coolant circuit C2 is also formed in which the coolant circulates through the second pump 12, the coolant heater 15, the device 16 and heater core 18, and the second pump 12 in this order.

The coolant cooled by the coolant cooler 14 flows through the radiator 13, allowing the heat of the outside air to be absorbed in the coolant at the radiator 13. Further, the coolant cooled by the coolant cooler 14 flows through the cooler core 17, thereby cooling the ventilation air into the vehicle interior, at the cooler core 17.

The coolant heated by the coolant heater 15 flows through the device 16, thereby heating the device 16. Further, the coolant heated by the coolant heater 15 flows through the heater core 18, thereby heating the ventilation air into the vehicle interior at the heater core 18.

Thus, the ventilation air into the vehicle compartment is cooled and dehumidified by the cooler core 17 and heated by the heater core 18, so that the dehumidification and heating can be performed.

The first switching valve 19 sets the third outlet 191e at an intermediate opening degree, so that the flow rate of the coolant flowing through the cooler core 17 can be adjusted.

Figure 14:
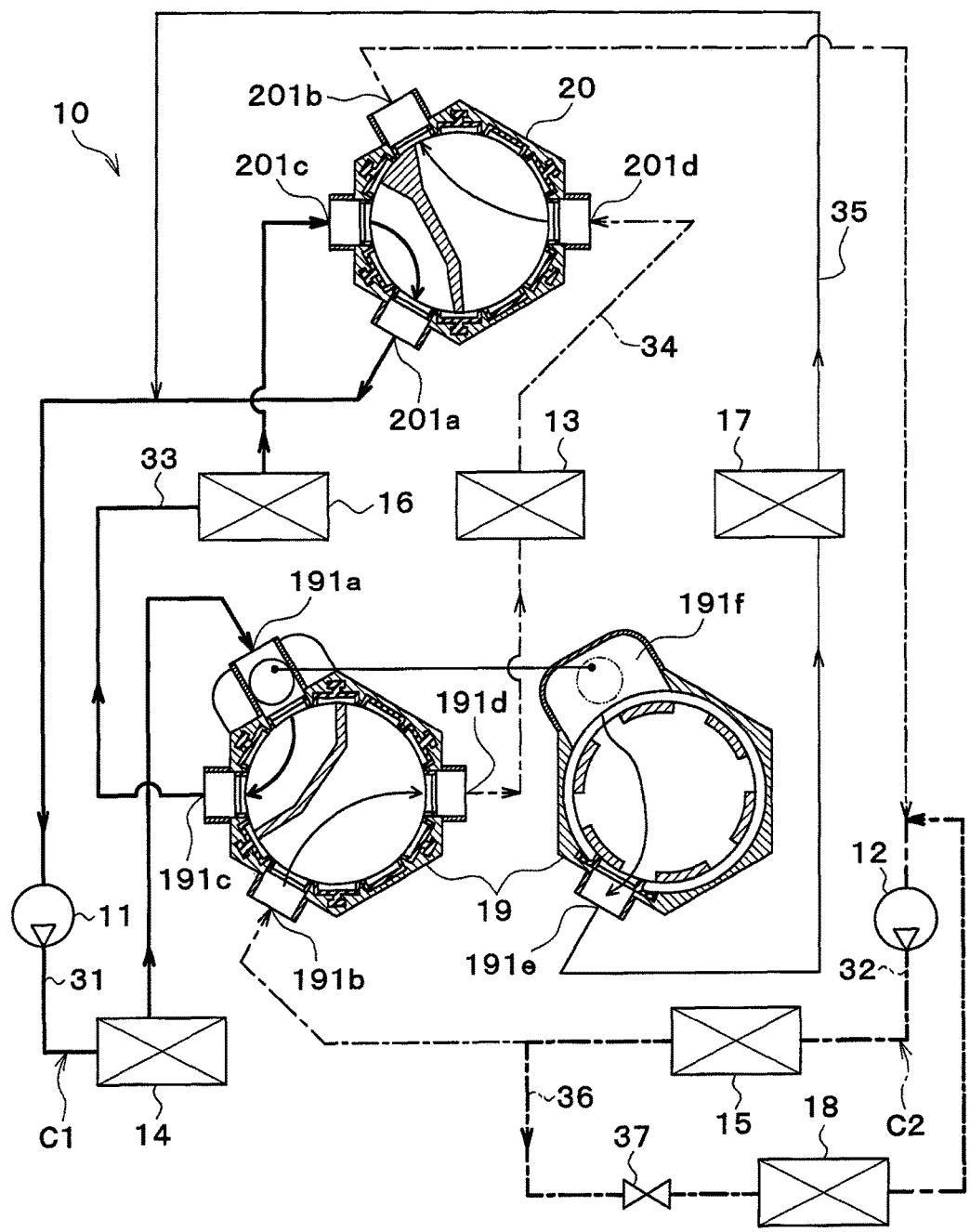
FIG. 14 is an entire configuration diagram for explaining a fifth mode of the vehicle thermal management system in the first embodiment.

In the fifth mode shown in FIG. 14, the first switching valve 19 allows the first inlet 191a to communicate with the first outlet 191c and the third outlet 191e, and also allows the second inlet 191b to communicate with the second outlet 191d. The second switching valve 20 allows the first outlet 201a to communicate with the first inlet 201c, and also allows the second outlet 201b to communicate with the second inlet 201d. The opening/closing valve 37 opens the heater-core flow path 36. At this time, the first switching valve 19 sets the third outlet 191e at an intermediate opening degree, and the second switching valve 20 sets the second outlet 201b at an intermediate opening degree.

Thus, the first coolant circuit C1 is formed in which the coolant circulates through the first pump 11, the coolant cooler 14, the device 16 and cooler core 17, and the first pump 11 in this order. Further, the second coolant circuit C2 is also formed in which the coolant circulates through the second pump 12, the coolant heater 15, the radiator 13 and heater core 18, and the second pump 12 in this order.

The coolant cooled by the coolant cooler 14 flows through the device 16, thereby cooling the device 16. Further, the coolant cooled by the coolant cooler 14 flows through the cooler core 17, thereby cooling the ventilation air into the vehicle interior, at the cooler core 17.

The coolant heated by the coolant heater 15 flows through the radiator 13, allowing the coolant to dissipate heat from the radiator 13 into the outside air. Further, the coolant heated by the coolant heater 15 flows through the heater core 18, thereby heating the ventilation air into the vehicle interior, at the heater core 18.

Thus, the ventilation air into the vehicle interior is dehumidified by the cooler core 17 and then heated by the heater core 18, so that the dehumidification and heating can be performed.

The first switching valve 19 sets the third outlet 191e at an intermediate opening degree, so that the flow rate of the coolant flowing through the cooler core 17 can be adjusted. In the fifth mode, the second switching valve 20 sets the second outlet 201b at an intermediate opening degree, so that the flow rate of the coolant flowing through the radiator 13 can be adjusted. By adjusting the flow rate of coolant flowing through the radiator 13, an amount of heat dissipated from the radiator 13 can also be adjusted. Thus, the temperature of coolant flowing through the heater core 18 can be kept at an appropriate level even when the coolant is excessively heated by the coolant heater 15.

Figure 15:
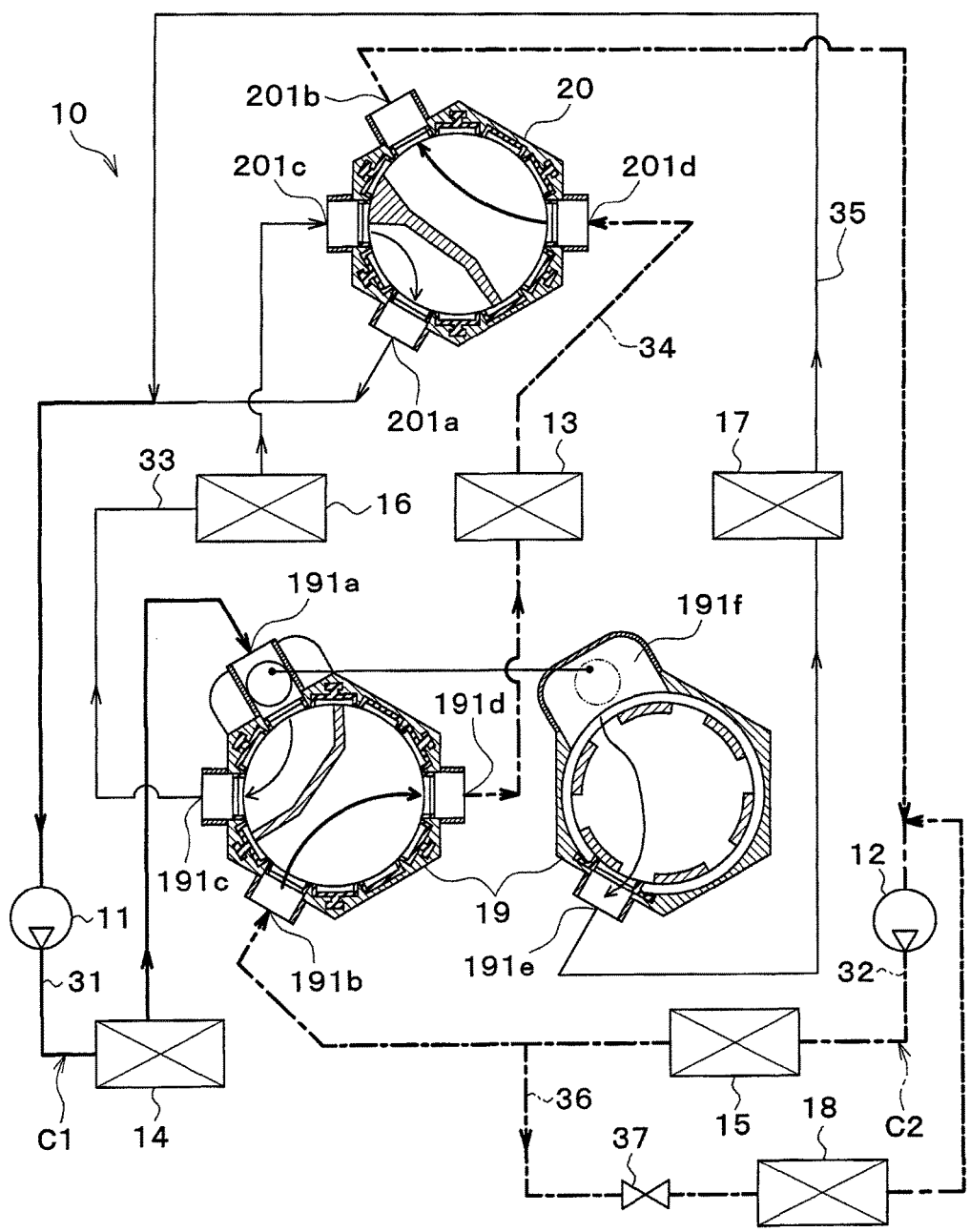
FIG. 15 is an entire configuration diagram for explaining a sixth mode of the vehicle thermal management system in the first embodiment.

In a sixth mode shown in FIG. 15, the first switching valve 19 allows the first inlet 191a to communicate with the first outlet 191c and the third outlet 191e, and also allows the second inlet 191b to communicate with the second outlet 191d. The second switching valve 20 allows the first outlet 201a to communicate with the first inlet 201c and also allows the second outlet 201b to communicate with the second inlet 201d. The opening/closing valve 37 opens the heater-core flow path 36. At this time, the first switching valve 19 sets the third outlet 191e at an intermediate opening degree, and the second switching valve 20 sets the first inlet 201c at an intermediate opening degree.

In this way, like the fifth mode, the first coolant circuit C1 and the second coolant circuit C2 are formed to perform the dehumidification and heating while cooling the device 16.

The first switching valve 19 sets the third outlet 191e at an intermediate opening degree, so that the flow rate of the coolant flowing through the cooler core 17 can be adjusted. In the sixth mode, the second switching valve 20 sets the first inlet 201c at an intermediate opening degree, so that the flow rate of the coolant flowing through the device 16 can be adjusted.

Figure 16:
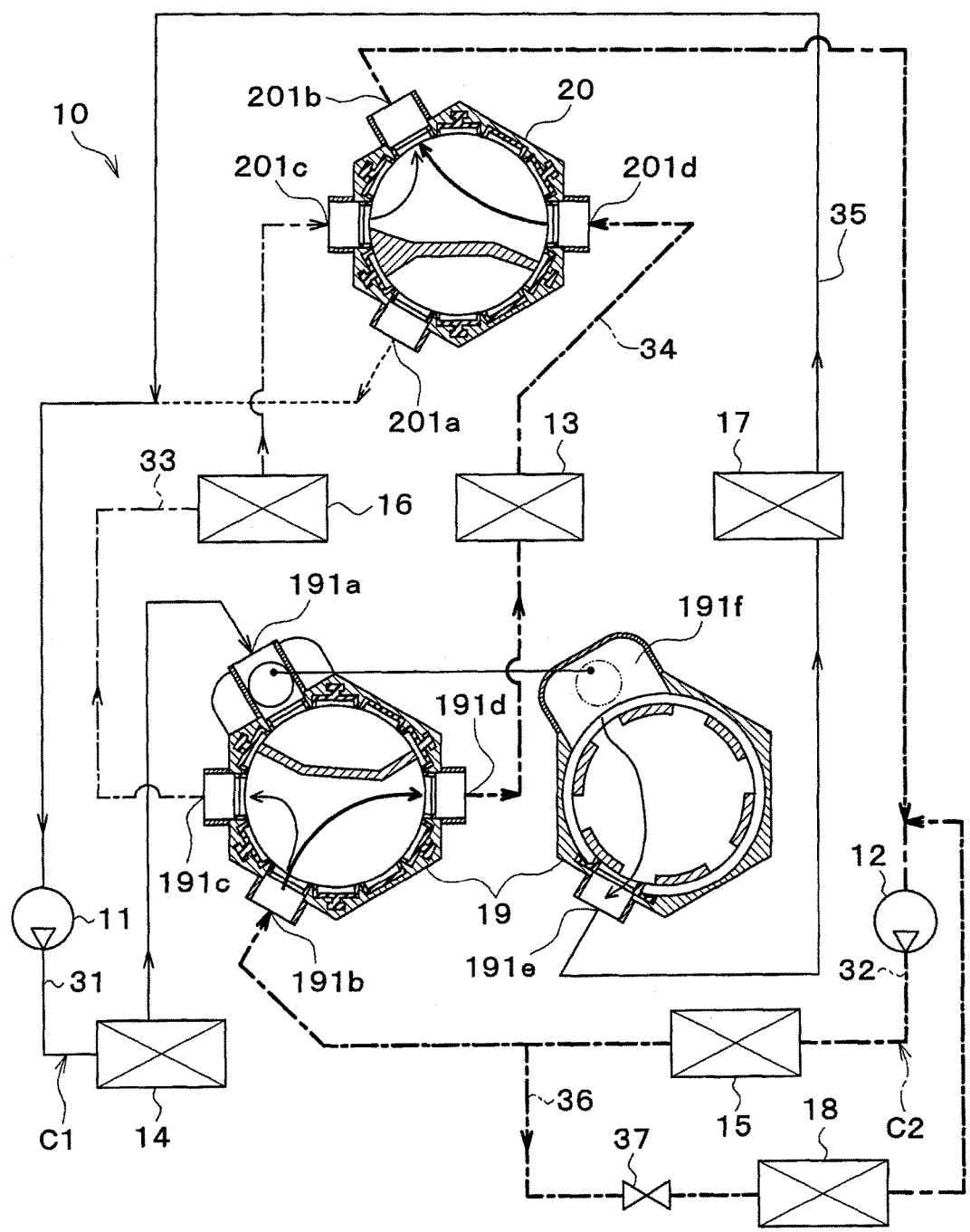
FIG. 16 is an entire configuration diagram for explaining a seventh mode of the vehicle thermal management system in the first embodiment.

In a seventh mode shown in FIG. 16, the first switching valve 19 allows the first inlet 191a to communicate with the third outlet 191e, and also allows the second inlet 191b to communicate with the first outlet 191c and the second outlet 191d. The second switching valve 20 closes the first outlet 201a and allows the second outlet 201b to communicate with the first inlet 201c and the second inlet 201d. The opening/closing valve 37 opens the heater-core flow path 36. In the seventh mode, the first switching valve 19 sets the third outlet 191e at an intermediate opening degree, and the second switching valve 20 sets the first inlet 201c at an intermediate opening degree.

Thus, a first coolant circuit C1 is formed in which the coolant circulates through the first pump 11, the coolant cooler 14, the cooler core 17, and the first pump 11 in this order. Further, a second coolant circuit C2 is also formed in which the coolant circulates through the second pump 12, the coolant heater 15, the device 16, radiator 13 and heater core 18, and the second pump 12 in this order.

The coolant cooled by the coolant cooler 14 flows through the cooler core 17, thereby cooling the ventilation air into the vehicle interior at the cooler core 17.

The coolant heated by the coolant heater 15 flows through the device 16 and the radiator 13, allowing the coolant to dissipate heat from the radiator 13 into the outside air while heating the device 16. Further, the coolant heated by the coolant heater 15 flows through the heater core 18, thereby heating the ventilation air into the vehicle interior at the heater core 18.

Thus, the ventilation air into the vehicle compartment is cooled and dehumidified by the cooler core 17 and then heated by the heater core 18, so that the dehumidification and heating can be performed.

The first switching valve 19 sets the third outlet 191e at an intermediate opening degree, so that the flow rate of the coolant flowing through the cooler core 17 can be adjusted. In the seventh mode, the second switching valve 20 sets the first inlet 201c at an intermediate opening degree, so that the flow rate of the coolant flowing through the device 16 can be adjusted.

In this embodiment, the first switching valve 19 and the second switching valve 20 are connected to at least one of devices 13, 14, 15, and 16 through which the coolant circulates. Thus, this simple structure can switch the heat medium circulating through at least one device of the devices 13, 14, 15, and 16.

The coolant outlet side of the cooler core 17 is connected to between the second switching valve 20 and the coolant cooler 14, so that the coolant circulating through the coolant cooler 14 can circulate through the cooler core 17 without providing a port for the cooler core 17 in the second switching valve 20. Thus, the structure of the second switching valve 20 can be simplified.

Note that when one of the coolant inlet side (heat medium inlet side) and the coolant outlet side (heat medium outlet side) of the cooler core 17 is connected to between one of the first and second switching valves 19 and 20 and the coolant cooler 14, the coolant circulating through the coolant cooler 14 is allowed to circulate through the cooler core 17 without providing a port for the cooler core 17 in the one switching valve, which can simplify the structure of the one switching valve.

Thus, the cooler core 17 corresponds to the "second device" as described in the accompanied claims, and the coolant cooler 14 corresponds to the "first device" as described in the accompanied claims.

In this embodiment, the coolant inlet side of the heater core 18 is connected to between the first switching valve 19 and the coolant heater 15, so that the coolant circulating through the coolant heater 15 can circulate through the heater core 18 without providing a port for the heater core 18 in the first switching valve 19. Thus, the structure of the first switching valve 19 can be simplified.

Note that when one of the coolant inlet side (heat medium inlet side) and the coolant outlet side (heat medium outlet side) of the heater core 18 is connected to between one of the first and second switching valves 19 and 20 and the coolant heater 15, the coolant circulating through the coolant heater 15 is allowed to circulate through the heater core 18 without providing a port for the heater core 18 in the one switching valve, which can simplify the structure of the one switching valve.

Thus, the heater core 18 corresponds to the "second device" as described in the accompanied claims, and the coolant heater 15 corresponds to the "first device" as described in the accompanied claims.

The coolant cooler 14 is disposed between the first pump 11 and the first switching valve 19, and the coolant inlet side of the cooler core 17 is connected to the first switching valve 19. Thus, the first switching valve 19 connects or disconnects the flow of coolant with respect to the cooler core 17, whereby the flow of coolant circulating through the coolant cooler 14 can be connected to or disconnected from the cooler core 17.

The coolant heater 15 is disposed between the second pump 12 and the first switching valve 19, and the coolant outlet side of the heater core 18 is connected to between the second switching valve 20 and the coolant heater 15. Further, an opening/closing valve 37 is provided for intermittently connecting the flow of the coolant with respect to the heater core 18. Thus, the opening/closing valve 37 can intermittently connect the flow of the coolant circulating through the coolant heater 15 with respect to the heater core 18.

At least one of the valve body 192 of the first switching valve 19 and the valve body 202 of the second switching valve 20 is capable of adjusting a time-averaged flow rate of the coolant flowing through at least a pair of ports connected to each other among the numerous ports 191a, 191b, 191c, and 191d of the first switching valve 19 and the numerous ports 201a, 201b, 201c, and 201d of the second switching valve 20.

Specifically, the valve body 192 of the first switching valve 19 and the valve body 202 of the second switching valve 20 are capable of opening at least a pair of ports at different opening degrees for the respective ports, the ports in the pair being connected to each other, among the numerous ports 191a, 191b, 191c, and 191d of the first switching valve 19 and the numerous ports 201a, 201b, 201c, and 201d of the second switching valve 20.

Even though a valve body of at least one of the first and second switching valves 19 and 20 intermittently opens and closes the port, the time-averaged flow rate of the coolant can be adjusted.

If one of the first and second switching valves 19 and 20 switches the flow path, and the other switching valve adjusts the flow rate, the first and second switching valves 19 and 20 can share a flow path switching function and a flow rate adjustment function. Thus, this embodiment can simplify the structure of the first and second switching valves 19 and 20, reducing the size of the body of the first and second switching valves 19 and 20, as compared to the case in which each of the first and second switching valves 19 and 20 has a flow path switching function and a flow rate adjustment function.

(Second Embodiment)

Figure 17:
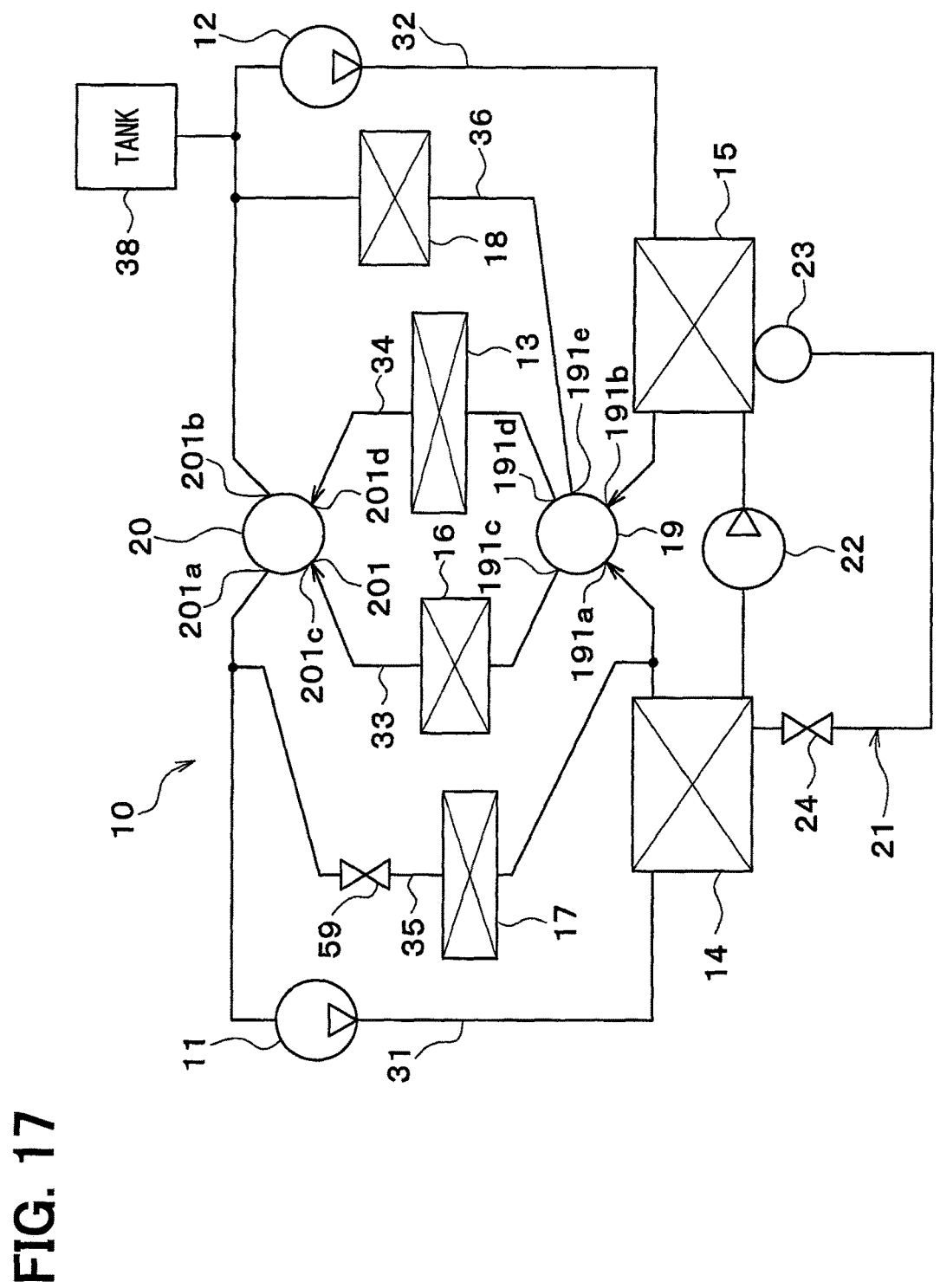
FIG. 17 is an entire configuration diagram of a vehicle thermal management system according to a second embodiment.

In the above-mentioned first embodiment, one end of the cooler-core flow path 35 is connected to the third outlet 191e of the first switching valve 19. On the other hand, in a second embodiment, as shown in FIG. 17, one end of the cooler-core flow path 35 is connected to a part between the coolant cooler 14 and the first switching valve 19 in the first-pump flow path 31, and an opening/closing valve 59 is disposed in the cooler-core flow path 35. The opening/closing valve 59 is a flow path opening/closing device that opens and closes the cooler-core flow path 35.

In the first embodiment, one end of the heater-core flow path 36 is connected to a part between the first switching valve 19 and the coolant heater 15 in the second-pump flow path 32. On the other hand, in the second embodiment as shown in FIG. 17, one end of the heater-core flow path 36 is connected to the third outlet 191e of the first switching valve 19.

In this embodiment, the coolant inlet side of the heater core 18 is connected to the first switching valve 19. Thus, the first switching valve 19 intermittently connects the flow of the coolant with respect to the heater core 18, so that the flow of coolant circulating through the coolant heater 15 can be intermittently connected with respect to the heater core 18.

The coolant outlet side of the cooler core 17 is connected to between the second switching valve 20 and the coolant cooler 14.

Further, the opening/closing valve 59 is provided for intermittently connecting the flow of the coolant with respect to the cooler core 17. Thus, the flow of the coolant circulating flowing through the coolant cooler 14, with respect to the cooler core 17 can be intermittently connected by the opening/closing valve 59.

(Third Embodiment)

Figure 18:
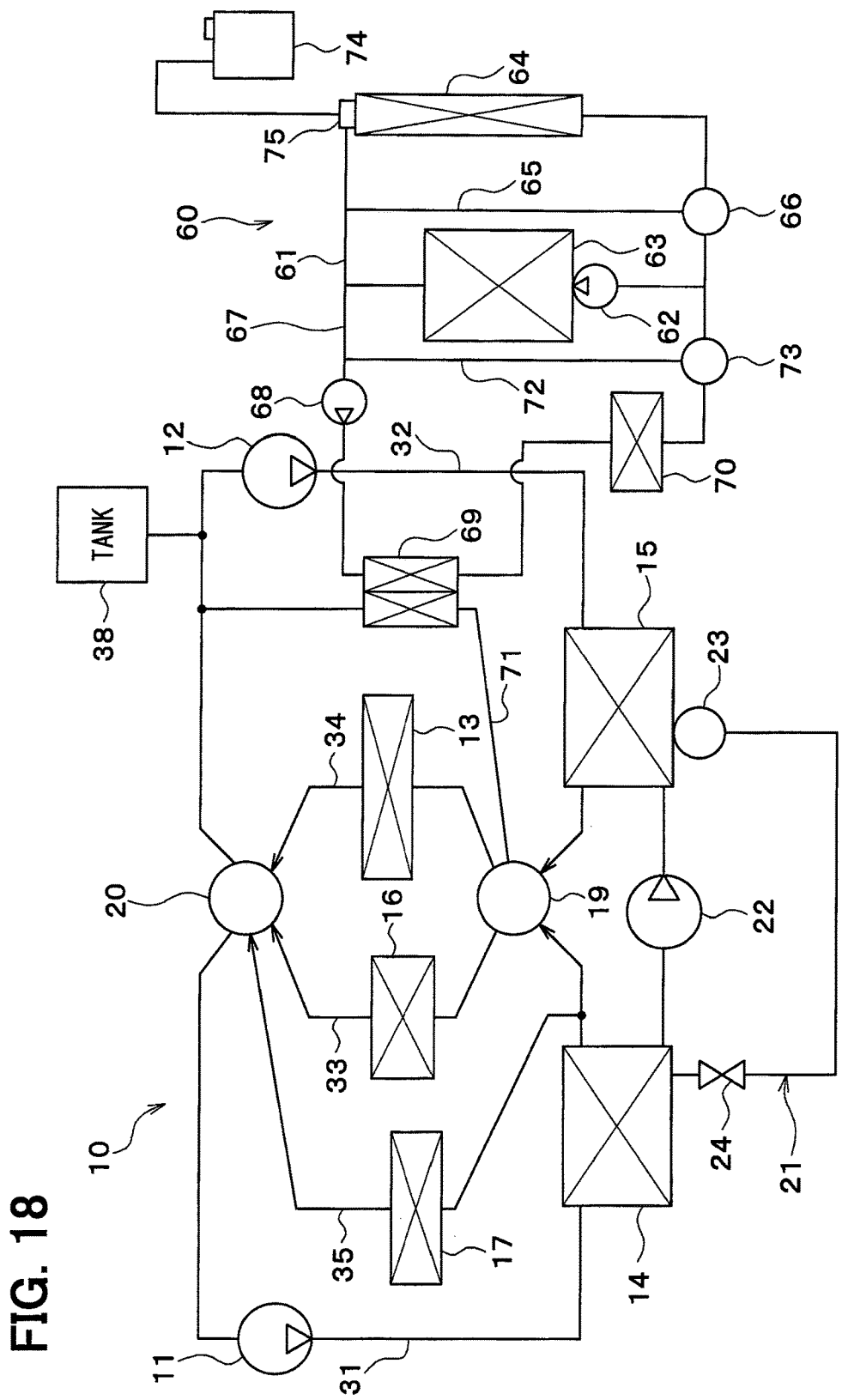
FIG. 18 is an entire configuration diagram of a vehicle thermal management system according to a third embodiment.

In a third embodiment, as shown in FIG. 18, the coolant inlet side of the cooler core 17 is connected to between the first switching valve 19 and the coolant cooler 14, the coolant outlet side of the cooler core 17 is connected to the second switching valve 20, the coolant inlet side of the heater core 18 is connected to the first switching valve 19, and the coolant outlet side of the heater core 18 is connected to between the second switching valve 20 and the coolant heater 15.

The first coolant circuit C1 and the second coolant circuit C2 are capable of cooperating with an engine cooling circuit 60.

The engine cooling circuit 60 includes a circulation flow path 61 that allows for circulation of the engine coolant (second heat medium). The circulation flow path 61 configures a main flow path of the engine cooling circuit 60. In this embodiment, a liquid containing at least ethylene glycol, dimethylpolysiloxane, or a nano-fluid is used as the engine coolant.

In the circulation flow path 61, an engine pump 62, an engine 63, and an engine radiator 64 are arranged in series in this order.

The engine pump 62 is an electric pump that draws and discharges an engine coolant. The engine radiator 64 is an engine heat dissipation device (engine heat medium-outside air heat exchanger) that exchanges heat between the coolant and the outside air to dissipate heat of the coolant into the outside air.

Although not shown, the engine radiator 64 is disposed on the downstream side in the outside air flow direction rather than the radiator 13, at the forefront part of the vehicle.

The circulation flow path 61 is connected to a radiator bypass flow path 65. The radiator bypass flow path 65 is an engine radiator bypass portion that allows the engine coolant to bypass the engine radiator 64.

The radiator bypass flow path 65 has its one end connected to a part positioned on the coolant outlet side of the engine 63 and on the coolant inlet side of the engine radiator 64 in the circulation flow path 61, as well as its other end connected to a part positioned on the coolant outlet side of the engine radiator 64 and on the coolant suction side of the engine pump 62 in the circulation flow path 61.

A thermostat 66 is disposed in a connection portion between the radiator bypass flow path 65 and the circulation flow path 61. The thermostat 66 is a coolant-temperature responsive valve constructed of a mechanical mechanism that is designed to open and close a coolant flow path by displacing a valve body using a thermo wax (temperature sensing member) whose volume changes in response to the temperature.

Specifically, when the temperature of coolant is below a predetermined temperature (for example, less than 80° C.), the thermostat 66 closes the radiator bypass flow path 65. When the temperature of coolant is higher than the predetermined temperature (for example, 80° C. or higher), the thermostat 66 opens the radiator bypass flow path 65.

The circulation flow path 61 is connected to a heater-core flow path 67. The heater-core flow path 67 has its one end connected to a part positioned on the coolant outlet side of the engine 63 and on the coolant inlet side of the engine radiator 64 in the circulation flow path 61, as well as its other end connected to a part positioned on the coolant outlet side of the engine radiator 64 and on the coolant inlet side of the engine pump 62 in the circulation flow path In the heater-core flow path 67, a sub-pump 68, a coolant-coolant heat exchanger 69, and a heater core 70 are arranged in series in this order.

The sub-pump 68 is an electric pump that draws and discharges the engine coolant. The coolant-coolant heat exchanger 69 is a heat exchanger (heat medium-heat medium heat exchanger) that exchanges heat between the engine coolant circulating through the engine cooling circuit 40 and the coolant circulating through a coolant-coolant heat exchanger flow path 71.

The coolant-coolant heat exchanger flow path 71 has one end thereof connected to the first switching valve 19 and the other end thereof connected to a part between the second switching valve 20 and the second pump 12 in the second-pump flow path 32.

The heater core 70 is a heating heat exchanger (air heater) that heats ventilation air into the vehicle interior by exchanging heat between the ventilation air into the vehicle interior and the engine coolant.

The heater-core flow path 67 is connected to an engine bypass flow path 72. The engine bypass flow path 72 is an engine bypass portion that allows the engine coolant to bypass the engine 63.

The engine bypass flow path 72 has one end thereof connected to the downstream side part of the heater core 70 in the heater-core flow path 67 and the other end thereof connected to the suction side part of the sub-pump 68 in the heater-core flow path 67.

An electric three-way valve 73 is disposed in the connection part between the heater-core flow path 67 and the engine bypass flow path 72. The three-way valve 73 is a flow path switch that switches between a coolant flow path for allowing the engine coolant flowing through the coolant-coolant heat exchanger 69 and the heater core 70 to flow toward the circulation flow path 61, and another coolant flow path for allowing the engine coolant flowing through the coolant-coolant heat exchanger 69 and the heater core 70 to flow toward the engine bypass flow path 72. The operation of the three-way valve 73 is controlled by the controller 50.

The circulation flow path 61 is connected to a closed-type reserve tank 74. The reserve tank 74 serves as a storage portion for storing therein the engine coolant, and also as a pressure holding portion for holding a pressure of the engine coolant in an appropriate range.

The closed-type reserve tank 74 is used to effectively hold the pressure of the engine coolant in a range of a preset value or less. The reserve tank 74 has a function of separating air bubbles mixed in the engine coolant into gas and liquid components. The reserve tank 74 has a pressure holding mechanism that holds the engine coolant at the appropriate pressure, against abnormal increase and decrease in pressure of the coolant that would otherwise be caused due to the expansion and contraction of the engine coolant together with the change in temperature of the engine coolant. Excessive engine coolant is stored in the reserve tank 74, which can suppress the decrease in liquid amount of the engine coolant circulating through the engine cooling circuit 60.

A pressurizing valve 75 is disposed in a connection portion between the reserve tank 74 and the circulation flow path 61. The pressurizing valve 75 is closed when the internal pressure of the circulation flow path 61 is lower than a preset pressure that is larger than the atmospheric pressure. On the other hand, the pressurizing valve 75 is open when the internal pressure of the circulation flow path 61 is equal to or higher than the preset pressure. When the internal pressure of the engine cooling circuit 60 is equal to or higher than the preset pressure, the engine coolant of the engine cooling circuit 60 is discharged to the reserve tank 74.

In this embodiment, the coolant heated by the coolant heater 15 and the device 16 can flow through the coolant-coolant heat exchanger 69, so that the heat of the coolant heater 15 and the device 16 can be supplied to the engine coolant in the engine cooling circuit 40.

When the traveling mode of the vehicle is an EV traveling mode in which the vehicle travels only with a driving force from the traveling electric motor while the engine 63 is stopped, the three-way valve 73 is operated such that the engine coolant circulates through the sub-pump 68, the coolant-coolant heat exchanger 69, the heater core 70, and the sub-pump 68 in this order. In this way, the ventilation air into the vehicle interior can be heated by the heater core 70 to thereby perform air heating of the vehicle interior.

When a remaining battery level becomes a little upon the EV traveling mode, and the engine start-up timing is coming, the three-way valve 73 is operated such that the engine coolant flowing through the coolant-coolant heat exchanger 69 flows into the engine 63, whereby waste heat from the device 16 can be supplied to the engine 63 to warm up the engine 63. Before starting up the engine 63, the engine is warmed up, which exhibits an effect of improvement of fuel efficiency upon start-up of the engine.

The coolant inlet side (heat medium inlet side) of the cooler core 17 is connected to between the first switching valve 19 and the coolant cooler 14, the coolant outlet side (heat medium outlet side) of the cooler core 17 is connected to the second switching valve 20, the coolant inlet side (heat medium inlet side) of the heater core 18 is connected to the first switching valve 19, and the coolant outlet side (heat medium outlet side) of the heater core 18 is connected to between the second switching valve 20 and the coolant heater 15.

Accordingly, the second switching valve 20 does not need any port for the cooler core 17, and the first switching valve 19 does not need any port for the heater core 18. Thus, the structure of the first switching valve 19 and the second switching valve 20 can be simplified. By setting the number of ports of the first switching valve 19 to the same as that of ports of the second switching valve 20, the structure of the first switching valve 19 can be made common to that of the second switching valve 20.

Therefore, the cooler core 17 corresponds to a "second device" as described in the claims, the coolant cooler 14 corresponds to a "first device" as described in the claims, the heater core 18 corresponds to a "fourth device" as described in the claims, and the coolant heater 15 corresponds to a "third device" as described in the claims.

(Fourth Embodiment)

Figure 19:
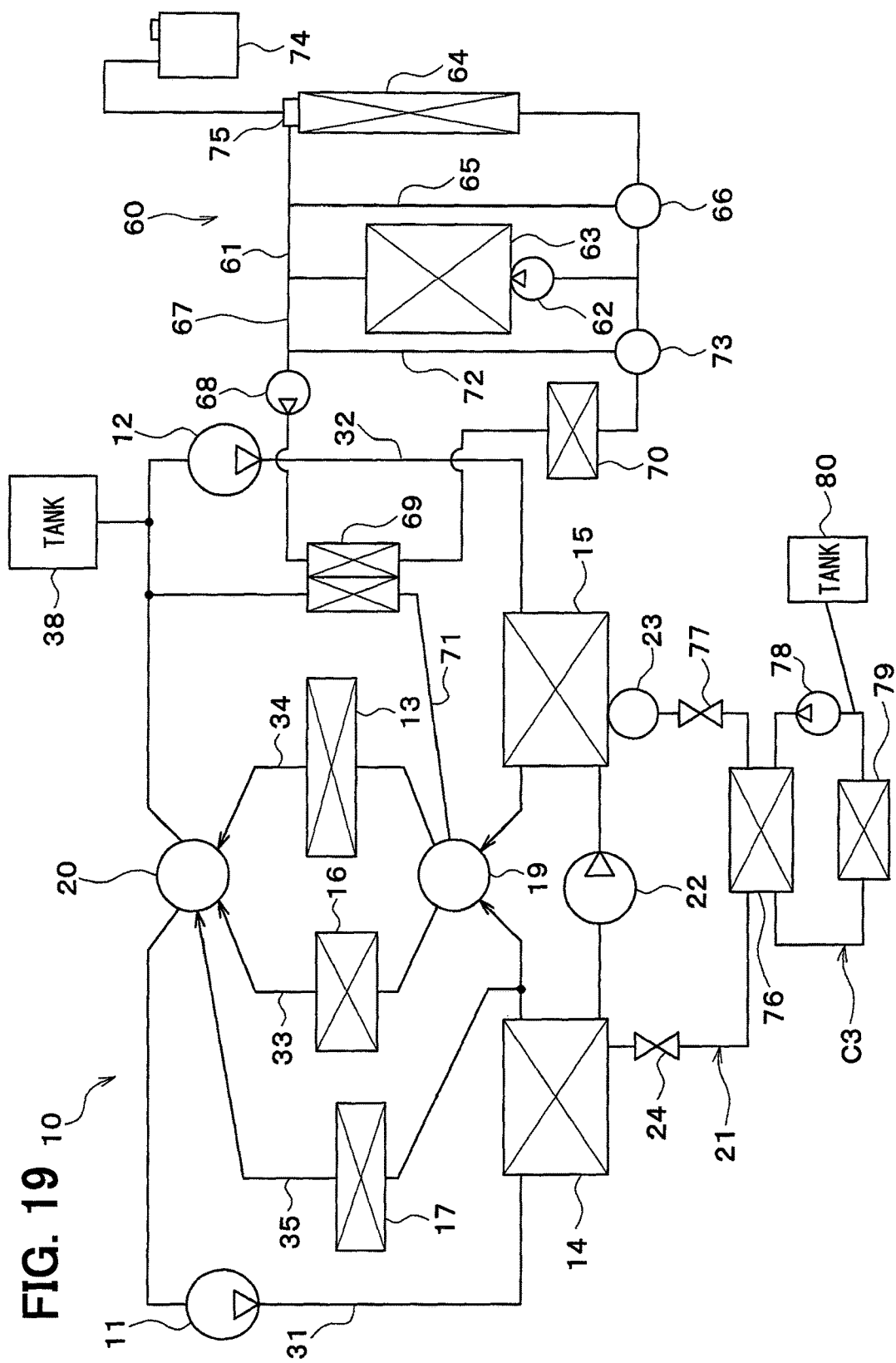
FIG. 19 is an entire configuration diagram of a vehicle thermal management system according to a fourth embodiment.

In a fourth embodiment, as shown in FIG. 19, an intermediate-pressure heat exchanger 76 is added to the refrigeration cycle 21, as compared to the structure of the above third embodiment. The intermediate-pressure heat exchanger 76 is a heat exchanger that exchanges heat between an intermediate-pressure refrigerant decompressed and expanded by an intermediate-pressure expansion valve 77 and the coolant (third heat medium) in a third coolant circuit C3. The intermediate-pressure expansion valve 77 is a decompression device that decompresses and expands a liquid-phase refrigerant flowing out of the receiver 23. The liquid-phase refrigerant flowing out of the intermediate-pressure heat exchanger 76 is decompressed and expanded by the expansion valve 24.

In a circulation flow path configuring the third coolant circuit C3, a third pump 78 and a battery 79 are disposed. Instead of the battery 79, various devices (temperature adjustment target device) that transfer heat with the coolant may be disposed in the circulation flow path configuring the third coolant circuit C3.

The circulation flow path configuring the third coolant circuit C3 is connected to a closed-type reserve tank 80. The reserve tank 80 serves as a storage portion for storing therein the coolant, and also as a pressure holding portion for holding a pressure of the coolant in an appropriate range.

The closed-type reserve tank 80 is used to effectively hold the pressure of the coolant in a range of a preset value or less. The reserve tank 80 has a function of separating the air bubbles mixed in the coolant, into gas and liquid components. The reserve tank 80 has a pressure holding mechanism that holds the coolant at the appropriate pressure, against abnormal increase and decrease in pressure of the coolant that would otherwise be caused due to the expansion and contraction of the coolant together with the change in temperature of the coolant. Any excessive coolant is stored in the reserve tank 80, which can suppress the decrease in liquid amount of the coolant circulating through the third coolant circuit C3.

In this embodiment, the intermediate-pressure heat exchanger 76 can generate the coolant having an intermediate temperature. Specifically, the heat exchanger can generate the coolant having a temperature in a range of not less than the temperature of coolant cooled by the coolant cooler 14 and not more than the temperature of coolant heated by the coolant heater 15.

The coolant at an intermediate temperature generated by the intermediate-pressure heat exchanger 76 can adjust the temperature of the battery 79 disposed in the third coolant circuit C3. Since the battery 79 has a heat capacity to some extent, the battery 79 stores cold heat or hot heat and recovers the heat as needed.

(Fifth Embodiment)

Figure 20:
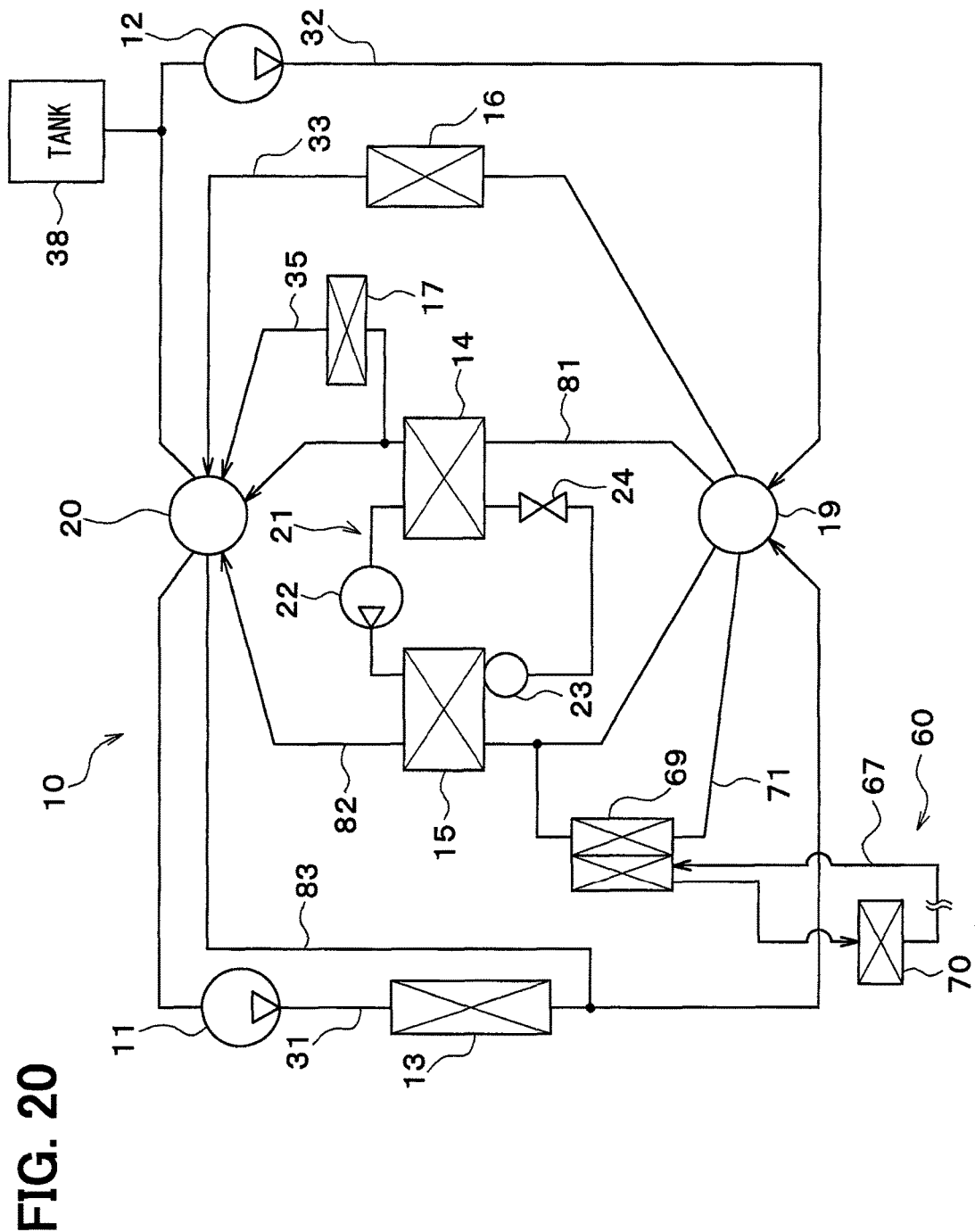
FIG. 20 is an entire configuration diagram of a vehicle thermal management system according to a fifth embodiment.

In a fifth embodiment, as shown in FIG. 20, the arrangement of the radiator 13, the coolant cooler 14, and the coolant heater 15 is changed, and the subjects of connection for the cooler-core flow path 35 and the coolant-coolant heat exchanger flow path 71 are changed with respect to the structure of the above third embodiment.

The radiator 13 is disposed in the first-pump flow path 31. The coolant cooler 14 is disposed in a coolant-cooler flow path 81. The coolant heater 15 is disposed in a coolant-heater flow path 82.

Each of the coolant-cooler flow path 81 and the coolant-heater flow path 82 has one end thereof connected to the first switching valve 19 and the other end thereof connected to the second switching valve 20.

The cooler-core flow path 35 has one end thereof connected to the second switching valve 20 and the other end thereof connected to a part between the coolant cooler 14 and the second switching valve 20 in the coolant-cooler flow path 81.

The coolant-coolant heat exchanger flow path 71 has one end thereof connected to the first switching valve 19 and the other end thereof connected to a part between the coolant heater 15 and the first switching valve 19 in the coolant-heater flow path 82.

The first-pump flow path 31 is connected to one end of a radiator bypass flow path 83. The radiator bypass flow path 83 is a radiator bypass portion that allows the coolant to bypass the radiator 13. The other end of the radiator bypass flow path 83 is connected to the second switching valve 20.

In this embodiment, the whole amount of coolant circulating through the first coolant circuit C1 (coolant circulated by the first pump 11) flows through the radiator 13, which can promote the heat exchange at the radiator 13.

In this embodiment, the coolant inlet side of the cooler core 17 is connected to between the second switching valve 20 and the coolant cooler 14, so that the coolant circulating through the coolant cooler 14 can circulate through the cooler core 17 without providing any port for the cooler core 17 in the first switching valve 19. Thus, the structure of the first switching valve 19 can be simplified.

The coolant outlet side of the cooler core 17 is connected to the second switching valve 20. Thus, the second switching valve 20 intermittently connects the flow of heat medium with respect to the cooler core 17, whereby the flow of heat medium circulating through the coolant cooler 14 can be intermittently connected to the cooler core 17.

The coolant outlet side of the coolant-coolant heat exchanger 69 is connected to between the first switching valve 19 and the coolant heater 15, so that the coolant circulating through the coolant heater 15 can flow through the coolant-coolant heat exchanger 69 without providing any port for the coolant-coolant heat exchanger 69 in the second switching valve 20. Thus, the structure of the second switching valve 20 can be simplified.

The coolant inlet side of the coolant-coolant heat exchanger 69 is connected to the first switching valve 19. Thus, the first switching valve 19 can intermittently connect the flow of the heat medium with respect to the coolant-coolant heat exchanger 69, so that the circulation of the heat medium through the coolant heater 15 can be intermittently connected with respect to the coolant-coolant heat exchanger 69.

(Sixth Embodiment)

This embodiment will describe operation modes that can be implemented with the structures of the above-mentioned embodiments. In the following description, the structure of the first embodiment will be defined as the premise. However, the structures of the second to fifth embodiments can implement the operation modes to be described below.

(1) Coolant Mixing Mode

Figure 21:
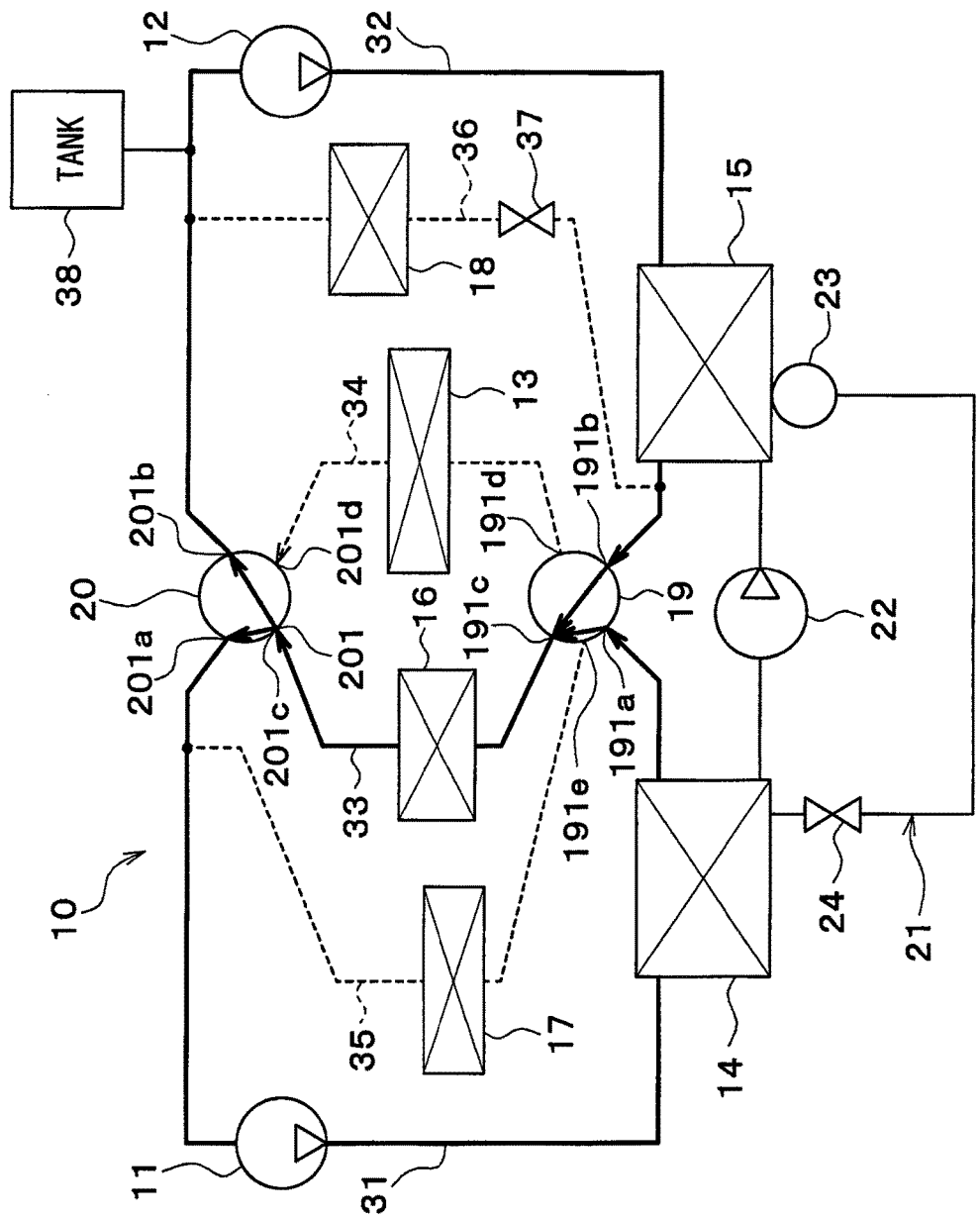
FIG. 21 is an entire configuration diagram for explaining a coolant mixing mode of a vehicle thermal management system according to a sixth embodiment.

As shown in FIG. 21, a coolant mixing mode is an operation mode in which the first and second switching valves 19 and 20 are operated to mix a coolant cooled by the coolant cooler 14 and a coolant heated by the coolant heater 15, thereby allowing the mixed coolant to flow toward the device 16.

In this way, the coolant mixing mode can generate the coolant having an intermediate temperature between the temperature of coolant cooled by the coolant cooler 14 and the temperature of coolant heated by the coolant heater 15, thereby appropriately adjusting the temperature of the device 16.

For example, suppose that the device 16 is a battery. A required temperature range for the battery is about 10° C. to about 40° C. In the heat pump operation, the temperature of the coolant cooled by the coolant cooler 14 is about −3° C. when the outside air temperature is 0° C., and the temperature of the coolant heated by the coolant heater 15 is about 60° C., whereby the temperature of the battery can be surely adjusted in the required temperature range.

(2) Pump Failure Mode

A pump failure mode is an operation mode performed when either the first pump 11 or the second pump 12 breaks down.

Figure 22:
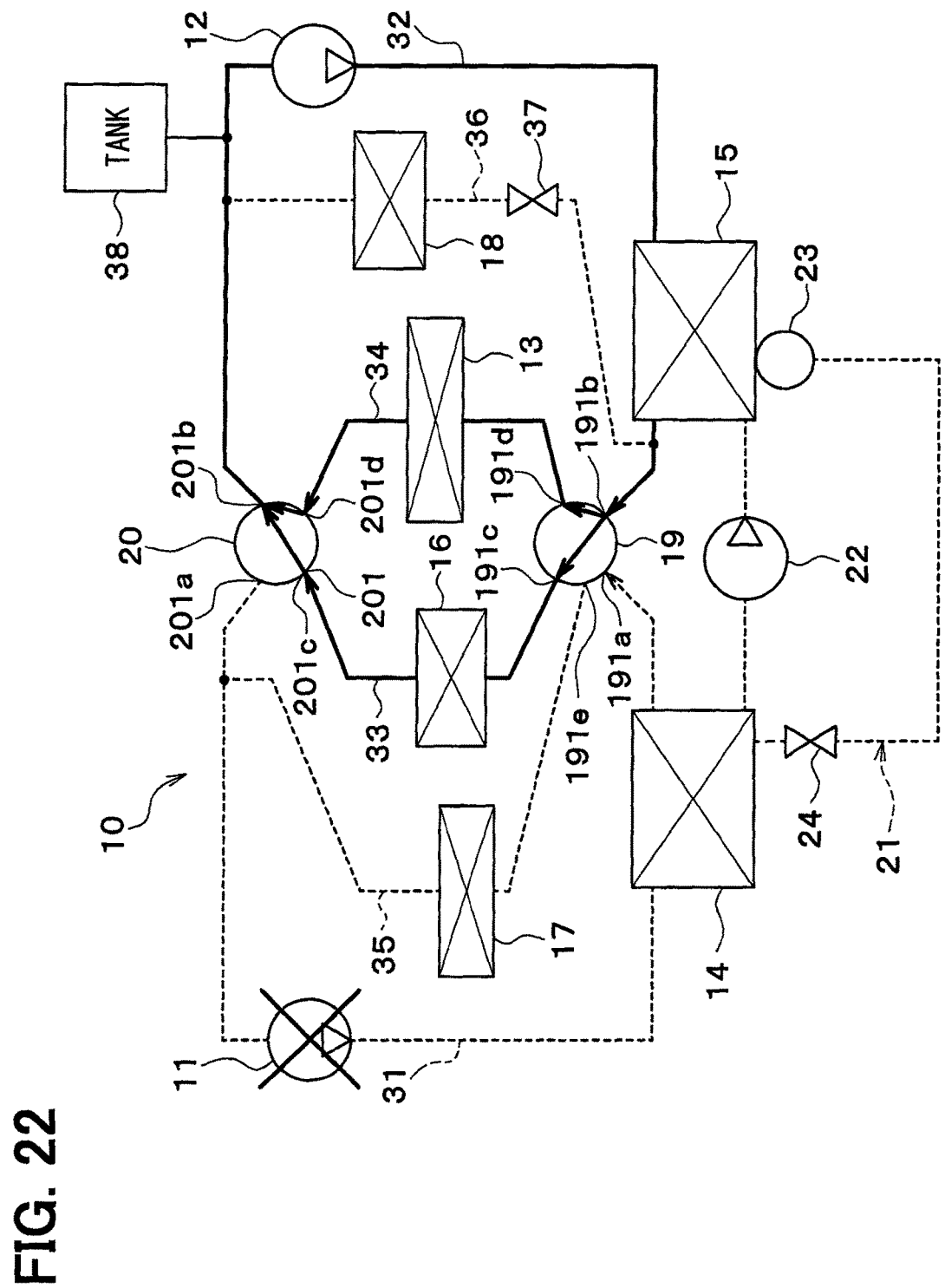
FIG. 22 is an entire configuration diagram for explaining a pump failure mode of the vehicle thermal management system in the sixth embodiment.

In the pump failure mode, as shown in FIG. 22, when the first pump 11 breaks down, and the device 16 needs to be cooled, the compressor 22 in the refrigeration cycle 21 is stopped while the first and second switching valves 19 and 20 are operating to allow for circulation of the coolant among the second pump 12, the radiator 13, and the device 16.

In this way, even when the first pump 11 breaks down, the radiator 13 can cool the coolant, and the coolant cooled by the radiator 13 can flow through the device 16, thereby continuing the cooling of the device 16.

When the first pump 11 breaks down, the compressor 22 of the refrigeration cycle 21 is designed to stop, which can stop the heat dissipation from the coolant heater 15 into the coolant, further preventing the shortage of the heat dissipation capacity of the radiator 13.

Also, when the second pump 12 breaks down, preferably, the compressor 22 in the refrigeration cycle 21 is stopped while the first and second switching valves 19 and 20 are operating to allow for circulation of the coolant among the first pump 11, the radiator 13, and the device 16.

(3) Refrigeration-cycle High Temperature Mode

Figure 23:
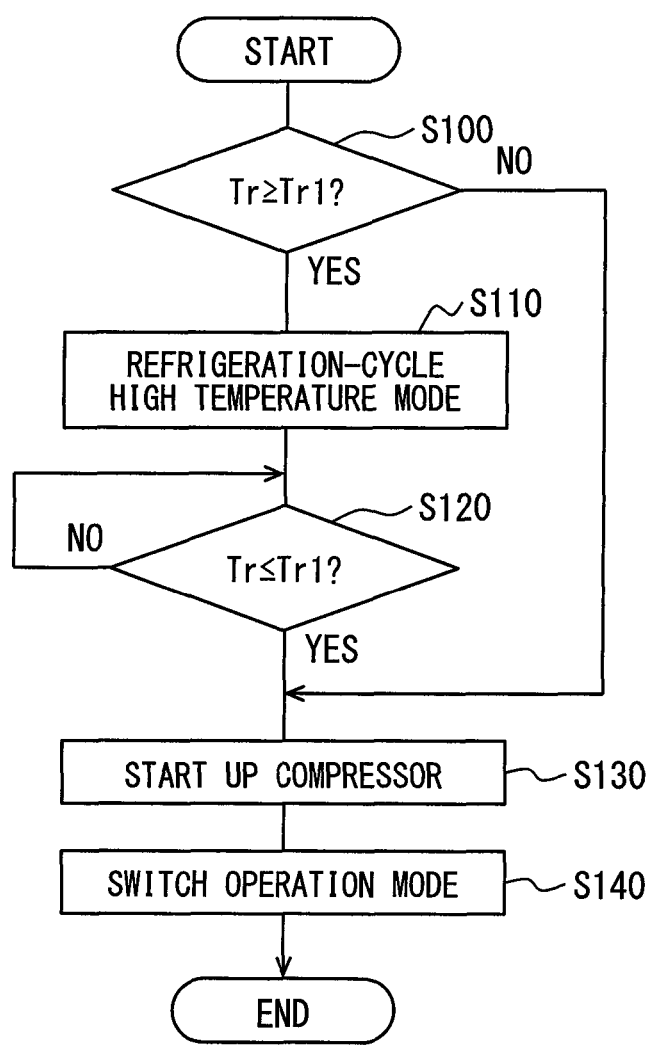
FIG. 23 is a flowchart for explaining a refrigeration-cycle high temperature mode of the vehicle thermal management system in the sixth embodiment.

In the case where the compressor 22 in the refrigeration cycle 21 is stopped, when intending to start up the compressor 22, the controller 50 will execute a control process illustrated in a flowchart of FIG. 23.

In step S100, it is determined whether or not a refrigerant temperature Tr in the refrigeration cycle 21 is equal to or higher than a predetermined temperature Tr1. If the refrigerant temperature Tr is determined to be equal to or higher than the predetermined temperature Tr1, the operation proceeds to step S110, in which a refrigeration-cycle high temperature mode is performed.

Figure 24:
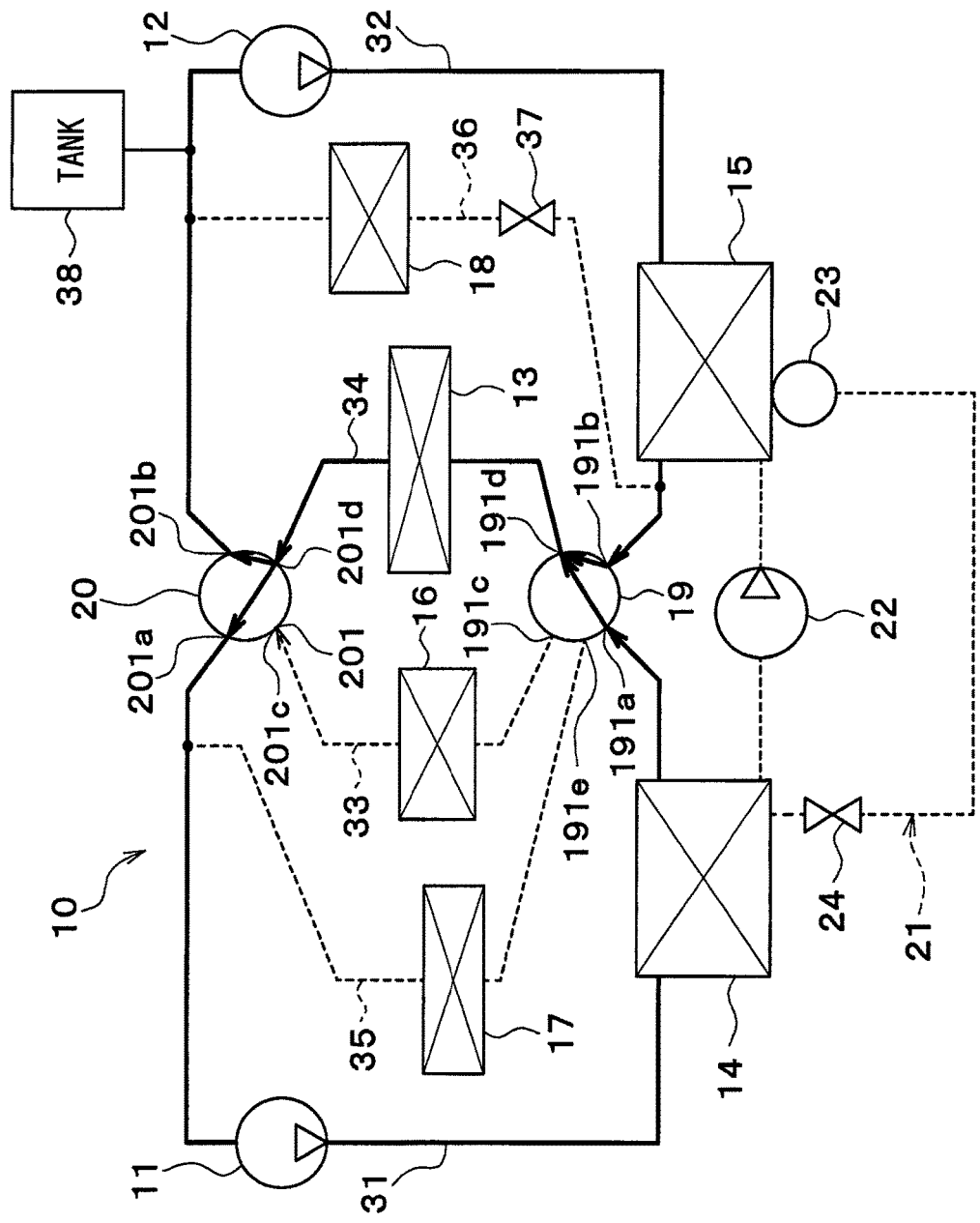
FIG. 24 is an entire configuration diagram for explaining the refrigeration-cycle high temperature mode of the vehicle thermal management system in the sixth embodiment.

In the refrigeration-cycle high temperature mode, as shown in FIG. 24, the first and second switching valves 19 and 20 are operated to allow the coolant flowing out of at least one of the coolant cooler 14 and the coolant heater 15 to flow through the radiator 13. Thus, the heat of the refrigerant in the refrigeration cycle 21 is dissipated into the outside air, resulting in a decrease in refrigerant temperature Tr.

In the following step S120, it is determined whether or not the refrigerant temperature Tr is equal to or higher than the predetermined temperature Tr1. If the refrigerant temperature Tr is determined to be equal to or lower than the predetermined temperature Tr1, the operation proceeds to step S130, in which the compressor 22 is started up. If the refrigerant temperature Tr is determined not to be equal to or lower than the predetermined temperature Tr1, the operation returns to the step S120.

If the refrigerant temperature Tr is determined not to be equal to or higher than the predetermined temperature Tr1 in step S100, the operation proceeds to step S130, in which the compressor 22 is started up. Then, the operation proceeds to step S140, in which the thermal management system is switched to another operation mode.

Thus, when the refrigerant in the refrigeration cycle 21 is at a high temperature due to influences of external heat (for example, heat received from the engine) or the like while the compressor 22 is stopped, the heat of the refrigerant is dissipated by the radiator 13 into the outside air, thereby enabling cooling of the refrigerant.

After the refrigerant is cooled to be at a low temperature, the compressor 22 is started up. Thus, the high pressure of the refrigeration cycle 21 can be prevented from abnormally increasing upon starting up the compressor 22.

Note that in steps S100 and S120, instead of the refrigerant temperature Tr, various temperatures relating to the temperature of refrigerant in the refrigeration cycle 21 may be used, or otherwise a detected pressure of the refrigerant may be used.

(4) First Dehumidification Air Conditioning Mode

Figure 25:
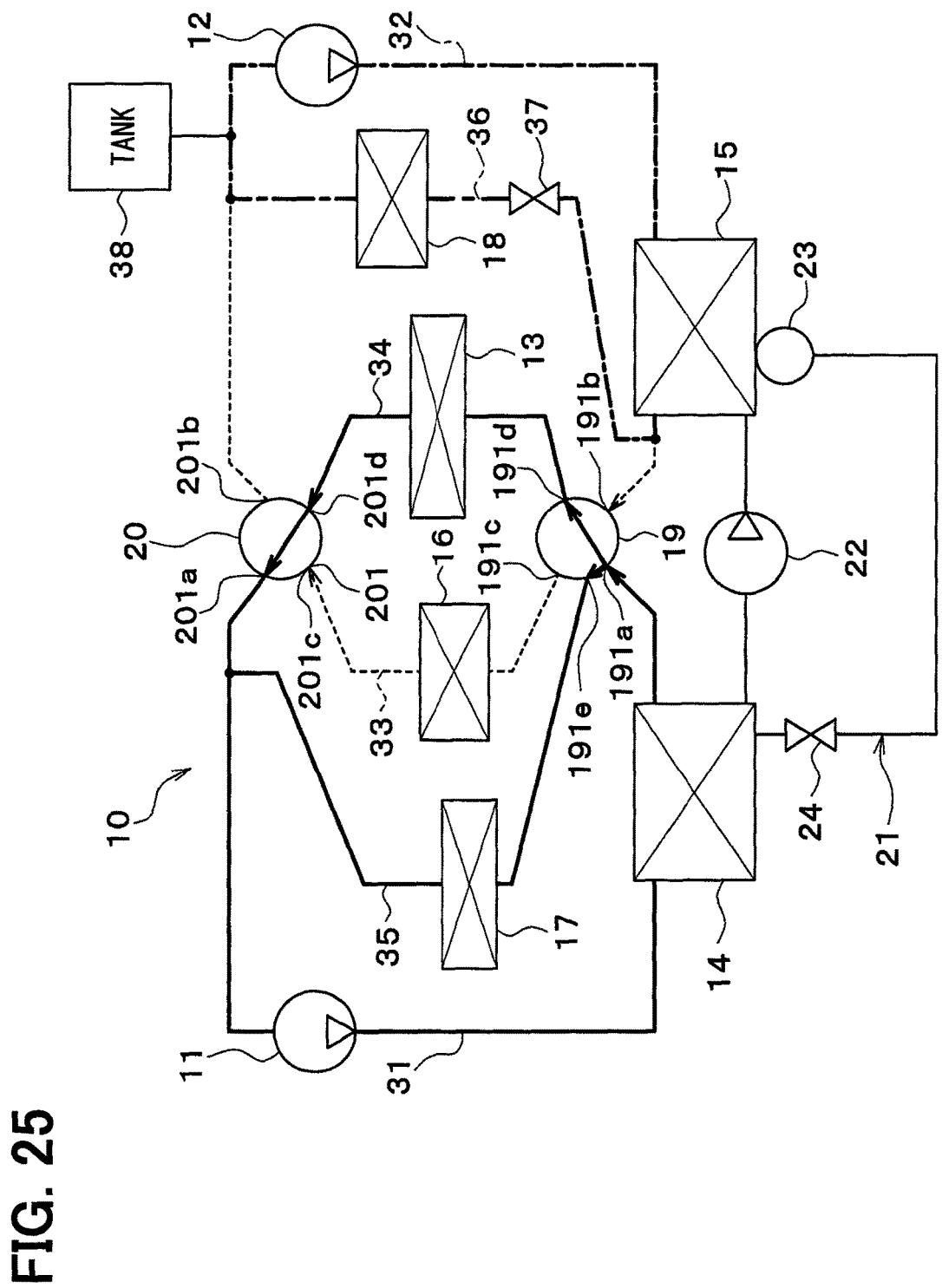
FIG. 25 is an entire configuration diagram for explaining a first dehumidification air conditioning mode of the vehicle thermal management system in the sixth embodiment.

In a first dehumidification air conditioning mode, as shown in FIG. 25, the first switching valve 19, the second switching valve 20, and the opening/closing valve 37 are operated to allow for flow of the coolant cooled by the coolant cooler 14 through the radiator 13 and the cooler core 17, and to allow for flow of the coolant heated by the coolant heater 15 through the heater core 18.

Thus, the coolant cooled by the coolant cooler 14 flows through the radiator 13 and the cooler core 17, whereby heat of the outside air is absorbed in the coolant at the radiator 13, and the ventilation air into the vehicle interior is cooled by the cooler core 17.

Further, the coolant heated by the coolant heater 15 flows through the heater core 18, thereby causing the heater core 18 to heat the ventilation air cooled and dehumidified by the cooler core 17. Thus, the vehicle interior can be subjected to dehumidification and air conditioning (dehumidified and heated) by a heat pump operation which includes absorbing heat from the outside air.

In the first dehumidification air conditioning mode, the heat of the outside air is absorbed and used to heat (perform air-heating of) the ventilation air into the vehicle interior. For example, even when the outside air temperature is slightly low (about 0° C.), the high ventilation air heating capacity (air heating capacity) can be ensured.

(5) Second Dehumidification Air Conditioning Mode

Figure 26:
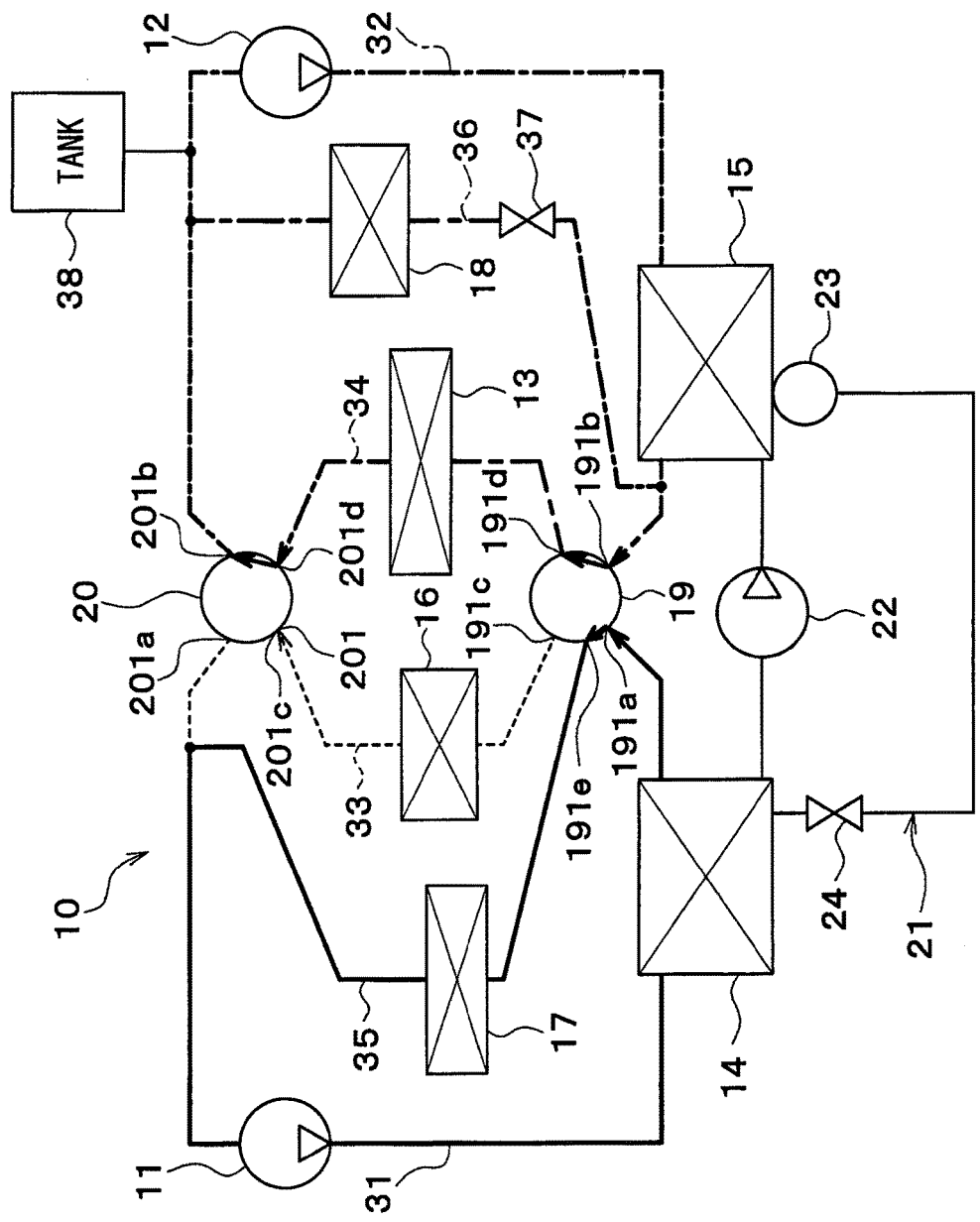
FIG. 26 is an entire configuration diagram for explaining a second dehumidification air conditioning mode of the vehicle thermal management system in the sixth embodiment.

In a second dehumidification air conditioning mode, as shown in FIG. 26, the first switching valve 19, the second switching valve 20, and the opening/closing valve 37 are operated to allow for flow of the coolant cooled by the coolant cooler 14 through the cooler core 17, and to allow for flow of the coolant heated by the coolant heater 15 through the radiator 13 and the heater core 18.

In this way, the coolant cooled by the coolant cooler 14 flows through the cooler core 17, thereby cooling the ventilation air into the vehicle interior at the cooler core 17.

Further, the coolant heated by the coolant heater 15 flows through the radiator 13 and the heater core 18, whereby the heat dissipated into the coolant by the coolant heater 15 is then dissipated into the outside air at the radiator 13, and the ventilation air cooled and dehumidified by the cooler core 17 is heated by the heater core 18. Accordingly, the vehicle interior can be dehumidified and air-conditioned.

In the second dehumidification air conditioning mode, part of the heat dissipated into the coolant at the coolant heater 15 is used to heat the ventilation air into the vehicle interior, and the remaining heat is dissipated into the outside air. Thus, for example, when the outside air temperature is slightly high (about at 15° C.), the amount of heat for heating the ventilation air can be prevented from being excessive.

Thus, the first dehumidification air conditioning mode and the second dehumidification air conditioning mode are switched based on the result of determining the excess and deficiency of the heating capacity of ventilation air, thereby enabling the dehumidification air conditioning in a wide outside air temperature range.

The excess and deficiency of the ventilation air heating capacity is determined, for example, by comparing a blown air temperature of the air blown from the heater core 18 with a target blown air temperature TAO which is a target temperature of air to be blown into the vehicle interior.

The target blown air temperature TAO is calculated, for example, based on the following formula F1.

$$TAO = Kset \times Tset - Kr \times Tr - Kam \times Tam - Ks \times Ts + C \tag{F1}$$

where Tset is a vehicle interior preset temperature set by the temperature setting switch, Tr is a vehicle interior temperature (inside air temperature) detected by the inside air sensor, Tam is an outside air temperature detected by the outside air sensor, and Ts is an amount of solar radiation detected by the solar radiation sensor. The Kset, Kr, Kam, and Ks are control gains, and C is a constant for correction.

In this embodiment, the operation mode of the thermal management system 10 is switchable to the coolant mixing mode. In the coolant mixing mode, both the coolant discharged from the first pump 11 and the coolant discharged from the second pump 12 flow into at least one device 16, and then the coolant flows from the at least one device 16 into both the first pump 11 and the second pump 12.

With this arrangement, the coolant having an intermediate temperature between the temperature of coolant circulated by the first pump 11 and the temperature of coolant circulated by the second pump 12 can flow through at least one device 16. Thus, the temperature of at least one device 16 can be appropriately adjusted.

When one pump of the first pump 11 and the second pump 12 is determined to break down, the thermal management system is switched to the pump failure mode, in which the other pump, the radiator 13, and the device 16 that needs cooling are connected together.

Thus, even if one pump of the first and second pumps 11 and 12 breaks down, the other pump can cause the coolant to circulate through the radiator 13 to avoid the fact that the device 16 cannot be completely cooled.

More specifically, in the pump failure mode, while the compressor 22 in the refrigeration cycle 21 is stopped, the other pump, the device 16 that needs cooling, and the radiator 13 are connected together.

Thus, the heat dissipation from the coolant heater 15 into the coolant can be stopped, and the other pump allows for circulation of the coolant between the device 16 that needs cooling and the radiator 13, which can avoid the fact that the device 16 which needs cooling cannot be completely cooled.

In the case of starting up the compressor 22 of the refrigeration cycle 21, when the temperature associated with the temperature of refrigerant in the refrigeration cycle 21 is determined to be equal to or more than the predetermined temperature, the thermal management system is switched to the refrigeration-cycle high temperature mode. In this mode, the operations of the first switching valve 19 and the second switching valve 20 are controlled to connect at least one of the coolant cooler 14 and the coolant heater 15, the radiator 13, and one of the first pump 11 and the second pump 12 together, while one pump is operated before starting up the compressor 22.

Thus, when the refrigerant in the refrigeration cycle 21 becomes a high temperature due to the influences of external heat (for example, heat received from the engine) and the like, the heat of refrigerant is dissipated into the outside air by the radiator 13 to permit cooling of the refrigerant. Upon starting up the compressor 22, the high pressure in the refrigeration cycle 21 can be prevented from abnormally increasing.

This embodiment can switch between the first dehumidification air conditioning mode in which the radiator 13 is connected to the coolant cooler 14 and the second dehumidification air conditioning mode in which the radiator 13 is connected to the coolant heater 15.

In the first dehumidification air conditioning mode, the refrigeration cycle 21 can perform the heat pump operation of absorbing heat from the outside air. In the second dehumidification air conditioning mode, the heat dissipated from the coolant heater 15 can be further dissipated into the outside air.

(Seventh Embodiment)

Figure 27:
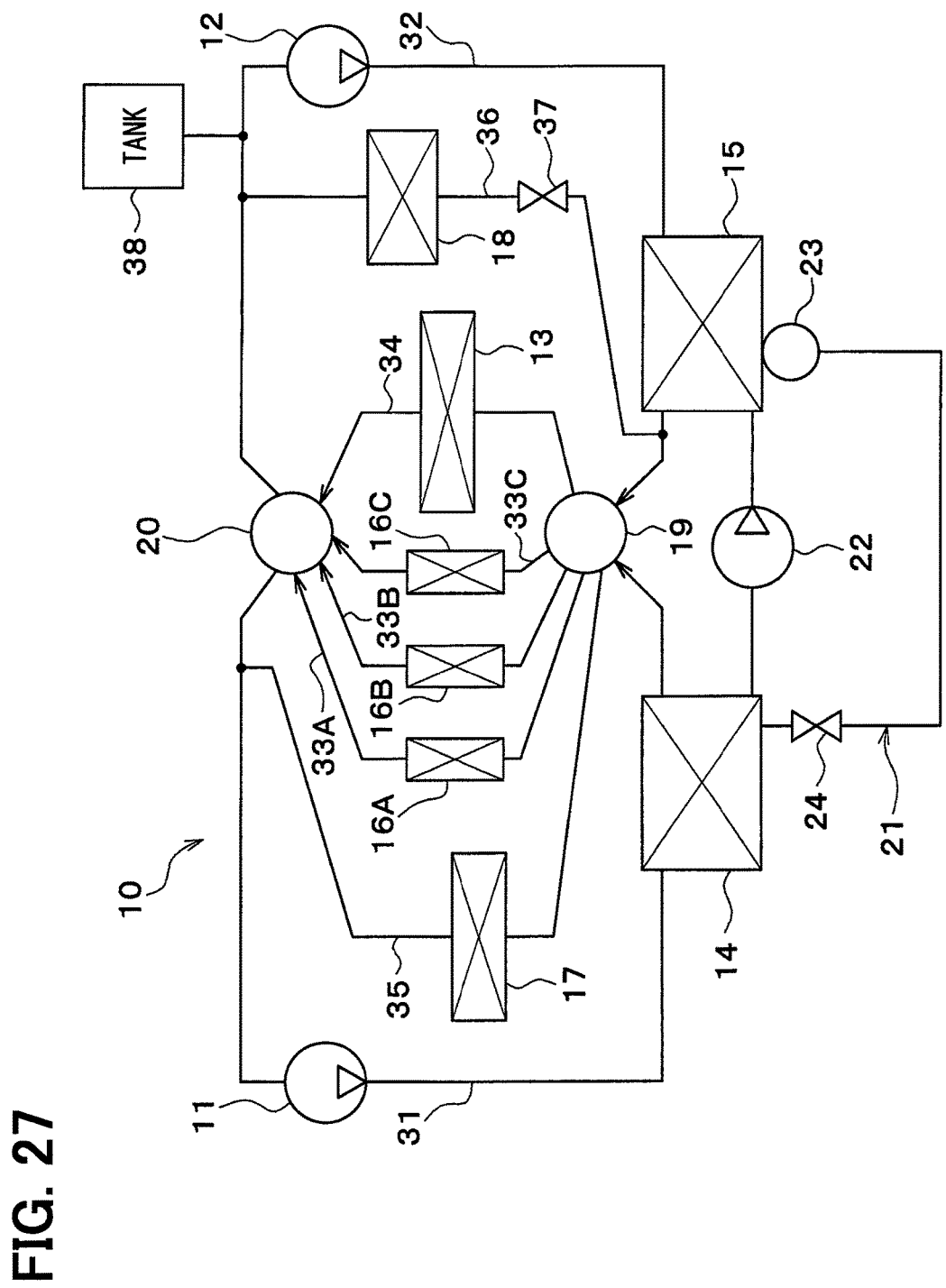
FIG. 27 is an entire configuration diagram of a vehicle thermal management system according to a seventh embodiment.

In a seventh embodiment, as shown in FIG. 27, as the device 16 in the first embodiment, a battery 16A, an inverter 16B, and an EGR cooler 16C are provided. The battery 16A, the inverter 16B, and the EGR cooler 16C are a plurality of cooling target devices to be cooled by coolant.

The coolant inlet sides of the battery 16A, the inverter 16B, and the EGR cooler 16C are connected in parallel with each other to the first switching valve 19. The coolant outlet sides of the battery 16A, the inverter 16B, and the EGR cooler 16C are connected in parallel with each other to the second switching valve 20.

That is, a battery flow path 33A having the battery 16A disposed therein, an inverter flow path 33B having the inverter 16B disposed therein, and an EGR cooler flow path 33C having an EGR cooler 16C disposed therein have ends thereof connected in parallel with each other to the first switching valve 19 and other ends thereof connected in parallel with each other to the second switching valve 20.

Specifically, the first switching valve 19 switches each of the battery 16A, the inverter 16B, and the EGR cooler 16C among the state of inflow of the coolant discharged from the first pump 11, the state of inflow of the coolant discharged from the second pump 12, and the state in which the coolant discharged from the first pump 11 and the coolant discharged from the second pump 12 do not flow thereinto.

The second switching valve 20 switches each of the battery 16A, the inverter 16B, and the EGR cooler 16C among the state of outflow of the coolant into the first pump 11, the state of outflow of the coolant into the second pump 12, and the state in which the coolant does not flow out into the first pump 11 and the second pump 12.

The battery 16A preferably has its temperature maintained in a range of about 10 to 40° C. for the purpose of preventing the reduction in output, charging and discharging efficiency, degradation, and the like. The inverter 16B preferably has its temperature maintained at 65° C. or lower for the purpose of preventing the degradation and the like. The exhaust gas cooled by the EGR cooler 16C preferably has its temperature maintained in a range of 40 to 100° C. for the purpose of reducing the engine loss, preventing knocking, and suppressing the generation of NOX, and the like.

Therefore, the battery 16A, the inverter 16B, and the EGR cooler 16C have different required cooling temperatures.

Figure 28:
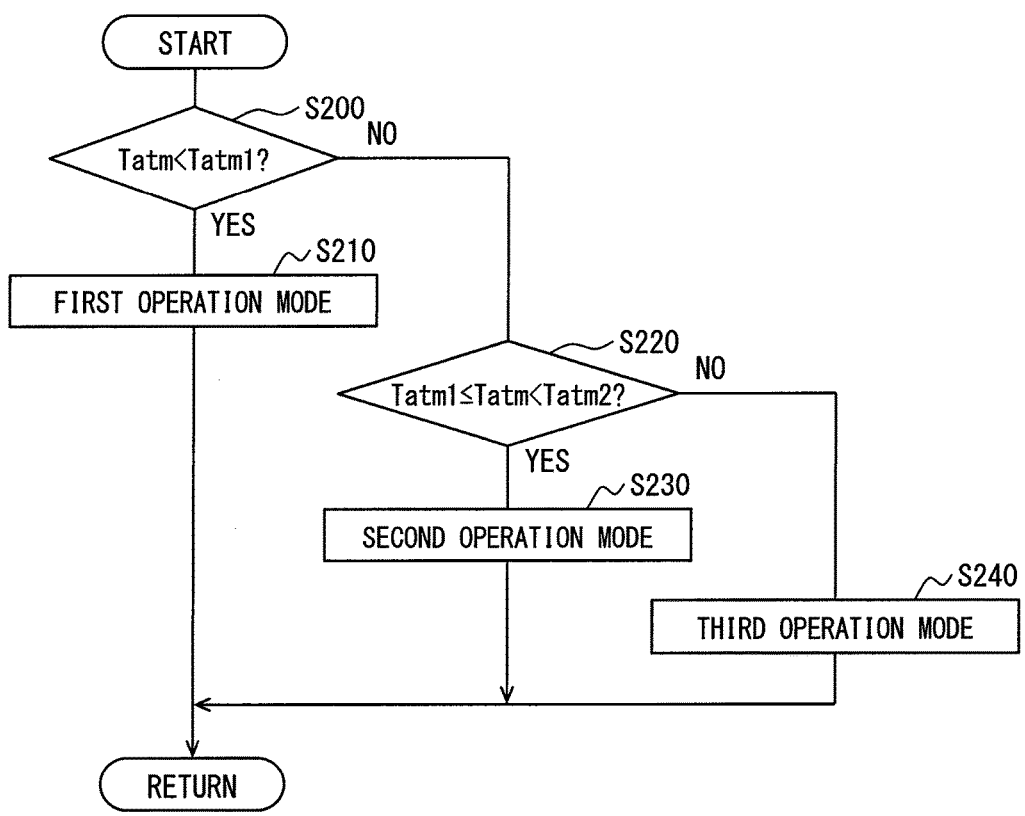
FIG. 28 is a flowchart for explaining an operation mode switching control process of the vehicle thermal management system in the seventh embodiment.

The controller 50 performs the control process shown in the flowchart of FIG. 28. In step S200, it is determined whether or not an outside air temperature Tatm detected by the outside air sensor 52 (temperature associated with the temperature of coolant) is less than a first predetermined temperature Tatm1 (15° C. in this example). If the outside air temperature Tatm is determined to be less than the first predetermined temperature Tatm1, the operation proceeds to step S210, in which the first operation mode is performed.

In the first operation mode, the first switching valve 19 and the second switching valve 20 are operated such that the coolant cooled by the radiator 13 flows through the battery 16A, the inverter 16B, and the EGR cooler 16C, and that the coolant cooled by the coolant cooler 14 does not flow through the battery 16A, the inverter 16B, and the EGR cooler 16C.

In this way, the coolant cooled by the radiator 13 (intermediate temperature coolant) cools the battery 16A, the inverter 16B, and the exhaust gas.

If the outside air temperature Tatm is determined not to be less than the first predetermined temperature Tatm1 in step S200, the operation proceeds to step S220. In step S220, it is determined whether or not the outside air temperature Tatm is equal to or higher than the first predetermined temperature Tatm1 and less than the second predetermined temperature Tatm2 (40° C. in this example). The second predetermined temperature Tatm2 is higher than the first predetermined temperature Tatm1.

If the outside air temperature Tatm is determined to be equal to or more than the first predetermined temperature Tatm1 and less than the second predetermined temperature Tatm2, the operation proceeds to step S230, in which the second operation mode is performed.

In the second operation mode, the first switching valve 19 and the second switching valve 20 are operated such that the coolant cooled by the radiator 13 flows through the inverter 16B and the EGR cooler 16C, and that the coolant cooled by the coolant cooler 14 flows through the battery 16A.

Thus, the inverter 16B and the exhaust gas are cooled by the coolant (intermediate-temperature coolant) cooled by the radiator 13, and the battery 16A is cooled by the coolant (low-temperature coolant) cooled by the coolant cooler 14.

If the outside air temperature Tatm is determined to be equal to or more than the first predetermined temperature Tatm1 and less than the second predetermined temperature Tatm2 in step S220 (that is, when the outside air temperature Tatm is equal to or more than the second predetermined temperature Tatm2), the operation proceeds to step S240, in which a third operation mode is performed.

In the third operation mode, the first switching valve 19 and the second switching valve 20 are operated such that the coolant cooled by the radiator 13 flows through the EGR cooler 16C, and that the coolant cooled by the coolant cooler 14 flows through the battery 16A and the inverter 16B.

Thus, the exhaust gas is cooled by the coolant (intermediate-temperature coolant) cooled by the radiator 13, and the battery 16A and the inverter 16B are cooled by the coolant (low-temperature coolant) cooled by the coolant cooler 14.

Since the battery 16A has a heat capacity to some extent, the battery 16A stores cold heat or hot heat and can recover the heat as needed. In other words, the battery 16A can be used as a cold storage member. The battery 16A is a heat storage device that can store therein the hot heat and cold heat.

For example, the first switching valve 19 and the second switching valve 20 are operated such that at least one of the inverter 16B and the EGR cooler 16C, the battery 16A, and the first pump 11 or second pump 12 are connected together, and that the coolant flowing through at least one of the inverter 16B and the EGR cooler 16C flows through the battery 16A. As a result, the coolant heated by waste heat from at least one of the inverter 16B and the EGR cooler 16C flows through the battery 16A, so that the waste heat (hot heat) from the at least one of the inverter 16B and the EGR cooler 16C can be stored in the battery 16A (which is a heat storage mode).

After the hot heat is stored in the battery 16A, the first switching valve 19 and the second switching valve 20 are operated such that the coolant cooler 14, the battery 16A, and the first pump 11 or second pump 12 are connected together, and that the coolant flowing through the battery 16A flows through the coolant cooler 14. Thus, the coolant heated with the hot heat stored in the battery 16A flows through the coolant cooler 14, thereby increasing the pressure of the refrigerant (that is, a low pressure in the refrigeration cycle 21) in the coolant cooler 14 to enable improvement of a coefficient of performance (COP) of the refrigeration cycle 21 (which is a storage heat using mode).

The conditions for switching from the heat storage mode to the stored heat using mode may include, for example, the temperature of the battery 16A higher than the outside air temperature.

For example, the first and second switching valves 19 and 20 are operated to allow the coolant flowing through the coolant cooler 14 to flow through the battery 16A, whereby the coolant cooled by the coolant cooler 14 can flow through the battery 16A, thus storing cold heat from the coolant cooler 14 into the battery 16A (which is a cold storage mode).

After storing the cold heat in the battery 16A, the first switching valve 19 and the second switching valve 20 are operated to allow the coolant flowing through the battery 16A to then flow through the coolant heater 15, whereby the coolant cooled with the cold heat stored in the battery 16A flows through the coolant heater 15. Thus, even under a high outside air temperature, the high-pressure side refrigerant can dissipate heat into a lower temperature range at the coolant heater 15. Therefore, the refrigeration cycle 21 can be operated with the coefficient of performance (COP) of the refrigeration cycle 21 kept high (which is a stored cold using mode).

The conditions for switching from the cold storage mode to the stored cold using mode may include, for example, the temperature of the battery 16A lower than the outside air temperature.

In this embodiment, the outside air temperature is detected as a temperature associated with the temperature of the coolant, and then based on the outside air temperature detected, the operations of the first switching valve 19 and the second switching valve 20 are controlled to perform the first to third operation modes. Thus, the coolant circulating through the cooling target devices 16A, 16B, and 16C can be switched among the devices according to the outside air temperature.

More specifically, the outside air temperature is detected as a temperature associated with the temperature of coolant exchanging heat at the radiator 13. When the outside air temperature is lower than the first predetermined temperature Tatm1, the first operation mode is performed to allow for circulation of the coolant between the devices 16A, 16B, and 16C (devices that need cooling) and the radiator 13. When the outside air temperature is higher than the first predetermined temperature Tatm1, the operation is switched to the second operation mode and the third operation mode as the outside air temperature increases. Together with the switching, the number of the devices (devices that need cooling) through which the coolant circulates with respect to the coolant cooler 14 is increased.

Thus, the cooling load of the coolant cooler 14 (that is, cooling load of the refrigeration cycle 21) can be changed according to the temperature of the coolant obtained after the heat exchange by the radiator 13, which can achieve the energy saving.

More specifically, the cooling target devices 16A, 16B, and 16C have different required cooling temperatures. When the outside air temperature is higher than the first predetermined temperature Tatm1, as the outside air temperature becomes higher, the operation is shifted to the second operation mode and the third operation mode. In this way, the coolant circulates between the coolant cooler 14 and the cooling target devices from a lowest one in which the required cooling temperature is low.

Thus, each of the cooling target devices 16A, 16B, and 16C can be switched between the circulation of the coolant (intermediate-temperature coolant) cooled by the radiator 13 and the circulation of the coolant (low-temperature coolant) cooled by the coolant cooler 14 according to the required cooling temperature. Accordingly, this embodiment can appropriately cool the cooling target devices 16A, 16B, and 16C while saving energy.

In this embodiment, when the temperature of the battery 16A is higher than the outside air temperature, the coolant cooler 14, the battery 16A, and the first pump 11 or second pump 12 are connected together to allow the low-pressure side refrigerant to absorb heat at the coolant cooler 14 from the coolant heated with hot heat stored in the battery 16A.

Even under the low outside air temperature, in the coolant cooler 14, the low-pressure side refrigerant can absorb heat from a higher temperature range, so that the refrigeration cycle 21 can be operated with the coefficient of performance (COP) of the refrigeration cycle 21 kept high.

When the temperature of the battery 16A is lower than the outside air temperature, the coolant heater 15, the battery 16A, and the first pump 11 or second pump 12 are connected together to allow the high-pressure side refrigerant to dissipate heat at the coolant heater 15 into the coolant cooled with cold heat stored in the battery 16A.

Even under the high outside air temperature, in the coolant heater 15, the high-pressure side refrigerant can dissipate heat into a lower temperature range, so that the refrigeration cycle 21 can be operated with the coefficient of performance (COP) of the refrigeration cycle 21 kept high.

(Eighth Embodiment)

Figure 29:
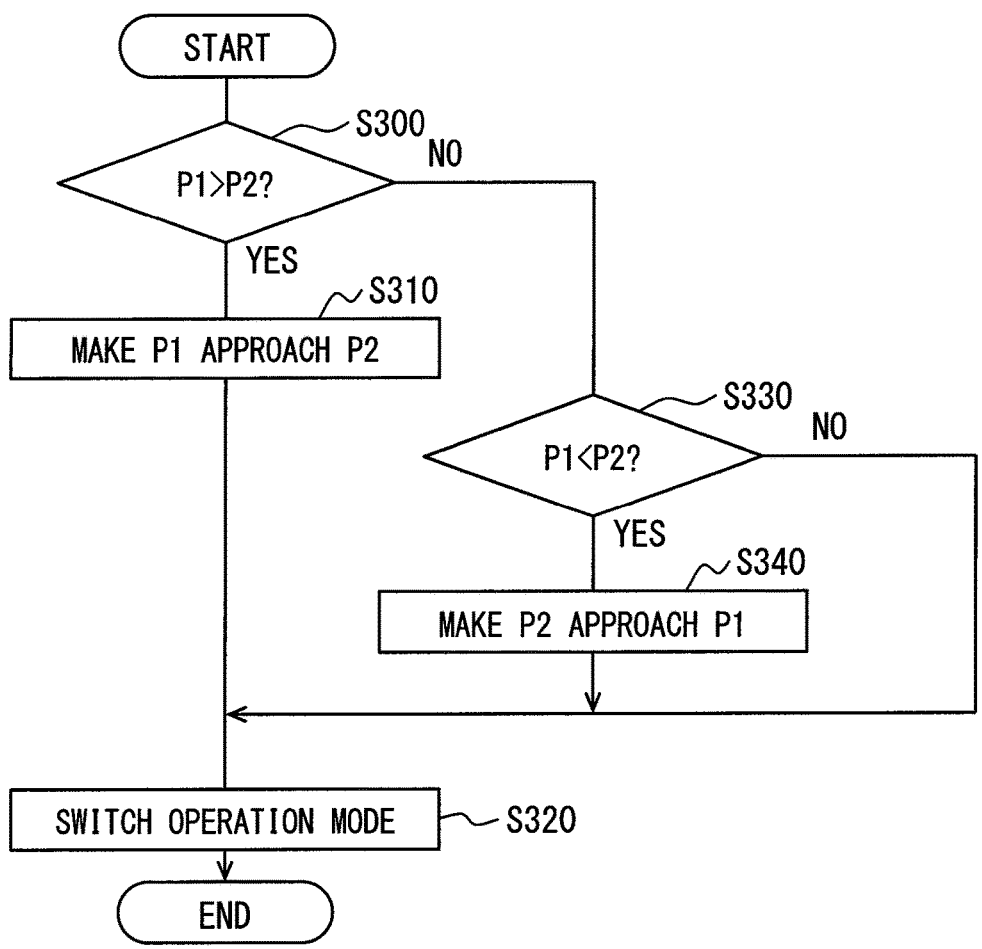
FIG. 29 is a flowchart for explaining an operation mode switching control process of a vehicle thermal management system according to an eighth embodiment.

In an eighth embodiment, a control process is performed which includes suppression of mixing the coolant in the first coolant circuit C1 and the coolant in the second coolant circuit C2 upon switching the operation mode. Specifically, the controller 50 performs the control process shown in the flowchart of FIG. 29.

In step S300, it is determined whether or not a coolant pressure P1 in the first coolant circuit C1 is higher than a coolant pressure P2 in the second coolant circuit C2. The coolant pressure P1 in the first coolant circuit C1 and the coolant pressure P2 in the second coolant circuit C2 can be detected and estimated by various methods.

Specifically, pressure sensors are installed on the respective discharge sides of the first pump 11 and the second pump 12, so that the coolant pressure P1 in the first coolant circuit C1 and the coolant pressure P2 in the second coolant circuit C2 can be detected. Alternatively, the coolant pressure P1 in the first coolant circuit C1 and the coolant pressure P2 in the second coolant circuit C2 may be estimated based on detected values of various physical quantities.

When the coolant pressure P1 in the first coolant circuit C1 is determined to be higher than the coolant pressure P2 in the second coolant circuit C2, the operation proceeds to step S310, in which the driving of the first pump 11 is controlled (for example, subjected to feedback control) such that the coolant pressure P1 in the first coolant circuit C1 is equal to the coolant pressure P2 in the second coolant circuit C2. Then, the operation proceeds to step S320, in which the operation mode is switched.

When the coolant pressure P1 in the first coolant circuit C1 is determined not to be higher than the coolant pressure P2 in the second coolant circuit C2 in step S300, the operation proceeds to step S330. In step S330, it is determined whether or not the coolant pressure P1 in the first coolant circuit C1 is lower than the coolant pressure P2 in the second coolant circuit C2.

When the coolant pressure P1 in the first coolant circuit C1 is determined to be lower than the coolant pressure P2 in the second coolant circuit C2, the operation proceeds to step S340, in which the driving of the second pump 12 is controlled (for example, subjected to feedback control) such that the coolant pressure P2 in the second coolant circuit C2 is equal to the coolant pressure P1 in the first coolant circuit C1. Then, the operation proceeds to step S320, in which the operation mode is switched.

When the coolant pressure P1 in the first coolant circuit C1 is determined not to be lower than the coolant pressure P2 in the second coolant circuit C2 in step S330, it is considered that the coolant pressure P1 in the first coolant circuit C1 is already equal to the coolant pressure P2 in the second coolant circuit C2. Then, the operation proceeds to step S320, in which the operation mode is switched.

In this embodiment, upon switching the operation mode, the driving of the first pump 11 and the second pump 12 is controlled such that the coolant pressure P1 in the first coolant circuit C1 gets closer to and becomes equal to the coolant pressure P2 in the second coolant circuit C2. Thus, the coolant in the first coolant circuit C1 and the coolant in the second coolant circuit C2 can be prevented from being mixed inside the first switching valve 19 and the second switching valve 20.

That is, during the step of switching the operation mode, the valve body of the first switching valve 19 and the valve body of the second switching valve 20 are set to have the intermediate opening degree, which can mix the coolant in the first coolant circuit C1 with the coolant in the second coolant circuit C2. At this time, the coolant pressure P1 in the first coolant circuit C1 can be set equal to the coolant pressure P2 in the second coolant circuit C2, thereby reducing the amount of mixing of the coolants.

Note that upon switching the operation mode, even when the first pump 11 and the second pump 12 are intended to be stopped, the mixed amount of the coolants can be suppressed.

When switching the operations of the first and second switching valves 19 and 20, an output from one of the first and second pumps 11 and 12 having the larger output is set close to an output from the other pump.

With this arrangement, the pressure of coolant circulated by the first pump 11 can be set close to that of coolant circulated by the second pump 12 during the switching operations by the first and second switching valves 19 and 20. This embodiment can prevent mixing of the coolant circulated by the first pump 11 and the coolant circulated by the second pump 12.

(Ninth Embodiment)

Figure 30:
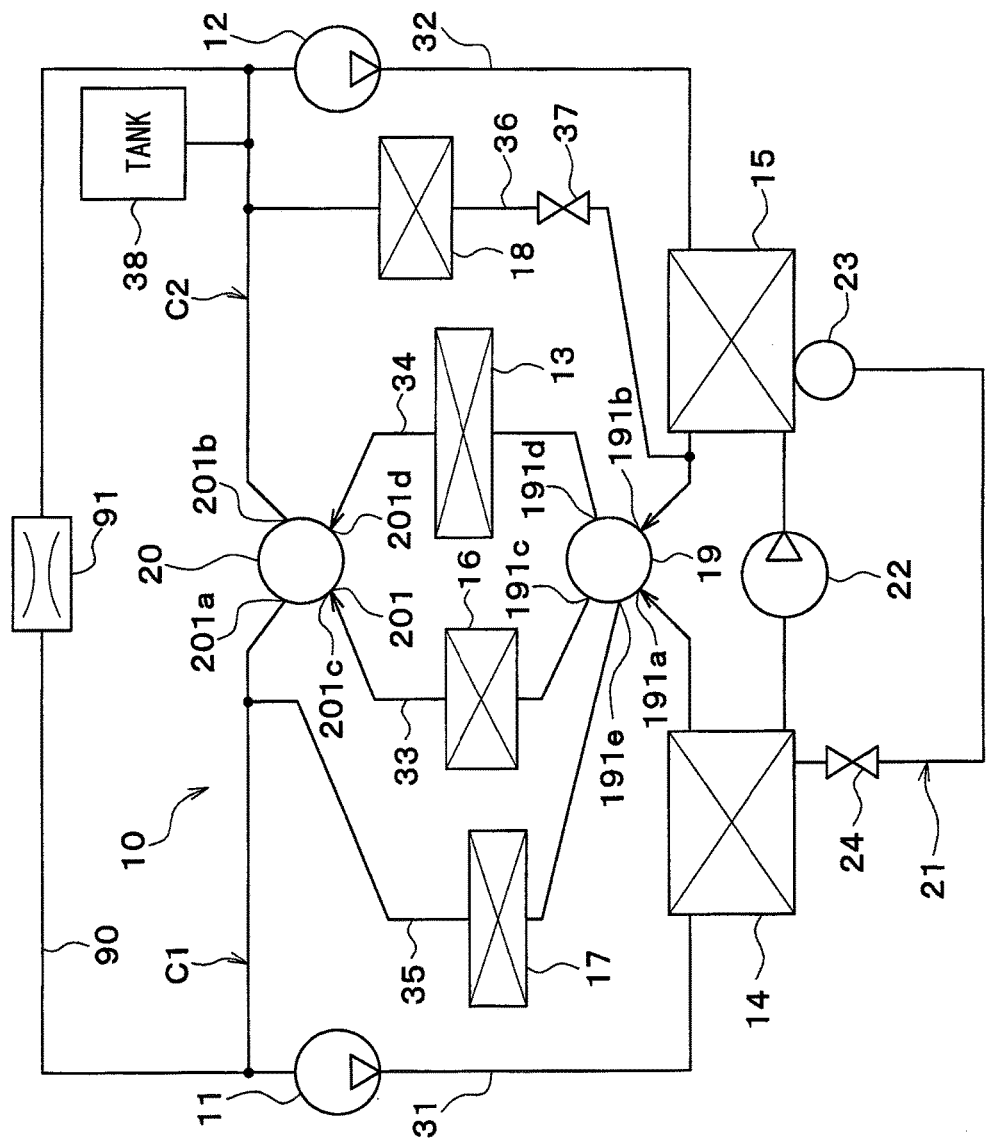
FIG. 30 is an entire configuration diagram of a vehicle thermal management system according to a ninth embodiment.

In a ninth embodiment, as shown in FIG. 30, a communication flow path 90 is added to the structure of the above first embodiment. The communication flow path 90 is a communication portion that communicates between the first coolant circuit C1 and the second coolant circuit C2.

One end of the communication flow path 90 is connected to a part between the second switching valve 20 and the suction portion of the first pump 11 in the first-pump flow path 31. The other end of the communication flow path 90 is connected to a part between the second switching valve 20 and the suction portion of the second pump 12 in the second-pump flow path 32.

A flow path throttle 91 is disposed in the communication flow path 90. Specifically, the dimensions and the like of the communication flow path 90 and the flow path throttle 91 are set such that the flow rate of the coolant in the communication flow path 90 is more than the valve leakage amount from the first switching valve 19 and the valve leakage amount from the second switching valve 20. Instead of the flow path throttle 91, the entire communication flow path 90 may be configured of a pipe with a fine diameter.

The "valve leakage" in the first and second switching valves 19 and 20 will be described below. For example, suppose there is a difference between the coolant pressure in the first coolant circuit C1 and the coolant pressure in the second coolant circuit C2. In this case, even if a valve body of the first switching valve 19 is operated at a position that separates a flow path on the side of the first coolant circuit C1 from another flow path on the side of the second coolant circuit C2, the valve body of the first switching valve is slightly opened depending on the pressure difference, causing the coolant leakage.

Likewise, regarding the second switching valve 20, suppose there is a difference between the coolant pressure in the first coolant circuit C1 and the coolant pressure in the second coolant circuit C2. In this case, even if a valve body of the second switching valve 20 is operated at a position that separates a flow path on the side of the first coolant circuit C1 from another flow path on the side of the second coolant circuit C2, the valve body of the second switching valve 20 is slightly opened depending on the pressure difference, causing the coolant leakage.

Note that in the following, the "valve leakage" as used herein means the coolant leakage inside the first switching valve 19 and the second switching valve 20, and the "valve leakage amount" as used herein means the amount of the coolant leakage due to the valve leakage.

In this embodiment, the communication flow path 90 can communicate between the first coolant circuit C1 and the second coolant circuit C2 on its downstream side (pump suction side). In an operational situation where a lifting height of the first pump 11 is higher than that of the second pump 12, this embodiment can prevent the coolant pressure in the second coolant circuit C2 from becoming excessively high. The reason for this is as follows.

In the operational situation where the lifting height of the first pump 11 is higher than that of the second pump 12, there occurs a difference in lifting height between the first pump 11 and the second pump 12, thus generating a difference in pressure between the first coolant circuit C1 and the second coolant circuit C2. Thus, the "valve leakage" occurs in the first switching valve 19 and the second switching valve 20.

Once the valve leakage occurs in the first and second switching valves 19 and 20, the coolant is transferred between the first coolant circuit C1 and the second coolant circuit C2 in the first switching valve 19 and the second switching valve in such a direction as to equalize the pressure between these circulation circuits.

Suppose that when the communication flow path 90 is not formed and the amount of valve leakage on the upstream side (pump discharge side) is more than that of valve leakage on the downstream side (pump suction side), the pressure of the first coolant circuit C1 and the pressure of the second coolant circuit C2 are equalized in the first switching valve 19 from which an amount of valve leakage is the most.

Thus, the pressure on the discharge side of the second pump 12 is set equal to that on the discharge side of the first pump 11. Since the suction side of the second pump 12 takes a pressure obtained by subtracting a pressure corresponding to the pump lifting height from the pressure on the discharge side of the second pump 12, the pressure on the suction side of the second pump 12 can become high, which might open a pressure adjustment valve (pressure adjustment mechanism) of the reserve tank 38.

In the above-mentioned aspect, in this embodiment, the communication flow path 90 is used to communicate between the first coolant circuit C1 and the second coolant circuit C2 on the downstream side (pump suction side), so that the amount of transfer of the coolant between the first and second coolant circuits C1 and C2 becomes the most at the communication flow path 90.

Thus, the pressure in the first coolant circuit C1 and the pressure in the second coolant circuit C2 are equalized in the communication flow path 90 in which the amount of transfer of the coolant becomes the most. As a result, the pressure on the suction side of the second pump 12 is set equal to that on the suction side of the first pump 11. Thus, this embodiment can prevent the pressure adjustment mechanism of the reserve tank 38 from opening its valve that would otherwise be caused due to the excessively high pressure on the suction side of the second pump 12.

The communication flow path 90 may be formed inside the second switching valve 20 (that is, the switching valve positioned on the pump suction side).

In this embodiment, the communication flow path 90 communicates between a coolant flow path (heat medium flow path) leading from a coolant inlet (heat medium inlet) of the second switching valve 20 to a coolant suction portion (heat medium suction portion) of the first pump 11, and a coolant flow path (heat medium flow path) leading from a coolant inlet (heat medium inlet) of the second switching valve 20 to a coolant suction portion (heat medium suction portion) of the second pump 12.

This arrangement can prevent the pressure at the suction side of the first pump 11 and the pressure at the suction side of the second pump 12 from becoming excessively high. The reason for this has been described above.

(Tenth Embodiment)

Figure 31:
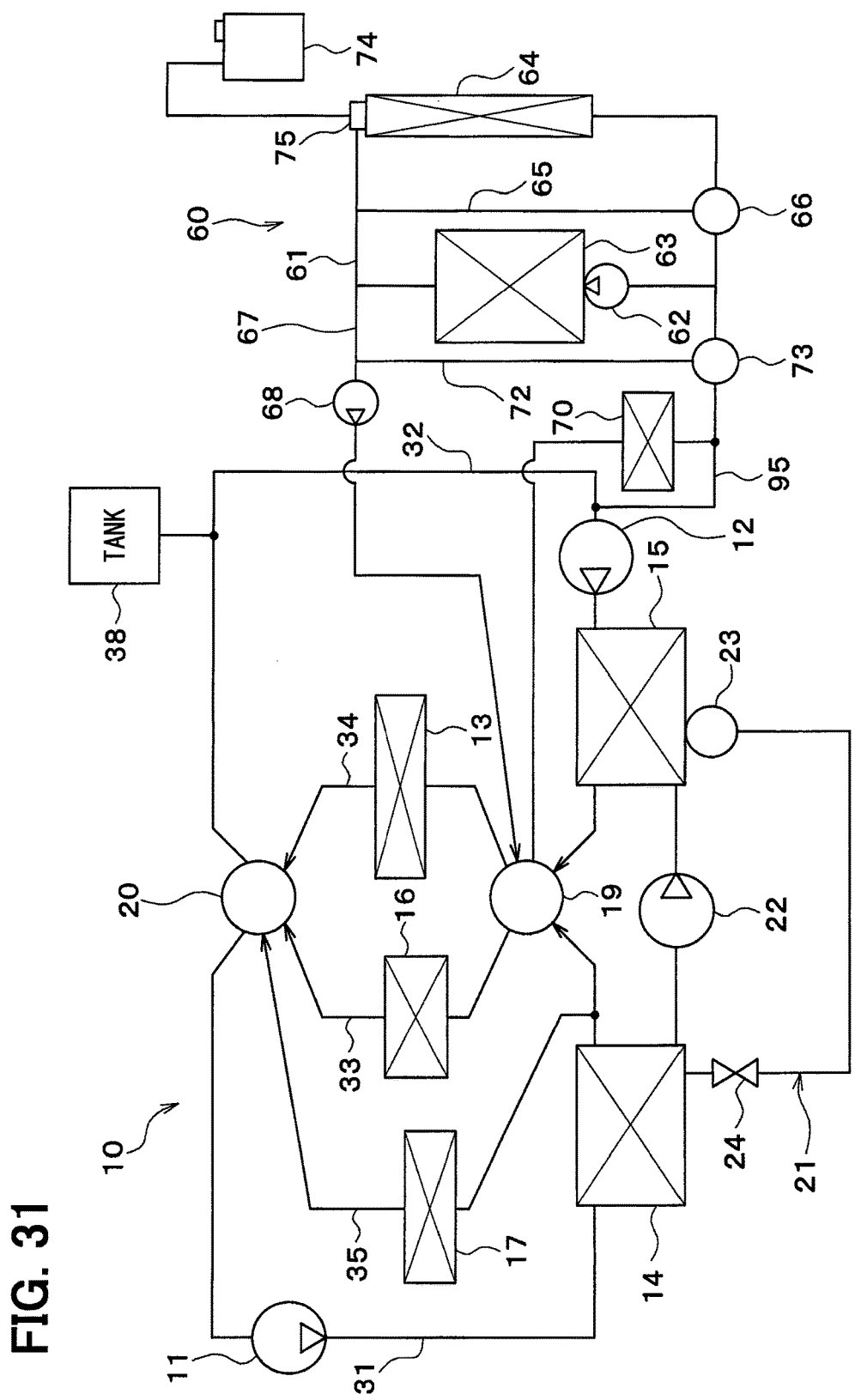
FIG. 31 is an entire configuration diagram of a vehicle thermal management system according to a tenth embodiment.

Although in the third embodiment, the first coolant circuit C1 and the second coolant circuit C2 are capable of cooperating with the engine cooling circuit 60 via the coolant-coolant heat exchanger 69, in a tenth embodiment, as shown in FIG. 31, the engine cooling circuit 60 is connected to the second switching valve 20. Specifically, the second switching valve 20 is disposed at the midway point of the heater-core flow path 67 in the engine cooling circuit 60.

A part of the heater-core flow path 67 on the downstream side of the heater core 70 is connected to one end of a connection flow path 95. The other end of the connection flow path 95 is connected to a part between the second switching valve 20 and the second pump 12 in the second-pump flow path 32. The connection flow path 95 is a connection portion that connects between the engine cooling circuit 60 and the second-pump flow path 32.

Figure 32:
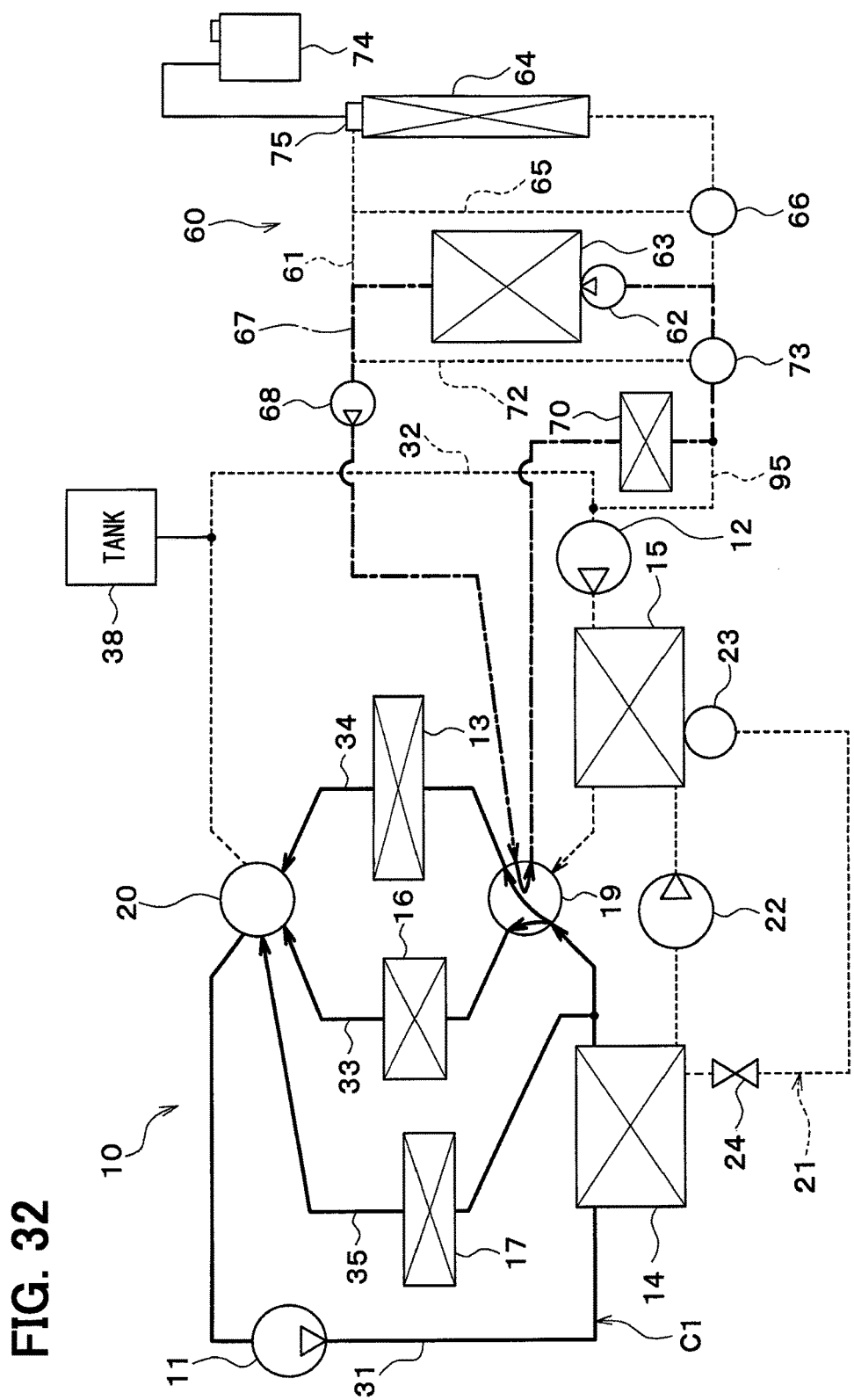
FIG. 32 is an entire configuration diagram for explaining a non-cooperation mode of the vehicle thermal management system in the tenth embodiment.

When the temperature of coolant in the engine cooling circuit 60 is equal to or higher than a predetermined value (e.g., 50° C. or more), a non-cooperation mode shown in FIG. 32 is performed.

In the non-cooperation mode, the first switching valve 19 and the second switching valve 20 are operated to form a first coolant circuit C1 (first heat medium circuit) in which the coolant circulates through the first pump 11, the coolant cooler 14, the radiator 13, device 16, and cooler core 17, and the first pump 11 in this order.

Further, in the first mode, the second switching valve 20 is operated to allow the coolant to circulate through the engine pump 62, the engine 63, the heater core 70, and the engine pump 62 in this order, and the compressor 22 in the refrigeration cycle 21 is stopped.

Thus, the coolant heated with waste heat from the engine 63 flows through the heater core 70, whereby the ventilation air into the vehicle interior is heated in the heater core 70, thereby enabling air-heating of the vehicle interior. In the first coolant circuit C1, the coolant cooled by the radiator 13 flows through the device 16, thereby enabling cooling of the device 16.

In the first mode, the first coolant circuit C1 and the second coolant circuit C2 do not cooperate with the engine cooling circuit 60. Thus, the first mode can be expressed as the non-cooperation mode.

Figure 33:
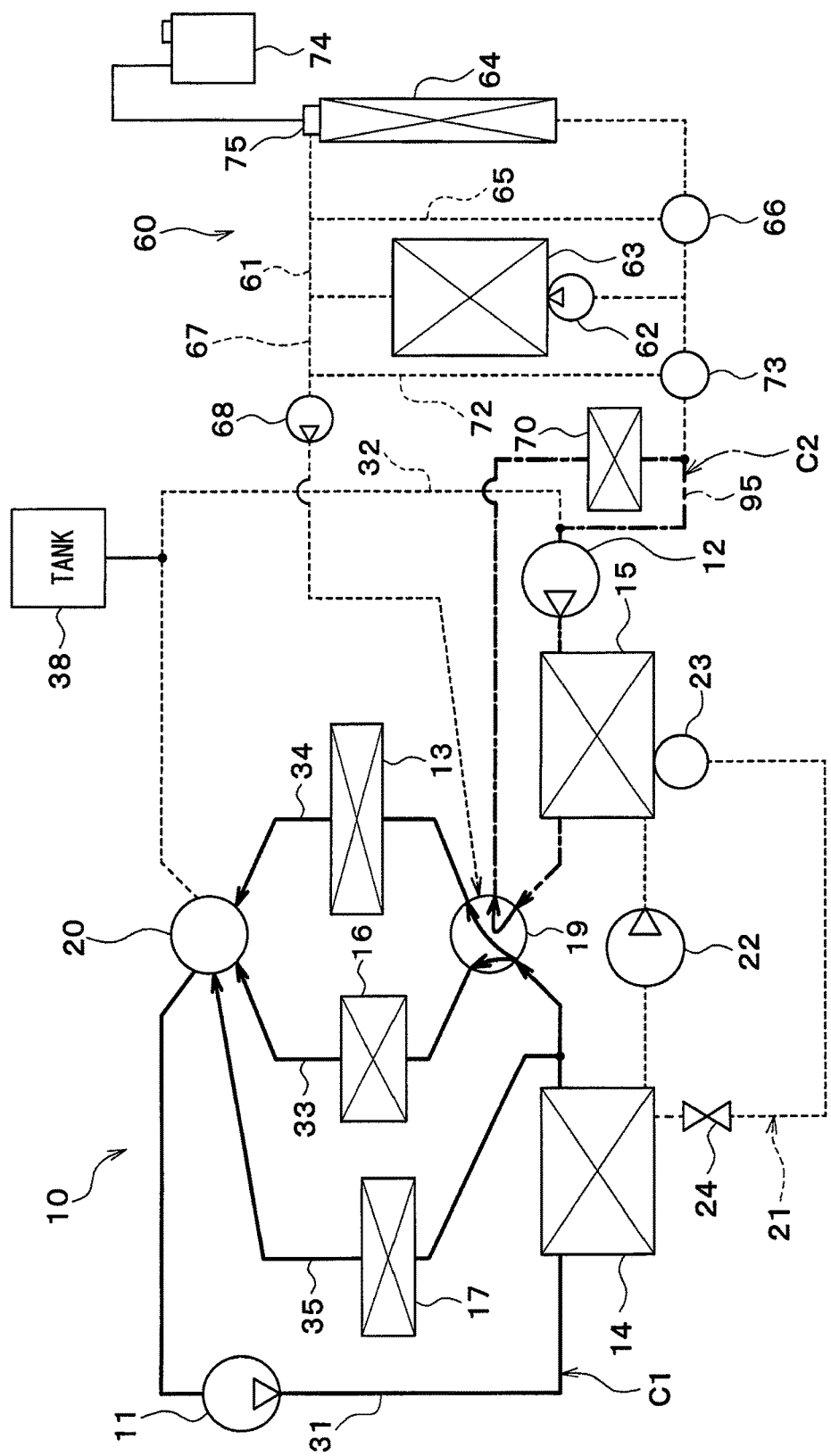
FIG. 33 is an entire configuration diagram for explaining a non-cooperation mode of the vehicle thermal management system in the tenth embodiment.

When the temperature of coolant in the engine cooling circuit 60 is less than a predetermined value (e.g., less than 50° C.), a second mode shown in FIG. 33 is performed. In the cooperation mode, the first switching valve 19 and the second switching valve 20 are operated to form a first coolant circuit C1 (first heat medium circuit) in which the coolant circulates through the first pump 11, the coolant cooler 14, the radiator 13, device 16, and cooler core 17, and the first pump 11 in this order.

In the second mode, the second switching valve 20 is operated to form a second coolant circuit C2 (second heat medium circuit) in which the coolant circulates through the second pump 12, the coolant heater 15, the heater core 70, and the second pump 12 in this order. The compressor 22 in the refrigeration cycle 21 is operated to allow the refrigerant to circulate through the refrigeration cycle 21.

Thus, in the heat pump operation of the refrigeration cycle 21, a coolant is heated by the coolant heater 15. The coolant heated by the coolant heater 15 flows through the heater core 70, so that the ventilation air into the vehicle interior can be heated by the heater core 70, thereby performing air-heating of the vehicle interior. In the first coolant circuit C1, the coolant cooled by the radiator 13 flows through the radiator 13 and the device 16, so that the heat of the outside air can be absorbed in the coolant at the radiator 13, while cooling the device 16.

In the second mode, the second coolant circuit C2 cooperates with the engine cooling circuit 60. Thus, the second mode can be expressed as the cooperation mode.

Although the engine cooling circuit 60 is connected to the second switching valve 20 by way of example as described above, the engine cooling circuit 60 may be connected to the first switching valve 19.

In this embodiment, like the third embodiment, the first coolant circuit C1, the second coolant circuit C2, and the engine cooling circuit 60 can cooperate with each other, so that the heat from the device can be used to promote warming-up of the engine 63, while the waste heat from the engine 63 can also be used to heat the device.

The engine cooling circuit 60 is connected to at least one of the first switching valve 19 and the second switching valve 20, whereby the first and second cooling circuits C1 and C2 and the engine cooling circuit 60 can share the device. For example, the first and second cooing circuits C1 and C2 and the engine cooling circuit 60 can share the heater core, which can simplify the structure, as compared to the case where heater cores are individually provided in the first and second cooing circuits C1 and C2 and the engine cooling circuit 60.

(Other Embodiments)

The above-mentioned embodiments can be combined together as appropriate. Various modifications and changes can be made to the above-mentioned embodiments, for example, as follows.

Figure 34:
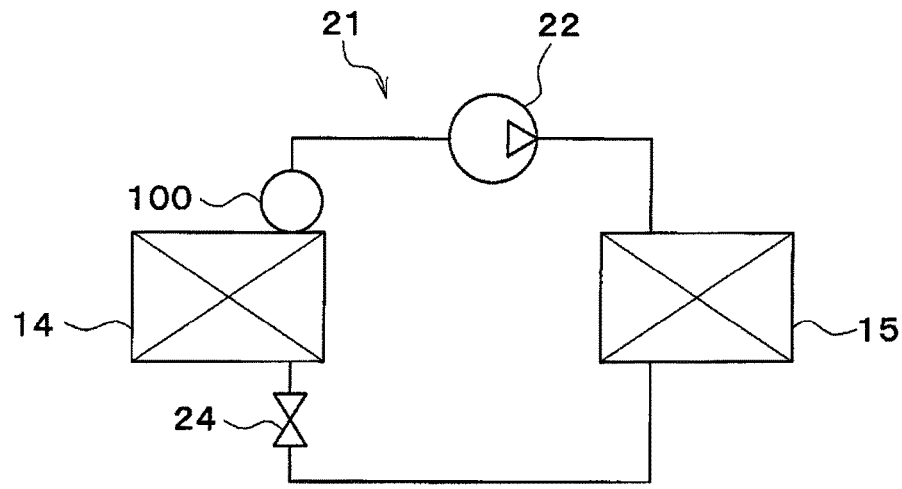
FIG. 34 is a configuration diagram of a refrigeration cycle in a vehicle thermal management system according to another embodiment.

(1) Specifically, various modifications and changes can be made to the structures of the refrigeration cycle 21 in the respective embodiments. For example, as shown in FIG. 34, an accumulator 100 may be disposed between the coolant cooler 14 and the compressor 22. The accumulator 100 is a gas-liquid separator that separates the refrigerant evaporated by the coolant cooler 14 into a gas-phase refrigerant and a liquid-phase refrigerant to thereby allow the separated gas-phase refrigerant to flow out.

Figure 35:
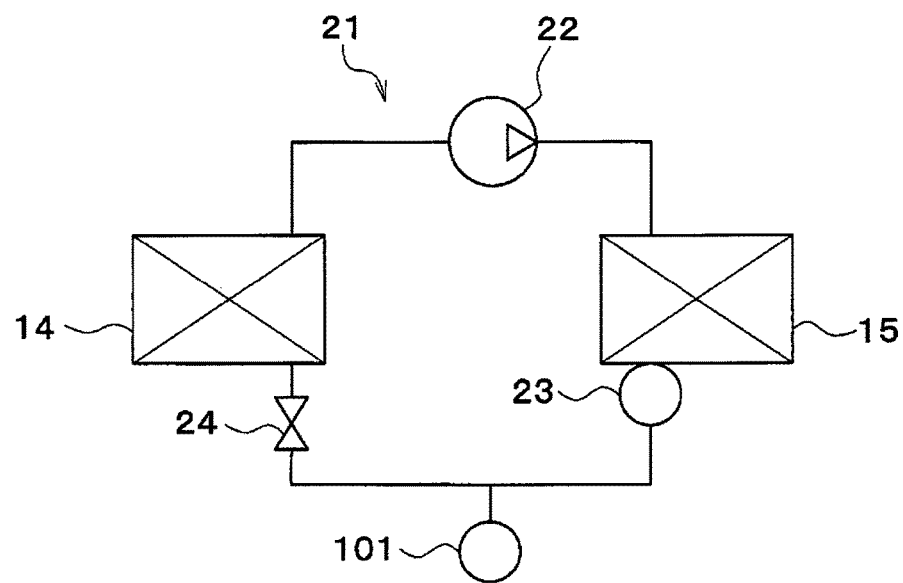
FIG. 35 is a configuration diagram of a refrigeration cycle in a vehicle thermal management system according to another embodiment.

As shown in FIG. 35, a refrigerant tank 101 for reducing a refrigerant filling density may be provided.

Figure 36:
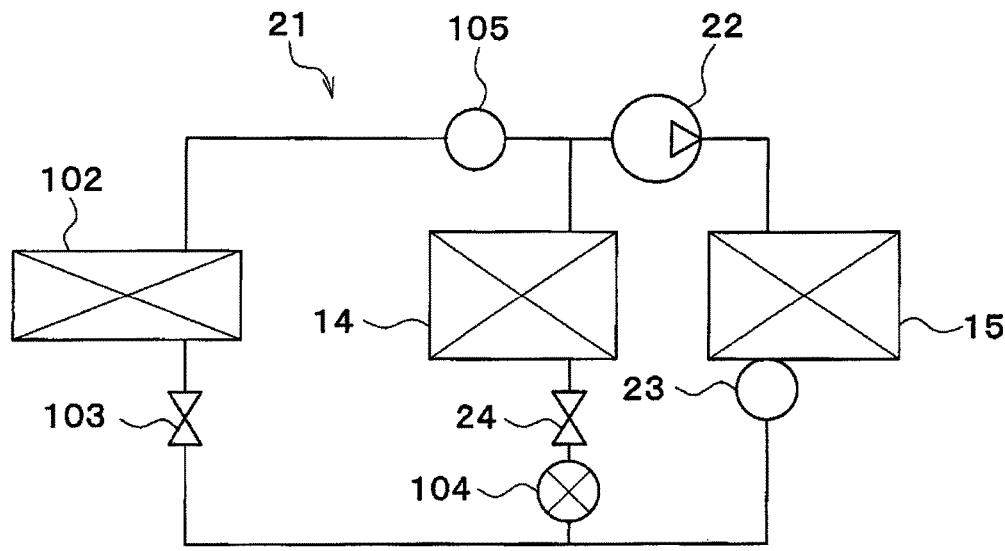
FIG. 36 is a configuration diagram of a refrigeration cycle in a vehicle thermal management system according to another embodiment.

As shown in FIG. 36, an evaporator 102 and an evaporator expansion valve 103 may be provided in parallel with the coolant cooler 14 and the expansion valve 24. The evaporator expansion valve 103 is a decompression device that decompresses and expands a liquid-phase refrigerant flowing out of the receiver 23. In this case, preferably, an electromagnetic valve 104 distributes the refrigerant to the coolant cooler 14 and the evaporator 102, and a pressure adjustment valve 105 adjusts a refrigerant evaporating pressure at the evaporator 102.

Figure 37:
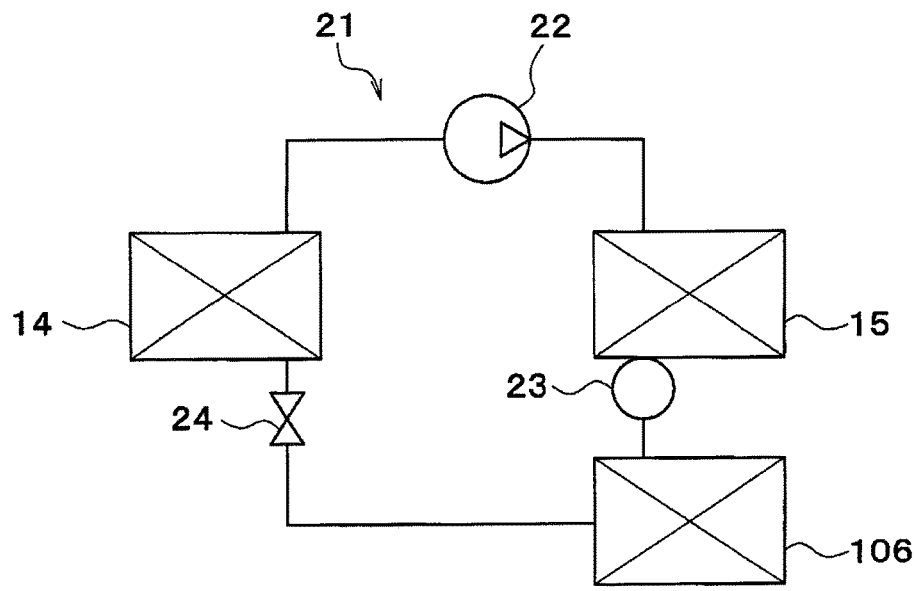
FIG. 37 is a configuration diagram of a refrigeration cycle in a vehicle thermal management system according to another embodiment.

As shown in FIG. 37, a supercooling heat exchanger 106 may be provided in between the receiver 23 and the expansion valve 24. The supercooling heat exchanger 106 is a refrigerant supercooling heat exchanger (refrigerant-heat medium heat exchanger) that further cools the refrigerant cooled by the coolant heater 15 to increase a supercooling degree of the refrigerant.

Figure 38:
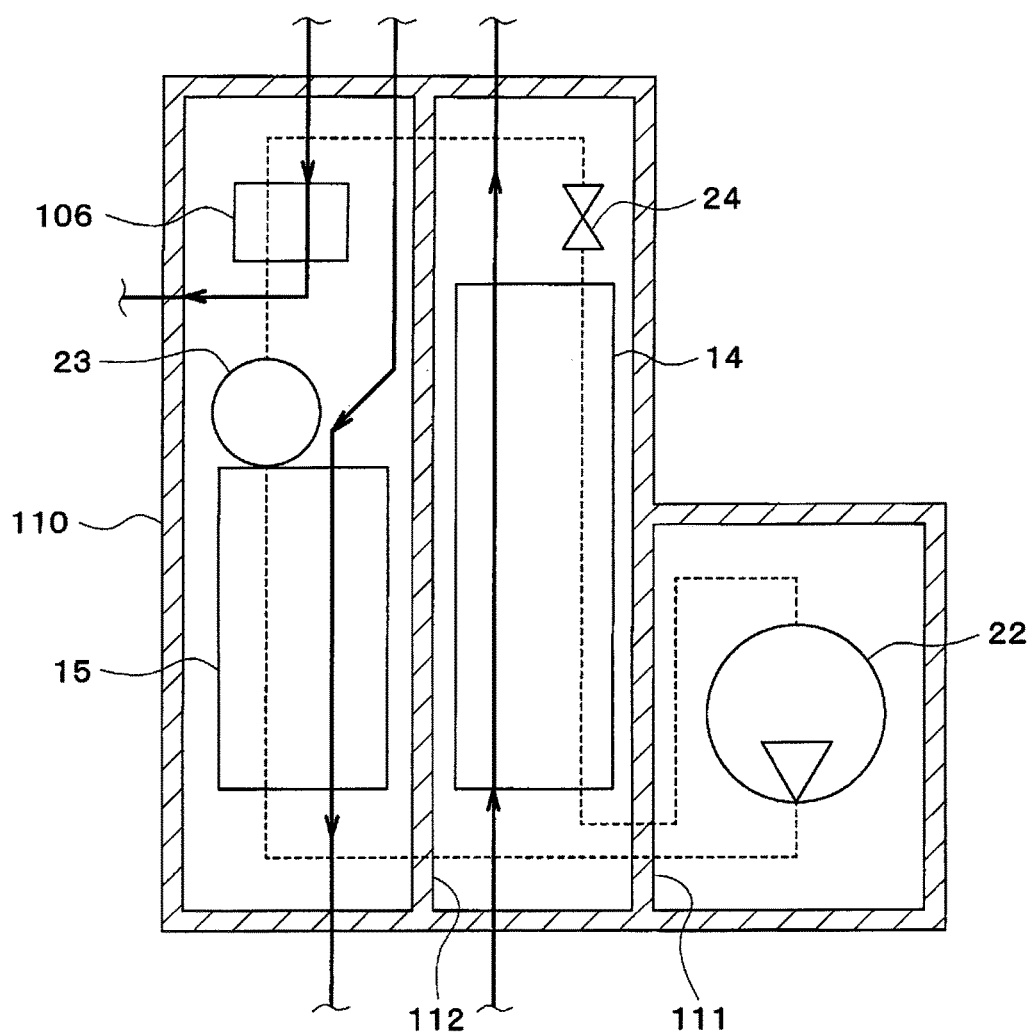
FIG. 38 is a configuration diagram of a refrigeration cycle in a vehicle thermal management system according to another embodiment.

As shown in FIG. 38, respective components of the refrigeration cycle 21 may be stored in a common case 110. In FIG. 38, the solid arrow indicates the flow of coolant, and the dashed arrow indicates the flow of refrigerant.

Within the case 110, a first partition wall 111 is provided between the compressor 22 and the coolant heater 15. The first partition wall 111 separates a space for storing therein the compressor 22 from a space for storing therein the coolant heater 15.

Within the case 110, a second partition wall 112 is provided between the coolant heater 15 and the coolant cooler 14. The second partition wall 112 separates a space for storing therein the coolant heater 15 from a space for storing therein the coolant cooler 14.

The case 110, the first partition wall 111, and the second partition wall 112 serve as a sound insulating member (sound insulating portion) having sound insulating properties, and also as a heat insulating member (thermal insulating portion) having heat insulating properties.

With this arrangement, since the compressor 22 is stored in the case 110 having sound insulating properties, radiated sound from the compressor 22 can be suppressed. Further, since the respective components of the refrigeration cycle 21 are stored in the case 110 having heat insulating properties, the engine room of the vehicle can be prevented from being damaged due to heat.

The second partition wall 112 having the heat insulating properties is provided between the coolant heater 15 and the coolant cooler 14. Thus, even though the coolant cooler 14 is located in proximity to the coolant heater 15, the second partition wall 112 can prevent the heat transfer between the coolant cooler 14 and the coolant heater 15, thereby suppressing the reduction in efficiency.

Figure 39:
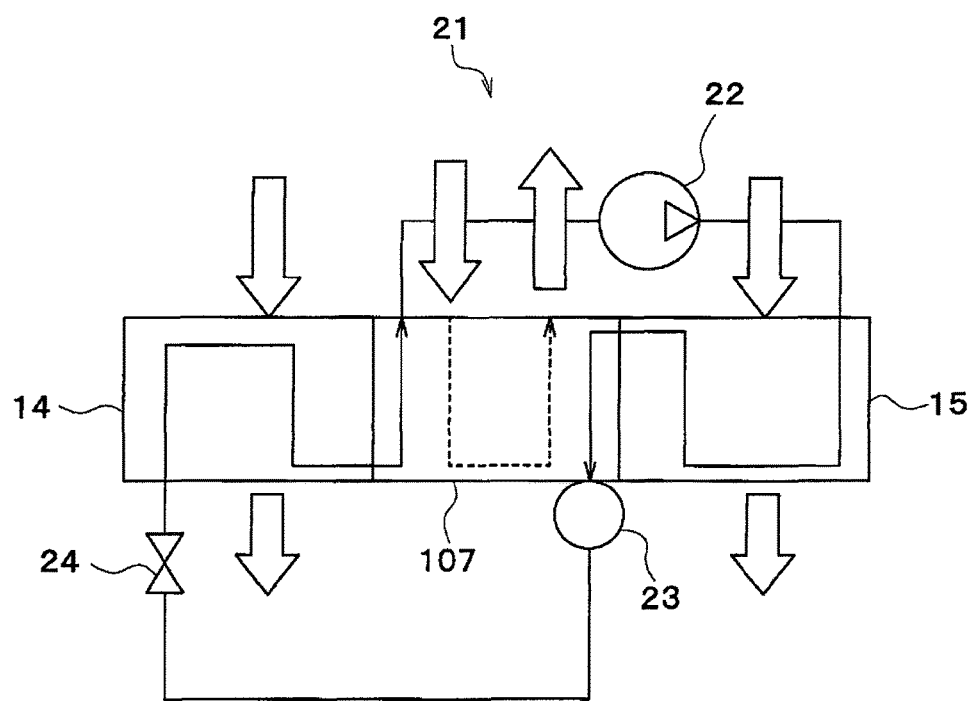
FIG. 39 is a configuration diagram of a refrigeration cycle in a vehicle thermal management system according to another embodiment.

As shown in FIG. 39, an internal heat exchanger 107 may be provided. The internal heat exchanger 107 is a heat exchanger (refrigerant-refrigerant heat exchanger) that cools the refrigerant passing through the coolant heater 15 by exchanging heat between the refrigerant passing through the coolant heater 15 and the refrigerant passing through the coolant cooler 14.

In the example shown in FIG. 39, the internal heat exchanger 107 exchanges heat between the refrigerant passing through the coolant heater 15 and the refrigerant passing through the coolant cooler 14 via the coolant. The opening arrow in FIG. 39 indicates the flow of coolant.

In the example of FIG. 39, the internal heat exchanger 107 is integrated with the coolant heater 15 and the coolant cooler 14. The internal heat exchanger 107 is sandwiched between the coolant heater 15 and the coolant cooler 14. The coolant cooler 14, the coolant heater 15, and the internal heat exchanger 107 each include a refrigerant tube and a coolant tube laminated on each other, have the same lamination direction of these tubes, and are arranged in parallel with the lamination direction of the refrigerant tube and the coolant tube.

Figure 40:
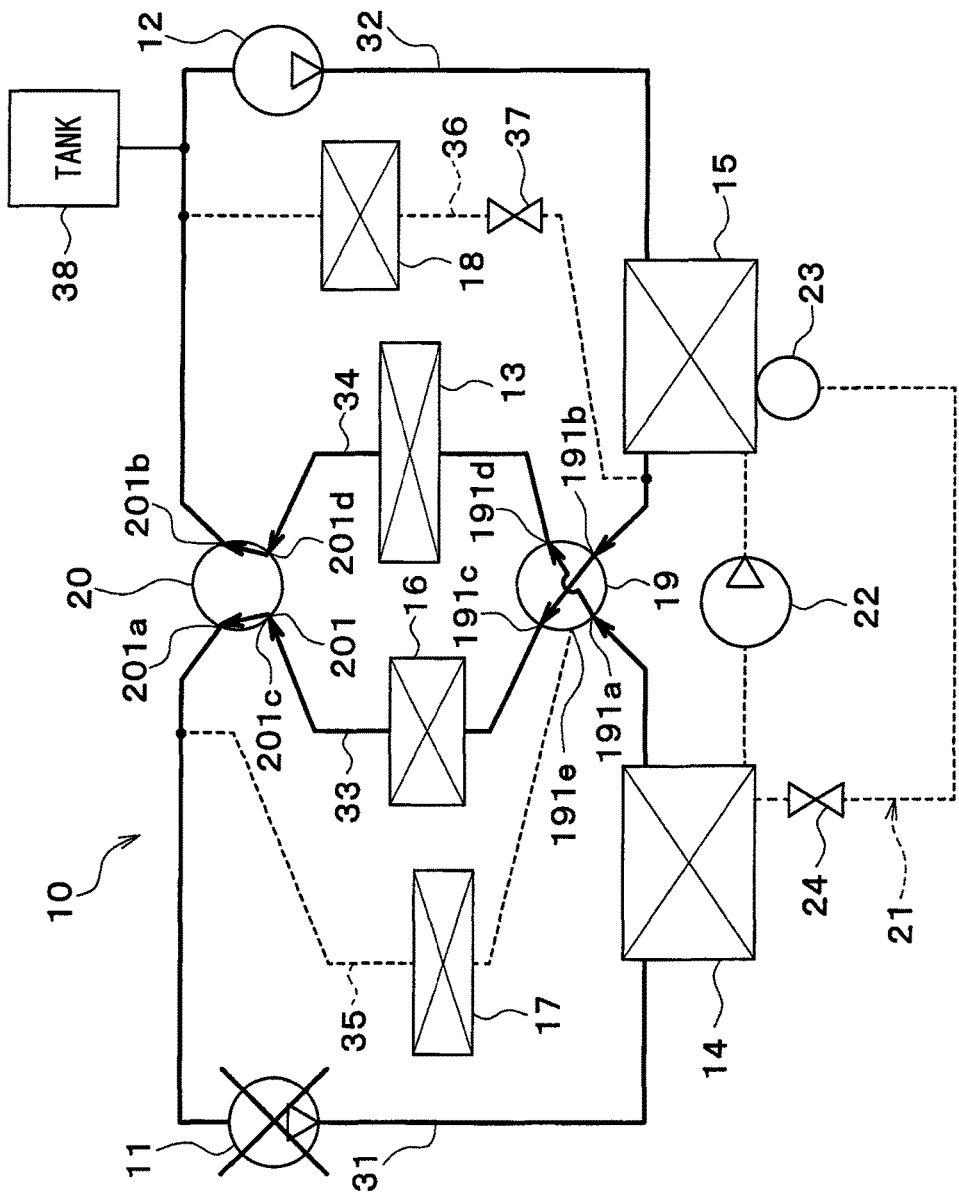
FIG. 40 is an entire configuration diagram for explaining a pump failure mode of a vehicle thermal management system in another embodiment.

(2) In the pump failure mode of the sixth embodiment, the first switching valve 19 and the second switching valve 20 are operated to allow the coolant to circulate among the second pump 12 (pump that does not break down), the radiator 13, and the device 16. Alternatively, as shown in FIG. 40, in the pump failure mode, the first switching valve 19 and the second switching valve 20 may be operated to allow the coolant to flow through the first pump 11 and the second pump 12 in series.

(3) The refrigeration cycle 21 in each of the above embodiments employs a fluorocarbon refrigerant as the refrigerant. However, the kind of the refrigerant is not limited to such a kind of refrigerant. Specifically, a natural refrigerant, such as carbon dioxide, a hydrocarbon-based refrigerant, and the like may also be used as the refrigerant.

The refrigeration cycle 21 in each of the above embodiments forms a subcritical refrigeration cycle whose high-pressure side refrigerant pressure does not exceed a critical pressure of the refrigerant. Alternatively, the refrigeration cycle may form a supercritical refrigeration cycle whose high-pressure side refrigerant pressure exceeds the critical pressure of the refrigerant.

(4) In each of the above-mentioned embodiments, the coolant is used as the heat medium. Alternatively, various kinds of media, such as oil, may be used as the heat medium.

Nano-fluid may be used as the heat medium. The nano-fluid is a fluid into which nanoparticles with a particle diameter of the order of nanometer are mixed. Mixing of the nanoparticles into the heat medium can have the following effects, in addition to the same effect of decreasing a freezing point as that in use of a coolant using ethylene glycol (so-called antifreeze solution).

That is, the above-mentioned effects can include improving a thermal conductivity in a specific temperature range, increasing a heat capacity of the heat medium, preventing corrosion of a metal pipe and degradation of a rubber tube, and enhancing a fluidity of the heat medium at an ultralow temperature.

These effects vary depending on the composition, shape, and compounding ratio of nanoparticles, and additives.

With this arrangement, the thermal conductivity can be improved, and thus can obtain the same cooling efficiency, even though the above heat medium containing the nano-particles is used in a small amount as compared to a coolant using ethylene glycol.

The thermal capacity of the heat medium can be increased to thereby increase the amount of the cold heat stored in the heat medium itself (cold heat stored due to sensible heat).

Since the amount of stored cold heat is increased, even though the compressor 22 does not operate, the temperature of the device can be adjusted, specifically, by cooling or heating the device using the stored cold heat for a while, which can save the power of the vehicle thermal management system.

An aspect ratio of a nanoparticle is preferably equal to or more than 50. This is because sufficient heat conductivity can be obtained. The term "aspect ratio" as used herein means a shape index indicative of a ratio between the longitudinal and lateral dimensions of the nanoparticle.

Nanoparticles can include any one of Au, Ag, Cu, and C. Specifically, as atoms of the nanoparticles, an Au nanoparticle, a Ag nanowire, a CNT (carbon nanotube), a graphene, a graphite core shell type nano particle (grain body having a structure surrounding the above-mentioned atom, such as a carbonnanotube), an Au nanoparticle-containing CNT can be used.

(5) Although the above respective embodiments have shown the examples in which the vehicle thermal management system 10 is applied to a hybrid vehicle, the vehicle thermal management system 10 may be applied to any electric vehicle or the like that obtains a driving force for vehicle traveling from an electric motor for traveling without including any engine.

What is claimed is:

1. A thermal management system for a vehicle, comprising:
   a first pump and a second pump that draw and discharge a heat medium;
   a device group configured by plural devices, through which the heat medium circulates;
   a first switching valve that is connected to at least one device of the device group, a heat medium discharge side of the first pump, and a heat medium discharge side of the second pump, the first switching valve being adapted to switch between a state in which the heat medium discharged from the first pump flows, and another state in which the heat medium discharged from the second pump flows, with respect to the at least one device;
   a second switching valve that is connected to the at least one device, a heat medium suction side of the first pump, and a heat medium suction side of the second pump, the second switching valve being adapted to switch between a state in which the heat medium flows into the first pump and another state in which the heat medium flows into the second pump, with respect to the at least one device; and
   a first device included in the device group, and a second device in which the heat medium circulating through the first device needs to flow, wherein
   one side of a heat medium inlet side and a heat medium outlet side of the second device is connected to a flow path directly between the first device and one of the first switching valve and the second switching valve.

2. The thermal management system for a vehicle according to claim 1, wherein
   the first device is disposed between one pump of the first pump and the second pump, and the one switching valve of the first switching valve and the second switching valve, and
   the other side of the heat medium inlet side and the heat medium outlet side of the second device is connected to a position between the other one of the first switching valve and the second switching valve and the first device, or to the other switching valve of the first switching valve and the second switching valve.

3. The thermal management system for a vehicle according to claim 2, further comprising:
   a third device included in the device group, and a fourth device in which the heat medium circulating through the third device needs to flow, wherein
   the other side of the heat medium inlet side and the heat medium outlet side of the second device is connected to the other switching valve,
   the third device is disposed between the other pump of the first pump and the second pump, and the first switching valve or the second switching valve,
   one side of a heat medium inlet side and a heat medium outlet side of the fourth device is connected to a position between the other switching valve and the third device, and
   the other side of the heat medium inlet side and the heat medium outlet side of the fourth device is connected to the one switching valve via which the second device is connected to the first device.

4. The thermal management system for a vehicle according to claim 3, wherein
   the device group includes a heat medium-outside air heat exchanger that exchanges heat between the heat medium and outside air,
   the first device is a heat medium cooler that cools the heat medium by exchanging heat between the heat medium and a low-pressure side refrigerant in a refrigeration cycle,
   the third device is a heat medium heater that heats the heat medium by exchanging heat between the heat medium and a high-pressure side refrigerant in the refrigeration cycle, and
   the first switching valve and the second switching valve are capable of switching between a state of connecting the heat medium-outside air heat exchanger to the heat medium cooler and another state of connecting the heat medium-outside air heat exchanger to the heat medium heater.

5. The thermal management system for a vehicle according to claim 1, wherein
the at least one device includes the first device, and
the other side of the heat medium inlet side and the heat medium outlet side of the second device is connected to the one switching valve.

6. The thermal management system for a vehicle according to claim 1, wherein
the first switching valve includes
numerous first switching valve ports connected to the at least one device, a heat medium discharge side of the first pump, and a heat medium discharge side of the second pump, and
a first-switching-valve valve body that opens or closes the numerous first switching valve ports,
the second switching valve includes
numerous second valve switching ports connected to the at least one device, a heat medium suction side of the first pump, and a heat medium suction side of the second pump, and
a second-switching-valve valve body that opens or closes the numerous second switching valve ports, and
at least one of:
the first-switching-valve valve body is capable of adjusting a time-averaged flow rate of the heat medium flowing through at least a pair of ports connected to each other among the numerous first switching valve ports, and
the second-switching-valve valve body is capable of adjusting a time-averaged flow rate of the heat medium flowing through at least a pair of ports connected to each other among the numerous second switching valve ports.

7. The thermal management system for a vehicle according to claim 1, further comprising
an engine cooling circuit for circulation of the heat medium to cool an engine, wherein
the engine cooling circuit is connected to at least one switching valve of the first switching valve and the second switching valve.

8. The thermal management system for a vehicle according to claim 1, further comprising
a communication flow path that communicates between a heat medium flow path leading from a heat medium inlet of the second switching valve to a heat medium suction portion of the first pump, and a heat medium flow path leading from a heat medium inlet of the second switching valve to a heat medium suction portion of the second pump.

9. The thermal management system for a vehicle according to claim 1, further comprising:
a detector that detects a temperature associated with a temperature of the heat medium; and
a switching controller that controls operation of the first switching valve and the second switching valve in accordance with the temperature detected by the detector.

10. The thermal management system for a vehicle according to claim 1, wherein
the device group includes a heat medium-outside air heat exchanger that exchanges heat between the heat medium and outside air, and a cooling device that cools the heat medium down to a temperature lower than a temperature of the outside air, and
the at least one device includes a plurality of cooling target devices to be cooled with the heat medium,
the thermal management system for a vehicle further comprising:
a detector that detects a temperature associated with a temperature of the heat medium obtained after the heat exchange by the heat medium-outside air heat exchanger; and
a switching controller that controls operation of the first switching valve and the second switching valve such that when the temperature detected by the detector is lower than a predetermined temperature, a device among the cooling target devices which needs cooling is connected to the heat medium-outside air heat exchanger, and such that when the temperature detected by the detector is higher than the predetermined temperature, the number of devices which need cooling and are connected to the cooling device is increased as the temperature detected by the detector increases.

11. The thermal management system for a vehicle according to claim 10, wherein
the cooling target devices include devices having different required cooling temperatures,
the switching controller controls the first switching valve and the second switching valve such that when the temperature detected by the detector is higher than the predetermined temperature, the cooling device is sequentially connected to the cooling target devices from a low-temperature device in order as the temperature detected by the detector increases.

12. The thermal management system for a vehicle according to claim 1, wherein
the device group includes a heat storage device capable of storing hot heat, and a heat medium cooler adapted to cool the heat medium by exchanging heat between the heat medium and a low-pressure side refrigerant in a refrigeration cycle, and
when a temperature of the heat storage device is higher than an outside air temperature, the heat medium cooler, the heat storage device, and the first pump or the second pump are connected together.

13. The thermal management system for a vehicle according to claim 1, wherein
the device group includes a heat storage device capable of storing cold heat, and a heat medium heater adapted to heat the heat medium by exchanging heat between the heat medium and a high-pressure side refrigerant in the refrigeration cycle, and
the first switching valve and the second switching valve are controlled to connect the heat medium heater, the heat storage device, and the first pump or the second pump together when a temperature of the heat storage device is lower than an outside air temperature.

14. The thermal management system for a vehicle according to claim 1, further comprising:
a pump controller that controls operation of the first pump and the second pump such that an output from one pump of the first pump and the second pump with a larger output approaches another output from the other pump, upon switching between the first switching valve and the second switching valve.

15. The thermal management system for a vehicle according to claim 1, further comprising:
a switching controller that controls operation of the first switching valve and the second switching valve such that the heat medium flows through the first pump and the second pump in series when one of the first pump and the second pump is determined to break down.

16. The thermal management system for a vehicle according to claim 1, wherein
the device group includes a heat medium-outside air heat exchanger that exchanges heat between the heat medium and outside air, a heat medium cooler that cools the heat medium by exchanging heat between the heat medium and a low-pressure side refrigerant in a refrigeration cycle, and a heat medium heater that heats the heat medium by exchanging heat between the heat medium and a high-pressure side refrigerant in the refrigeration cycle,
the thermal management system for a vehicle further comprising:
a compressor controller adapted to stop a compressor in the refrigeration cycle when one pump of the first pump and the second pump is determined to break down; and
a switching controller that controls operation of the first switching valve and the second switching valve so as to connect the other pump, a device among the at least one device that needs cooling, and the heat medium-outside air heat exchanger together when the one pump is determined to break down.

17. The thermal management system for a vehicle according to claim 1, wherein
the device group includes a heat medium-outside air heat exchanger that exchanges heat between the heat medium and outside air, a heat medium cooler that cools the heat medium by exchanging heat between the heat medium and a low-pressure side refrigerant in a refrigeration cycle, and a heat medium heater that heats the heat medium by exchanging heat between the heat medium and a high-pressure side refrigerant in the refrigeration cycle, and
the thermal management system for a vehicle further comprising:
a controller
that controls operation of the first switching valve and the second switching valve so as to connect at least one of the heat medium cooler and the heat medium heater with the heat medium-outside air heat exchanger and further with one pump of the first pump and the second pump, when a physical quantity associated with a temperature of a refrigerant in the refrigeration cycle is determined to be equal to or more than a predetermined value, in starting up a compressor in the refrigeration cycle, and
that starts up the one pump before starting up the compressor of the refrigeration cycle.

18. The thermal management system for a vehicle according to claim 1, wherein
the device group includes a heat medium cooler that cools the heat medium by exchanging heat between the heat medium and a low-pressure side refrigerant in a refrigeration cycle, and a heat medium heater that heats the heat medium by exchanging heat between the heat medium and a high-pressure side refrigerant in the refrigeration cycle,
the vehicle thermal management system further comprising:
a case that houses a compressor of the refrigeration cycle, the heat medium cooler, and the heat medium heater, wherein
the case has sound insulating properties and heat insulating properties.

19. The thermal management system for a vehicle according to claim 1, wherein
the first switching valve includes numerous first switching valve ports connected to the at least one device, a heat medium discharge side of the first pump, and a heat medium discharge side of the second pump in parallel with each other, and a first-switching-valve valve body that opens or closes the numerous first switching valve ports,
the second switching valve includes numerous second switching valve ports connected to the at least one device, a heat medium suction side of the first pump, and a heat medium suction side of the second pump in parallel with each other, and a second-switching-valve valve body that opens or closes the numerous second switching valve ports, and
at least one of:
the first-switching-valve valve body is capable of opening at least a pair of ports at different opening degrees for the respective ports, the pair of ports being connected to each other, among the numerous first switching valve ports, and
the second-switching-valve valve body is capable of opening at least a pair of ports at different opening degrees for the respective ports, the pair of ports being connected to each other, among the numerous second switching valve ports.

20. The thermal management system for a vehicle according to claim 1, wherein
the first device is disposed on a downstream side of corresponding one of the first pump and the second pump, and
the second device is connected to the flow path at a connected portion disposed on a downstream side of the first device.

21. The thermal management system for a vehicle according to claim 17, wherein
the physical quantity associated with the temperature is a temperature of an exterior of the vehicle.

22. A thermal management system for a vehicle, comprising:
a first pump and a second pump that draw and discharge a heat medium;
a device group configured by plural devices, through which the heat medium circulates;
a first switching valve that is connected to at least one device of the device group, a heat medium discharge side of the first pump, and a heat medium discharge side of the second pump, the first switching valve being adapted to switch between a state in which the heat medium discharged from the first pump flows, and another state in which the heat medium discharged from the second pump flows, with respect to the at least one device;
a second switching valve that is connected to the at least one device, a heat medium suction side of the first pump, and a heat medium suction side of the second pump, the second switching valve being adapted to switch between a state in which the heat medium flows into the first pump and another state in which the heat medium flows into the second pump, with respect to the at least one device; and
a first device included in the device group, and a second device in which the heat medium circulating through the first device needs to flow, wherein
one side of a heat medium inlet side and a heat medium outlet side of the second device is connected to a flow path directly between the first device and one of the first switching valve and the second switching valve, wherein the heat medium flowing through the flow path bypasses at least one of the first pump and the second pump.

* * * * *